United States Patent
Sheppard et al.

(10) Patent No.: US 10,433,477 B2
(45) Date of Patent: Oct. 8, 2019

(54) SYSTEM AND COMPUTER-IMPLEMENTED METHOD FOR FACILITATING TRANSFERS OF PRODUCT CONTAINERS BETWEEN A STATION AND AN AUTONOMOUS MACHINE

(71) Applicant: Morris Industries Ltd., Saskatoon (CA)

(72) Inventors: Clint W. Sheppard, Yorkton (CA);
Conrad Allen Glowa, Yorkton (CA);
Benjamin Karl Voss, Saskatoon (CA)

(73) Assignee: Morris Industries Ltd., Saskatoon (CA)

( * ) Notice: Subject to any disclaimer, the term of this patent is extended or adjusted under 35 U.S.C. 154(b) by 0 days.

(21) Appl. No.: 16/041,526

(22) Filed: Jul. 20, 2018

(65) Prior Publication Data
US 2019/0023171 A1      Jan. 24, 2019

Related U.S. Application Data

(60) Provisional application No. 62/535,702, filed on Jul. 21, 2017.

(51) Int. Cl.
*B66F 9/12*     (2006.01)
*A01C 15/00*    (2006.01)
(Continued)

(52) U.S. Cl.
CPC .......... *A01C 15/005* (2013.01); *A01B 69/008* (2013.01); *A01C 7/105* (2013.01);
(Continued)

(58) Field of Classification Search
USPC .................................................. 701/22; 1/1
See application file for complete search history.

(56) References Cited

U.S. PATENT DOCUMENTS

| 8,205,789 B2 * | 6/2012 | Mori ..................... A01G 9/143 235/375 |
| 8,628,283 B1 | 1/2014 | Flinn |

(Continued)

FOREIGN PATENT DOCUMENTS

| JP | 2010124729 | 6/2010 |
| WO | 2016087535 | 6/2016 |
| WO | 2018054626 | 3/2018 |

OTHER PUBLICATIONS

Fendt International, MARS: Robot system for planting and accurate documentation (press release dated Sep. 8, 2017) at https://www.fendt.com/int/fendt-mars.html.
(Continued)

*Primary Examiner* — Masud Ahmed
(74) *Attorney, Agent, or Firm* — Hovey Williams LLP

(57) ABSTRACT

A control system is operable to control an autonomous machine for autonomously applying one or more products to a jobsite in accordance with a set of operation instructions. The products are stored in one or more interchangeable containers which are initially located on a station. The control system broadly includes an alignment sensor and a machine processor. The alignment sensor is configured to sense and generate alignment data regarding a relative position of the station and a particular container that contains a particular product. The machine processor is configured to align the autonomous machine with the station and the particular container based on the alignment data from the alignment sensor, and transfer the particular container from the station to the autonomous machine; move the autonomous machine over the jobsite and apply the particular product from the particular container in accordance with the set of operation instructions; and align the autonomous machine with the station based on the alignment data from
(Continued)

the alignment sensor, and transfer the particular container from the autonomous machine to the station.

17 Claims, 36 Drawing Sheets

(51) Int. Cl.
| | |
|---|---|
| *A01B 69/04* | (2006.01) |
| *A01C 7/10* | (2006.01) |
| *A01C 21/00* | (2006.01) |
| *A01C 23/00* | (2006.01) |
| *B60P 1/64* | (2006.01) |
| *B65D 21/08* | (2006.01) |
| *B67D 7/04* | (2010.01) |
| *G05D 1/00* | (2006.01) |
| *G05D 1/02* | (2006.01) |
| *A01B 69/00* | (2006.01) |
| *A01C 7/06* | (2006.01) |
| *A01C 7/12* | (2006.01) |

(52) U.S. Cl.
CPC .......... *A01C 15/003* (2013.01); *A01C 21/005* (2013.01); *A01C 23/008* (2013.01); *B60P 1/649* (2013.01); *B65D 21/083* (2013.01); *B67D 7/0401* (2013.01); *G05D 1/0088* (2013.01); *G05D 1/0219* (2013.01); *A01B 69/001* (2013.01); *A01C 7/06* (2013.01); *A01C 7/124* (2013.01); *A01C 7/127* (2013.01); *A01C 23/007* (2013.01); *B67D 2007/0461* (2013.01); *G05D 2201/0201* (2013.01)

(56) References Cited

U.S. PATENT DOCUMENTS

| | | | |
|---|---|---|---|
| 9,271,439 B2 | 3/2016 | Bourgault et al. | |
| 9,975,651 B1* | 5/2018 | Eck | B64F 1/32 |
| 2006/0218862 A1* | 10/2006 | Dyas | A01G 9/143 |
| | | | 47/86 |
| 2012/0321423 A1* | 12/2012 | MacKnight | H01L 21/67276 |
| | | | 414/664 |
| 2015/0006005 A1* | 1/2015 | Yu | G06Q 10/08 |
| | | | 701/22 |
| 2015/0105963 A1 | 4/2015 | Blackwell et al. | |
| 2016/0207627 A1* | 7/2016 | Hoareau | B64D 1/02 |
| 2016/0257423 A1* | 9/2016 | Martin | B64F 1/00 |

OTHER PUBLICATIONS

New Holland Agriculture, The New Holland NHDRIVE Concept Autonomous Tractor Shows a Vision Into the Future of Agriculture (dated Aug. 30, 2016) at http://agriculture1.newholland.com/nar/en-us/about-us/whats-up/news-events/2016/new-holland-nh-drive-new-concept-autonomous-tractor.
International Search Report and Written Opinion from PCT Serial No. PCT/CA2018/050888 entitled: Autonomous Agricultural System (dated Sep. 28, 2018).

* cited by examiner

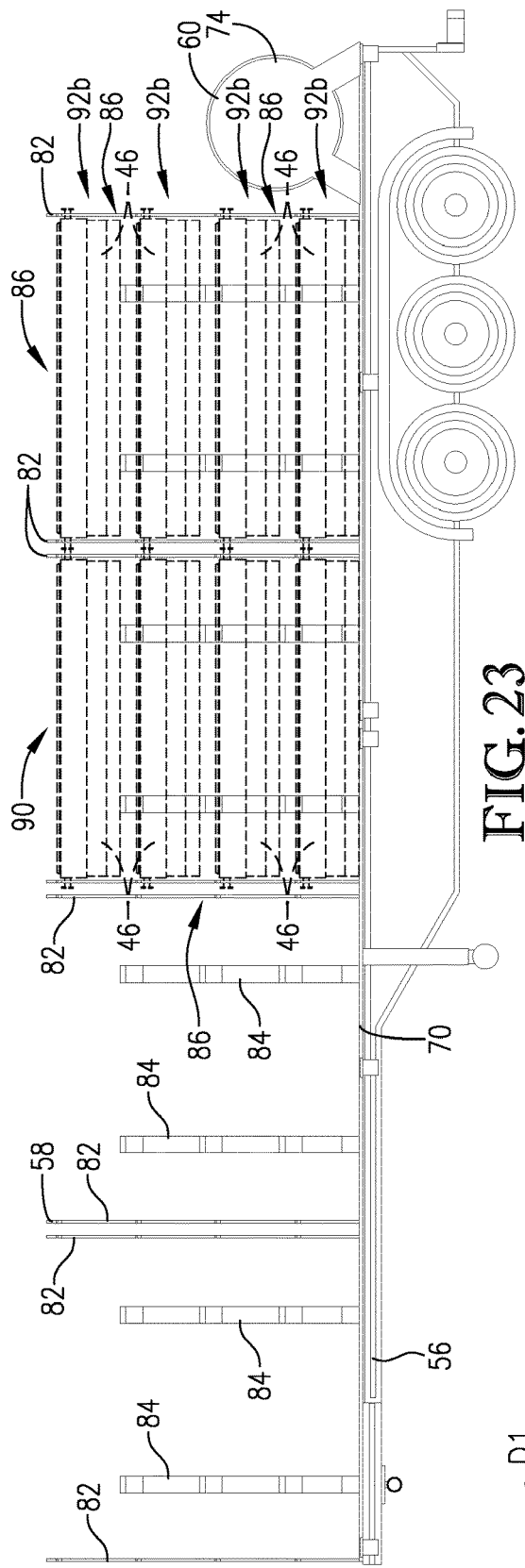
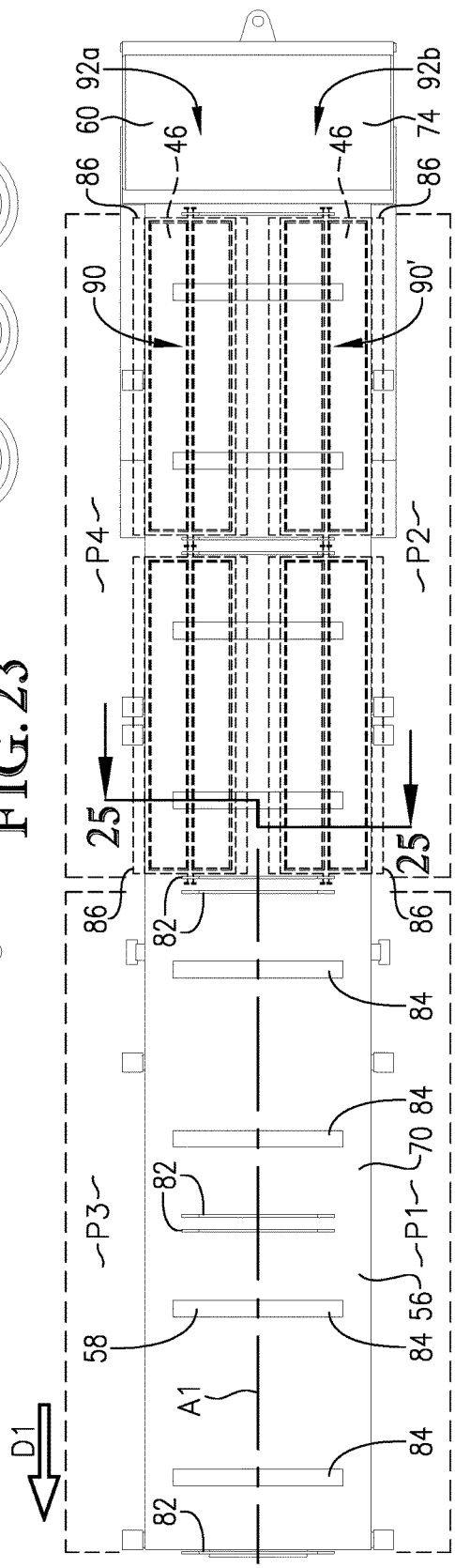
FIG. 23
FIG. 24

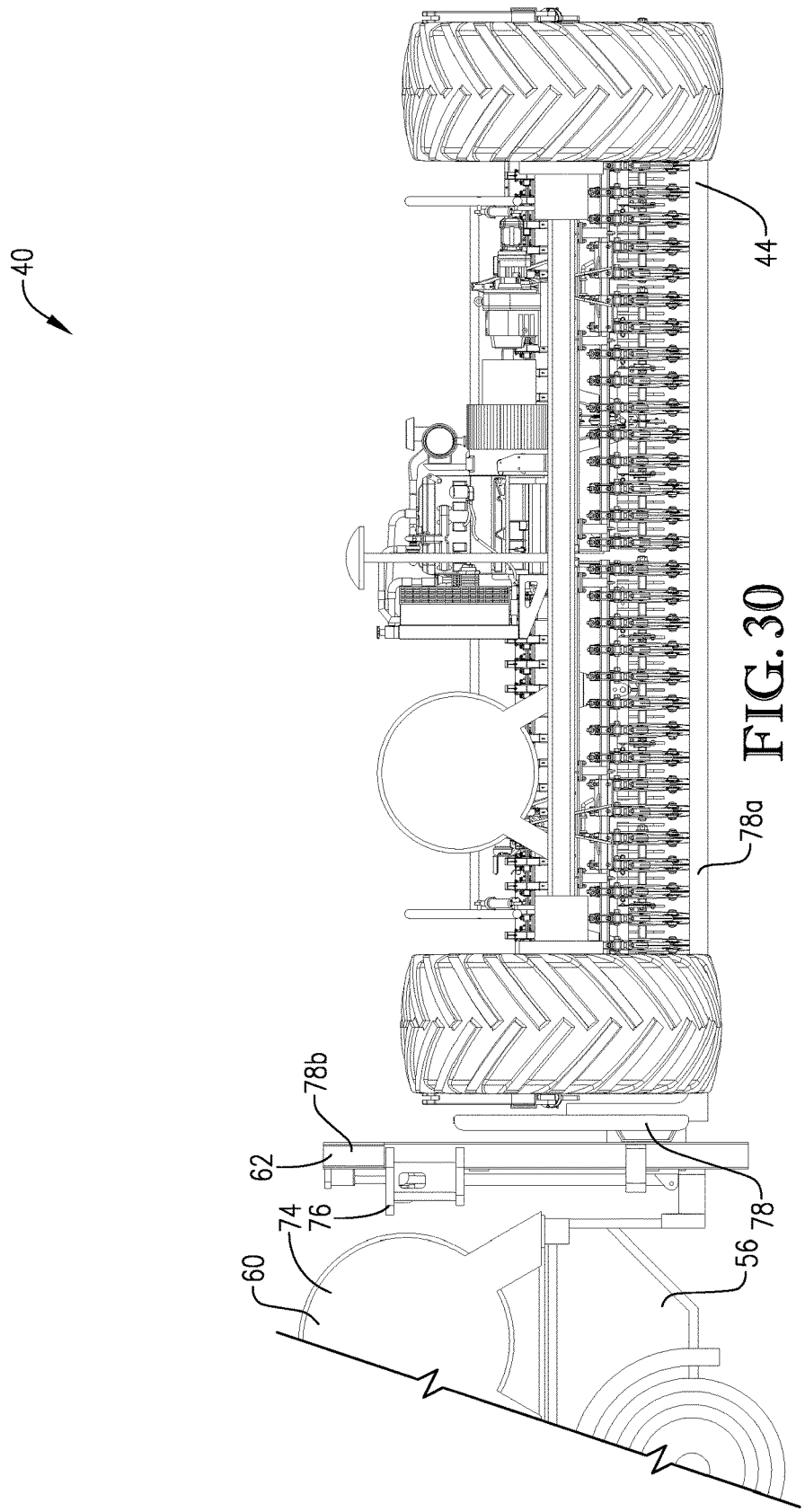

SYSTEM AND COMPUTER-IMPLEMENTED METHOD FOR FACILITATING TRANSFERS OF PRODUCT CONTAINERS BETWEEN A STATION AND AN AUTONOMOUS MACHINE

CROSS REFERENCE TO RELATED APPLICATIONS

This application claims the benefit of U.S. Provisional Application Ser. No. 62/535,702, filed Jul. 21, 2017, entitled MOBILE AUTONOMOUS SEEDING SYSTEM, which is hereby incorporated in its entirety by reference herein.

This application is being filed contemporaneously with U.S. Nonprovisional application Ser. No. 16/041,488, entitled AUTONOMOUS AGRICULTURAL IMPLEMENT WITH MODULAR PRODUCT CONTAINER; U.S. Nonprovisional application Ser. No. 16/041,503, entitled AGRICULTURAL SYSTEM WITH AUTOMATED INTERCHANGE OF MODULAR PRODUCT CONTAINERS; and U.S. Nonprovisional application Ser. No. 16/041,513, entitled PORTABLE STATION FOR MODULAR AGRICULTURAL PRODUCT CONTAINERS, each of which is hereby incorporated in its entirety by reference herein.

BACKGROUND

1. Field

The present invention relates generally to agricultural implements. More specifically, embodiments of the present invention concern a control system for controlling an autonomous machine for autonomously applying one or more products to a jobsite.

2. Discussion of Prior Art

Planters, seeders, and other agricultural implements have long been used to accurately and uniformly distribute various types of seed and agricultural products along a field. Conventional planters and seeders are customarily towed by a tractor (or other agricultural vehicle) and include a seed box and/or a fertilizer box to carry supplies of seed and/or fertilizer for distribution. It is also known in the prior art for a conventional planter to be towed by an autonomous agricultural vehicle. In other known applications, the planter is self-propelled and autonomous.

However, prior art planters and seeders are known to have various deficiencies. For instance, conventional planting implements require the supply of agricultural products (such as seed and fertilizer) carried by the implement to be refilled frequently. Furthermore, conventional processes for refilling seed and fertilizer boxes on a planter are notoriously slow and labor-intensive. These and other disadvantages associated with the process of refilling an implement with agricultural products are equally relevant to implements that are autonomously advanced along a field and are similarly problematic.

SUMMARY

The following brief summary is provided to indicate the nature of the subject matter disclosed herein. While certain aspects of the present invention are described below, the summary is not intended to limit the scope of the present invention.

Embodiments of the present invention provide a control system that does not suffer from the problems and limitations of the prior art implements set forth above.

A first aspect of the present invention concerns a control system for controlling an autonomous machine for autonomously applying one or more products to a jobsite in accordance with a set of operation instructions, wherein the one or more products are stored in one or more interchangeable containers which are initially located on a station. The control system broadly includes an alignment sensor and a machine processor. The alignment sensor is configured to sense and generate alignment data regarding a relative position of the station and a particular container of the one or more interchangeable containers, wherein the particular container contains a particular product of the one or more products. The machine processor is configured to align the autonomous machine with the station and the particular container based on the alignment data from the alignment sensor, and transfer the particular container from the station to the autonomous machine; move the autonomous machine over the jobsite and apply the particular product from the particular container in accordance with the set of operation instructions; and align the autonomous machine with the station based on the alignment data from the alignment sensor, and transfer the particular container from the autonomous machine to the station.

A second aspect of the present invention concerns a control system for controlling an autonomous machine for autonomously applying one or more products to a jobsite in accordance with a set of operation instructions, wherein the one or more products are stored in one or more interchangeable containers which are initially located on a station. The control system broadly includes an alignment sensor, a machine processor, and a navigation sensor. The alignment sensor is configured to sense a plurality of alignment markers associated with the one or more interchangeable containers, and to sense and generate alignment data regarding a relative position of the station and a particular container of the one or more interchangeable containers, wherein the particular container contains a particular product of the one or more products. The machine processor is configured to align the autonomous machine with the station and the particular container based on the alignment data from the alignment sensor, and transfer the particular container from the station to the autonomous machine; move the autonomous machine over the jobsite and apply the particular product from the particular container in accordance with the set of operation instructions; and align the autonomous machine with the station based on the alignment data from the alignment sensor, and transfer the particular container from the autonomous machine to the station. The navigation sensor is configured to sense and generate navigation data regarding a geographic location of the autonomous machine. The machine processor is further configured to move the autonomous machine over the jobsite and apply the one or more products in accordance with the set of operation instructions based at least in part on the navigation data.

A third aspect of the present invention concerns a control system for controlling an autonomous machine for autonomously applying one or more products to a jobsite in accordance with a set of operation instructions, wherein the one or more products are stored in one or more interchangeable containers which are initially located on a station. The control system broadly includes an alignment sensor, a machine processor, a machine internal sensor suite, and a machine transceiver. The alignment sensor is configured to sense a plurality of alignment markers associated with the one or more interchangeable containers, and to sense and generate alignment data regarding a relative position of the station and a particular container of the one or more interchangeable containers, wherein the particular container contains a particular product of the one or more products. The machine processor is configured to align the autonomous machine with the station and the particular container based on the alignment data from the alignment sensor, and transfer the particular container from the station to the autonomous machine; move the autonomous machine over the jobsite and apply the particular product from the particular container in accordance with the set of operation instructions; and align the autonomous machine with the station based on the alignment data from the alignment sensor, and transfer the particular container from the autonomous machine to the station. The machine internal sensor suite broadly includes a speed sensor, a rate sensor, a weight sensor, and a blockage sensor. The speed sensor is configured to sense and generate speed data regarding a speed of movement of the autonomous machine over the jobsite. The rate sensor is configured to sense and generate rate data regarding a rate of application of the one or more products. The weight sensor is configured to sense and generate weight data regarding a weight of the particular container, wherein the weight of the particular container is indicative of a remaining amount of the particular product in the particular container. The blockage sensor is configured to sense and generate blockage data regarding a blockage in the application of the particular product. The machine processor accomplishes moving the autonomous machine over the jobsite and applying the one or more products in accordance with the set of operation instructions based at least in part on the speed, rate, weight, and blockage data. The machine transceiver is configured to transmit the speed, rate, weight, and blockage data via a communications network to a remote location, and to receive a modified set of operation instructions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a rear perspective of an agricultural system constructed in accordance with a preferred embodiment of the present invention and configured to dispense an agricultural product within a field, with the system including a supply station, an autonomous agricultural machine coupled to the station for transport therewith, product containers stored on the station, and a powered transfer mechanism operably mounted on the machine;

FIG. 23 is a fragmentary side elevation of the supply station shown in FIG. 20, showing containers mounted in some of the bays;

FIG. 24 is a fragmentary top view of the supply station as shown in FIG. 23, showing docking positions located on opposite sides of the trailer;

FIG. 30 is a fragmentary side elevation of the supply station similar to FIG. 29, but showing the fork assembly raised to the elevated position so that the machine is coupled to and supported by the lift mechanism;

Figure 31A:
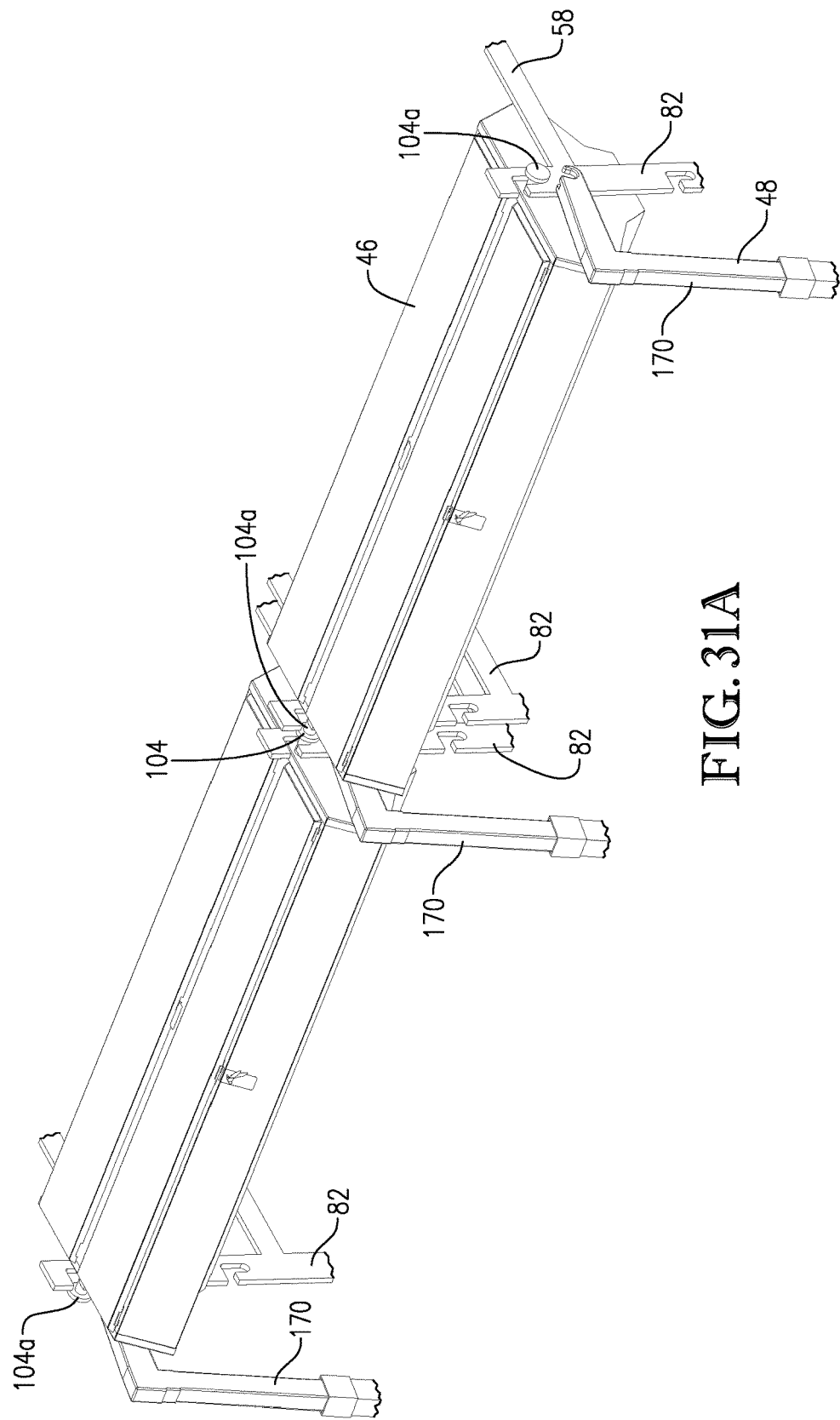
Figure 31B:
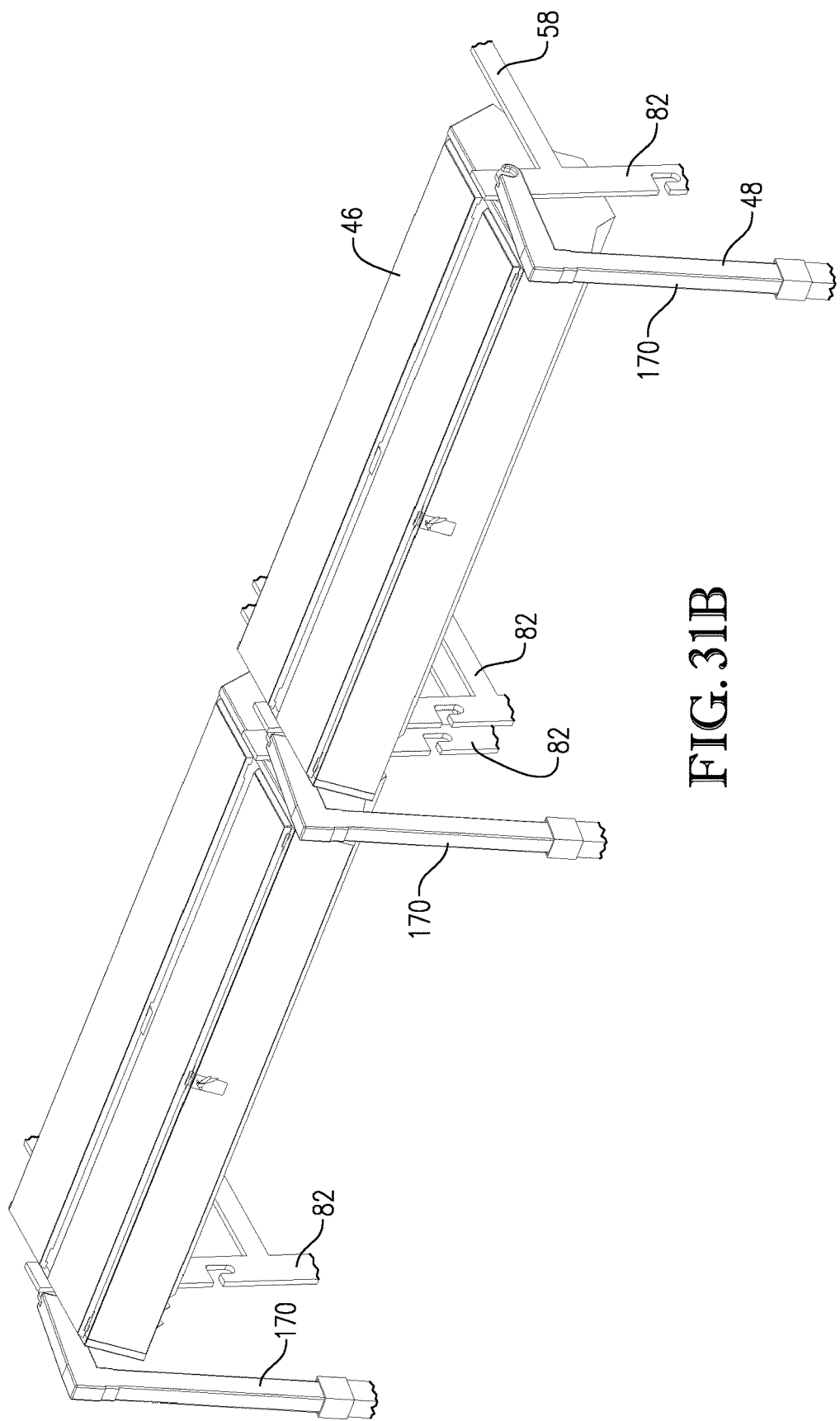
Figure 31C:
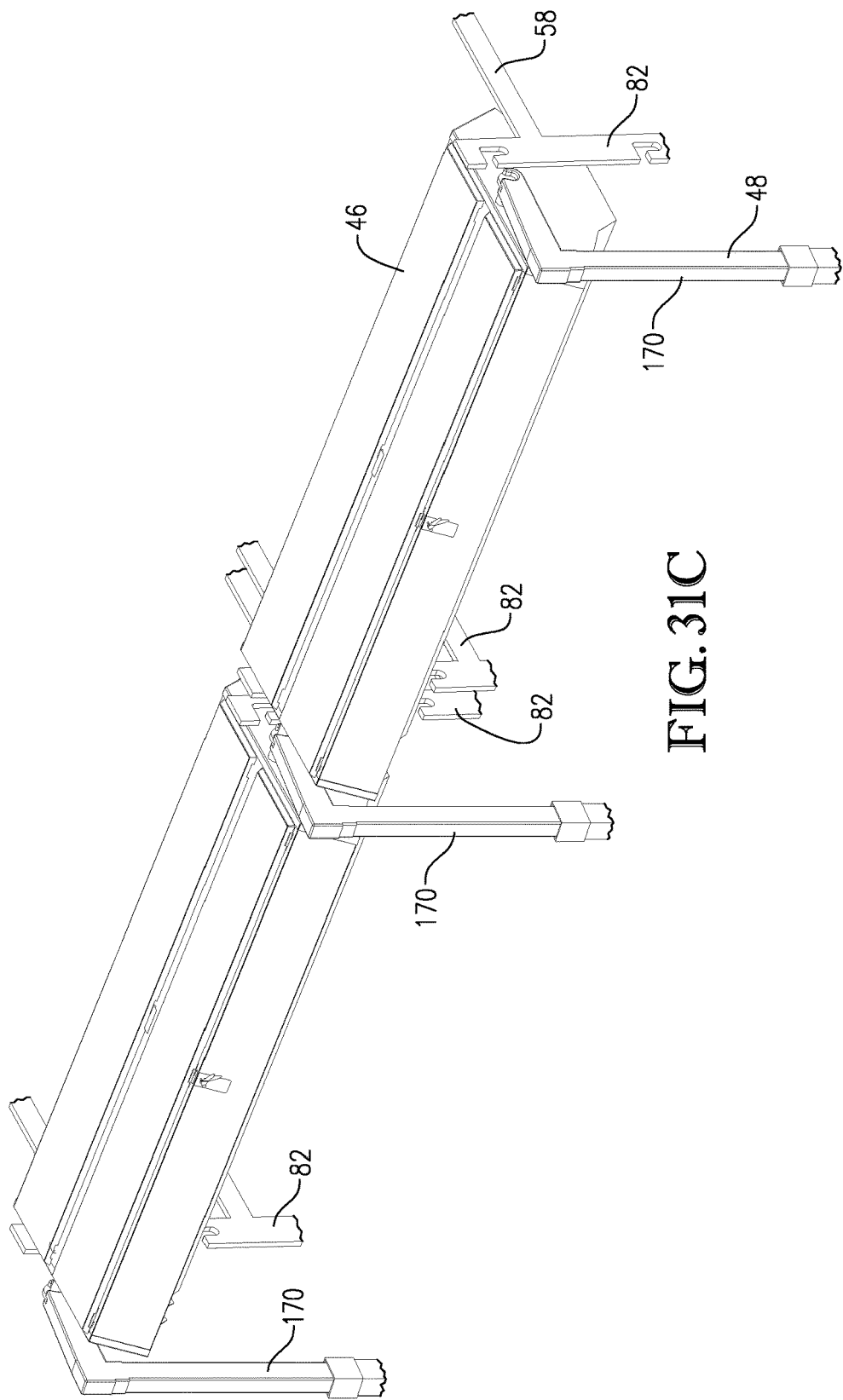
Figure 32:
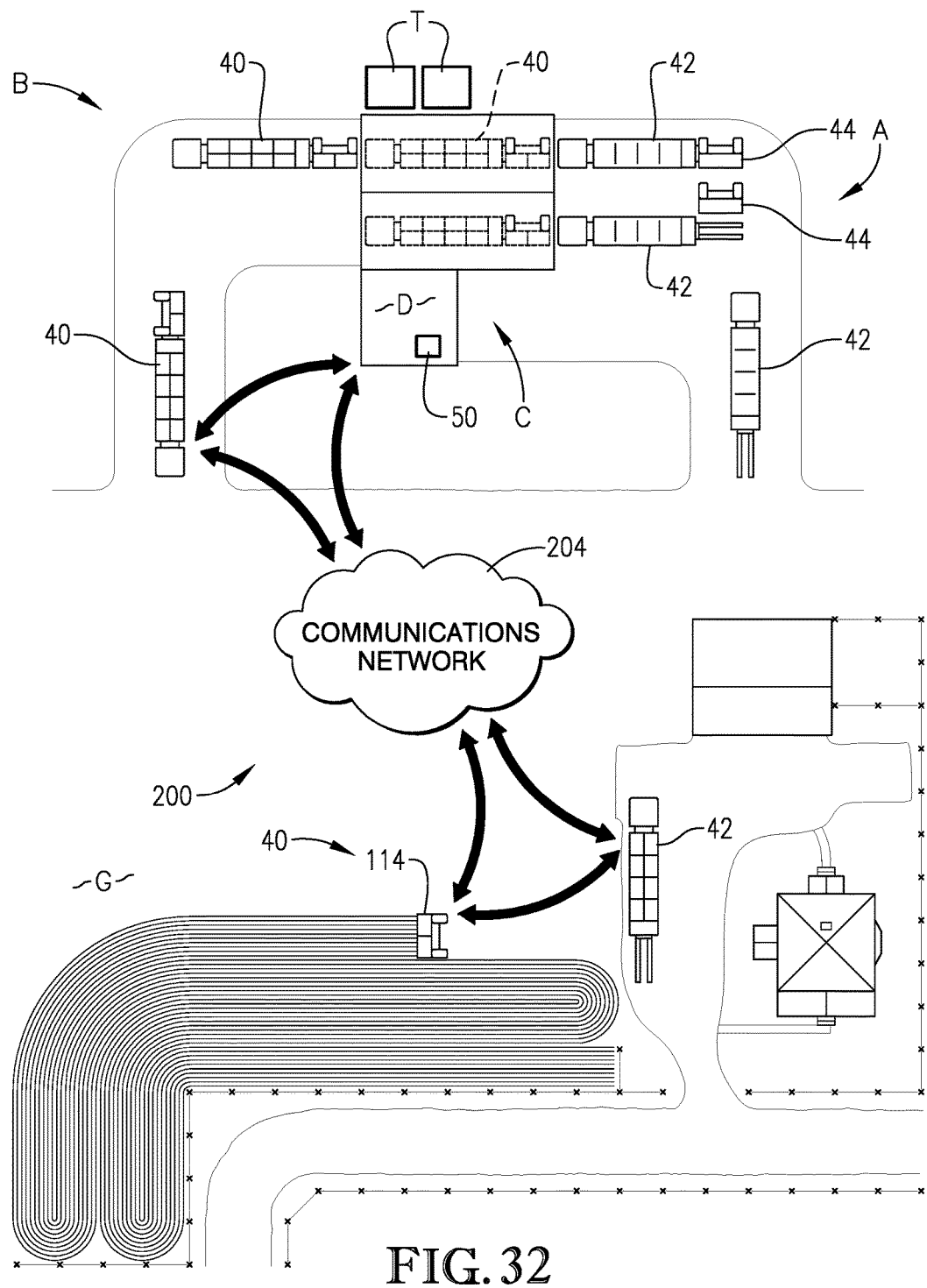
Figure 33:
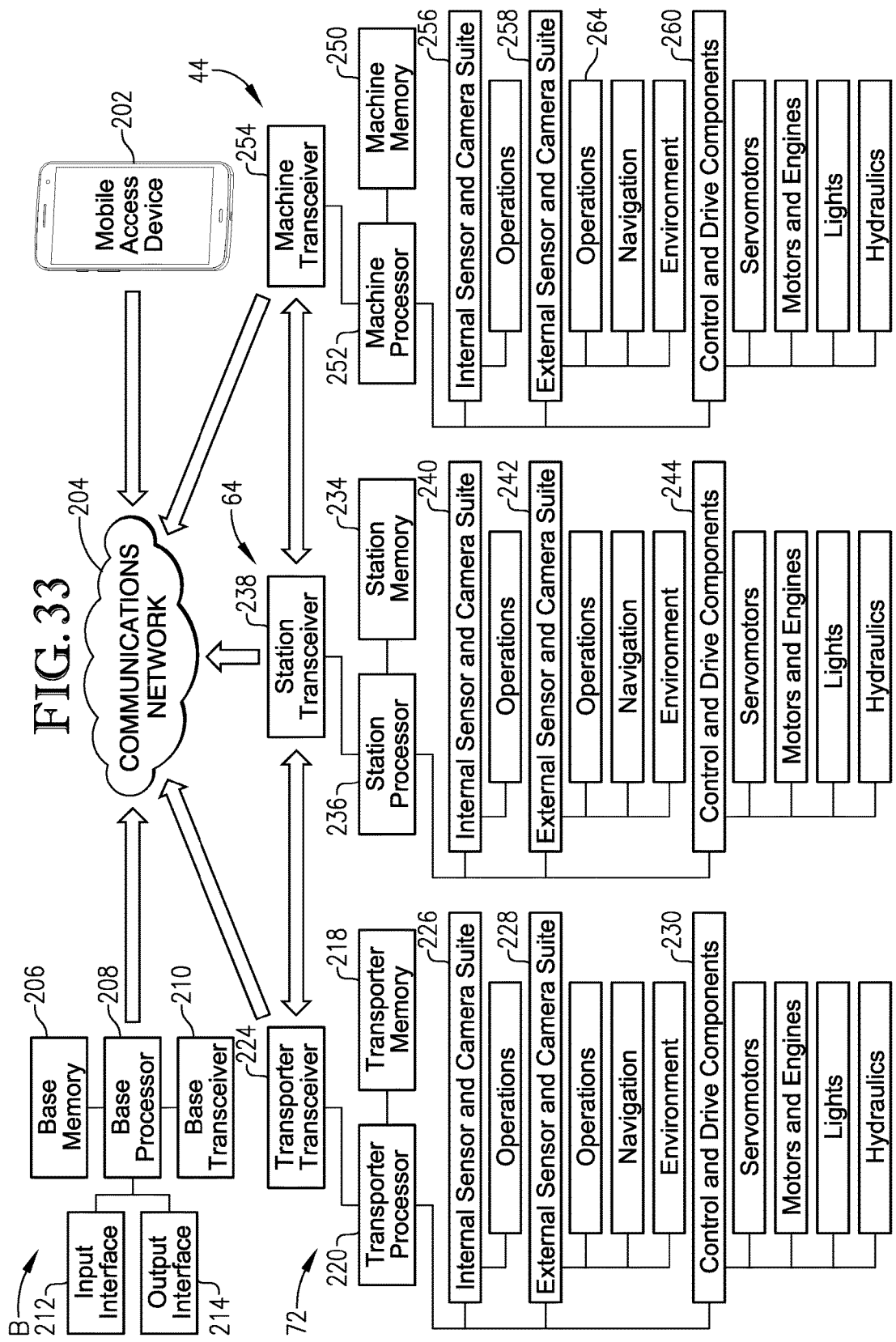
Figure 34:
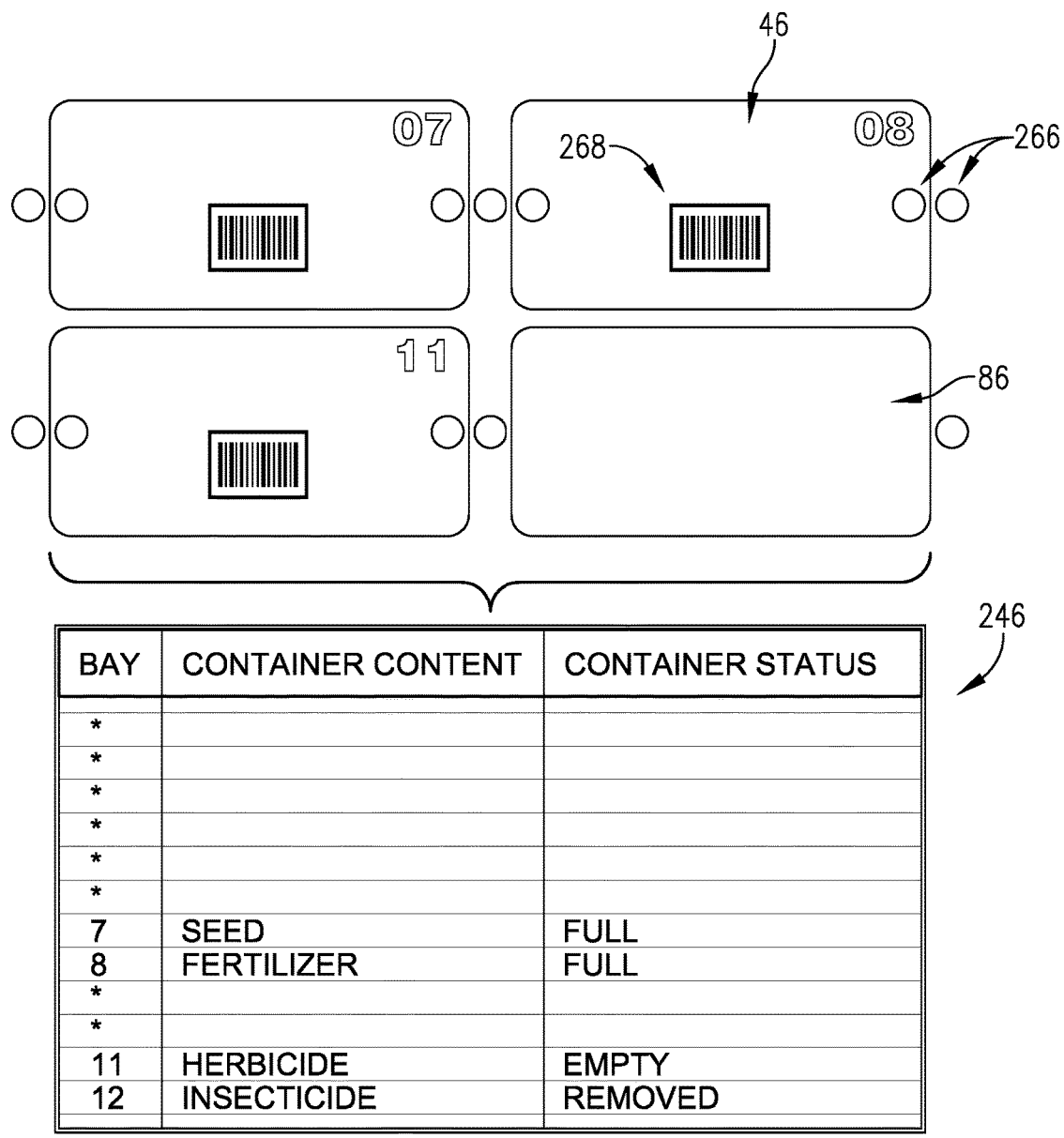
Figure 35:
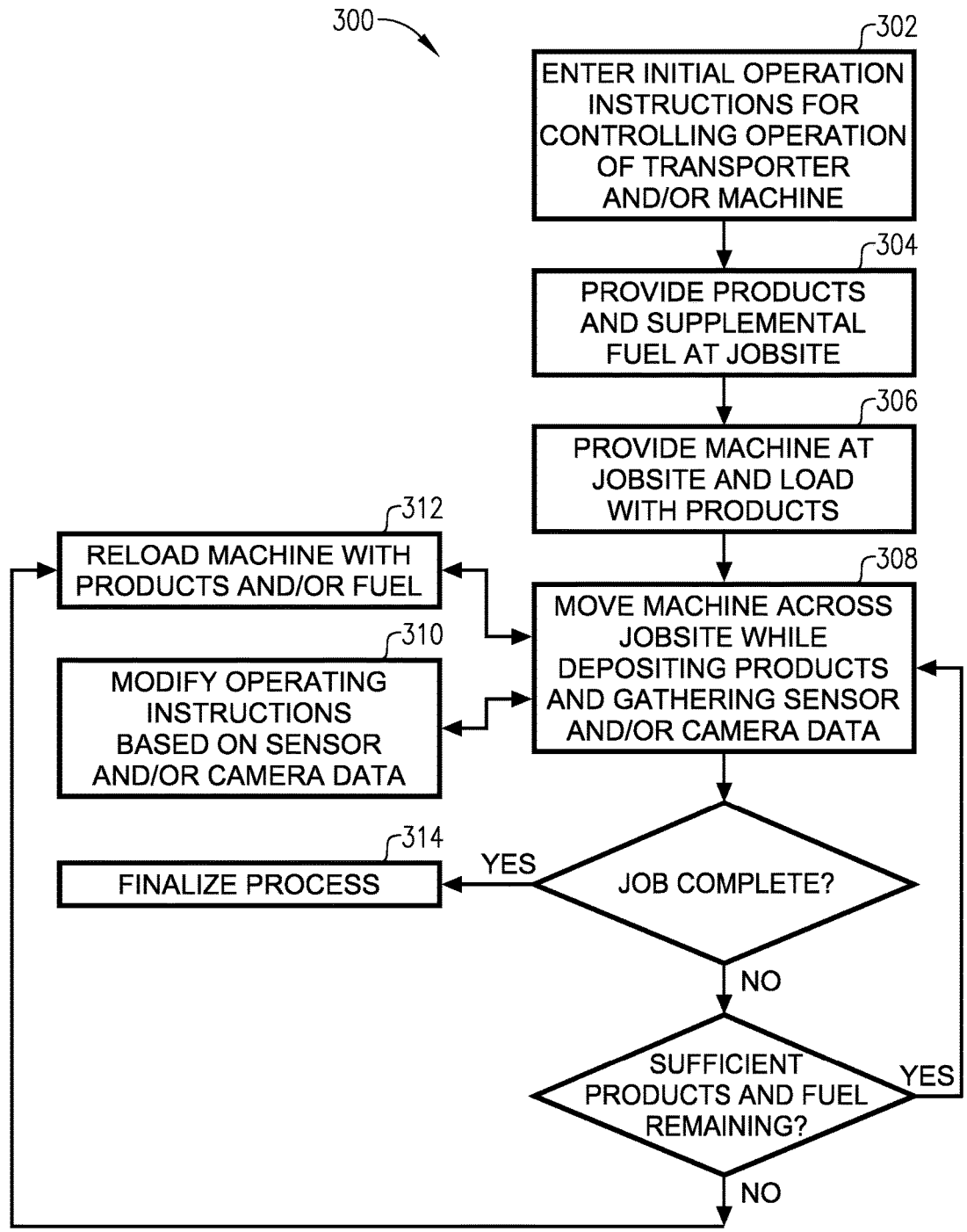
Figure 36:
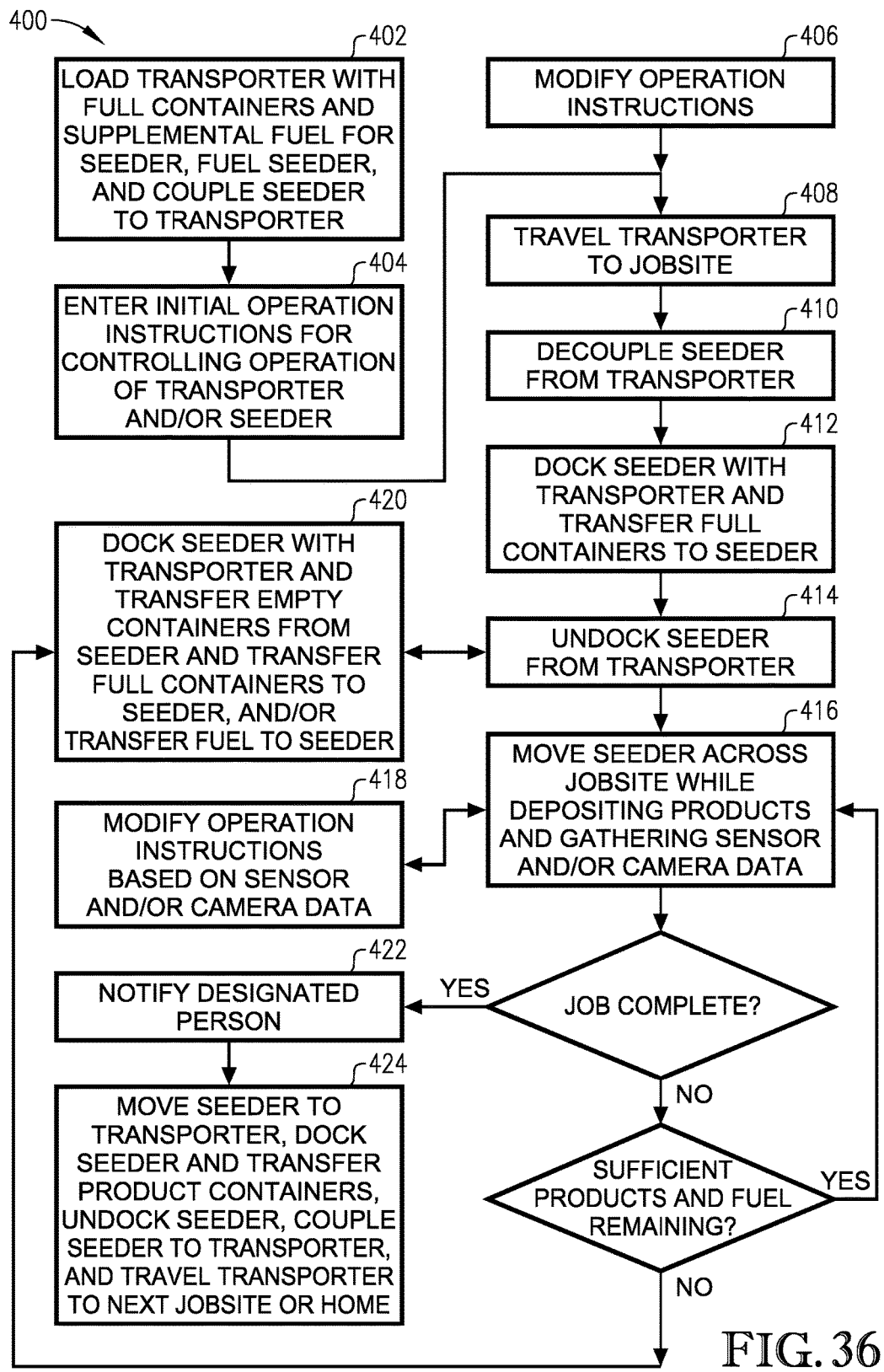
Figure 37:
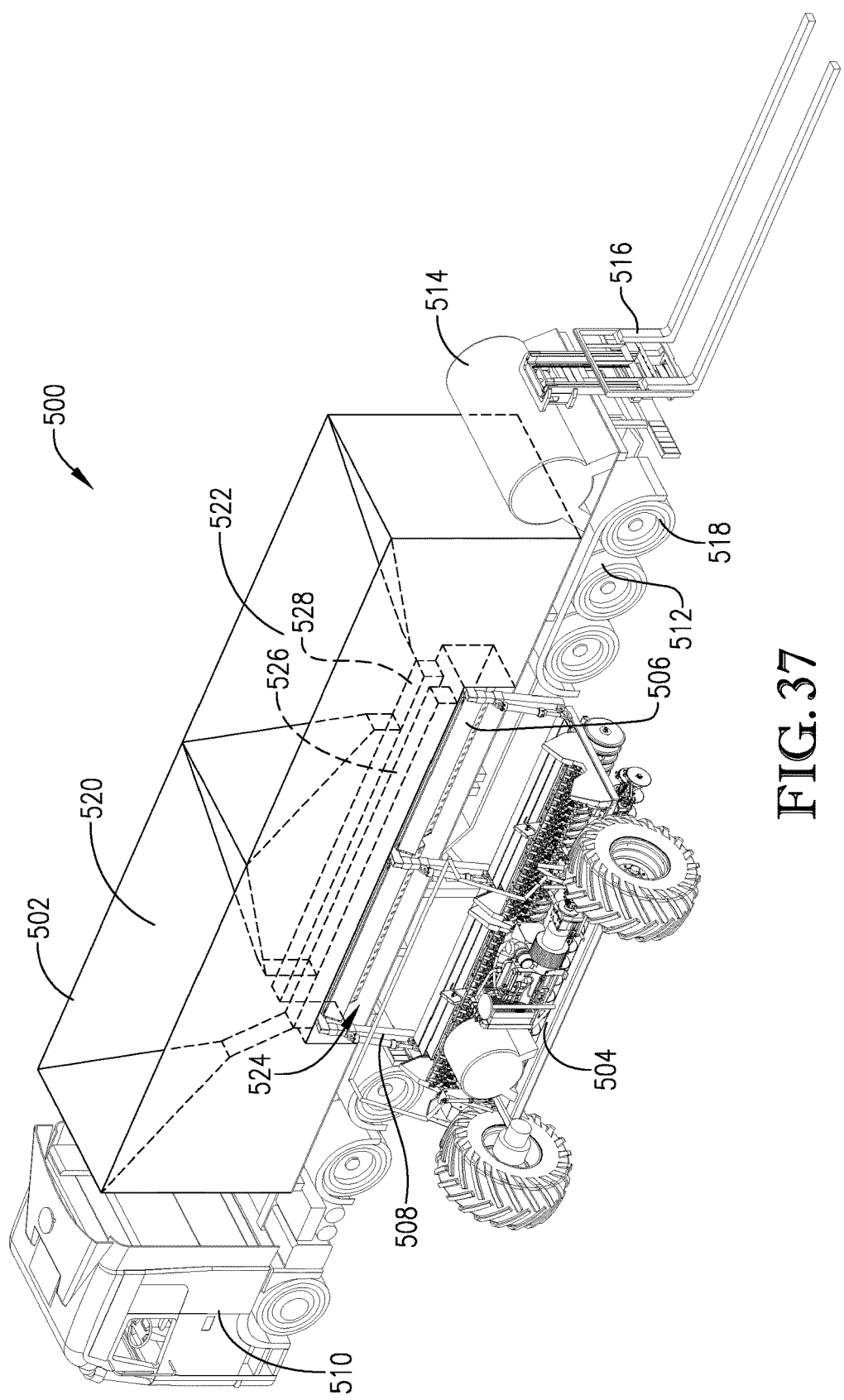

FIG. 31A is a fragmentary perspective of the agricultural system shown in FIGS. 1-6, showing one of the product containers supported on the trailer in the stored position where the lugs are secured in support connectors of the rack assembly, and showing the transfer arms of the transfer mechanism extended adjacent to the container, with the transfer arms including arm connectors configured to engage the lugs of the container;

FIG. 31B is a fragmentary perspective of the agricultural system similar to FIG. 31A, but showing the arm connectors in engagement with the lugs and the container raised from the stored position by the transfer arms, with the lugs being received by the support connectors;

FIG. 31C is a fragmentary perspective of the agricultural system similar to FIG. 31B, but showing the container shifted by the transfer arms so that the lugs and the support connectors are detached from each other;

FIG. 32 is a fragmentary plan view of an example agricultural operating environment that includes an operations base and a field;

FIG. 33 is a high-level block diagram of an embodiment of a control system for autonomously applying a product to a jobsite using an autonomous machine, including transferring a product container between a station and the autonomous machine;

FIG. 34 is an elevation view of the product containers on the station of FIG. 33, and a depiction of a corresponding data table for the product containers;

FIG. 35 is a flowchart of steps in an embodiment of a computer-implemented control method for autonomously applying a product to a jobsite using an autonomous machine, including transferring a product container between a station and the autonomous machine, wherein the control method may correspond to the functionality of the control system of FIGS. 33 and 34;

FIG. 36 is a flowchart of steps in an example implementation of the computer-implemented control method of FIG. 35; and FIG. 37 is a perspective of an agricultural system constructed in accordance with a second preferred embodiment of the present invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1-6 and 32, a system 40 is configured to dispense one or more products within a field G or similar jobsite. The depicted field G is an agricultural crop field that can be cultivated and maintained in various ways to grow a variety of crops. In the usual manner, such crops may be harvested to produce grain, hay for forage, or for other purposes. Therefore, according to the illustrated embodiment, the system 40 is particularly suited for agricultural operations.

It is also within the ambit of the present invention where the system 40 is deployed to dispense products along another jobsite or property (for agricultural or other purposes). For example, the system 40 could be configured to dispense agricultural products in an uncultivated property area, such as a pasture or a commercial property with an undeveloped area.

In preferred embodiments, operation of the system 40 can be initiated from the operations base B, which is located remotely from the field G (see FIG. 32). It will also be appreciated that the system 40 can be operated in multiple fields without departing from the ambit of the present invention.

Broadly, the agricultural system 40 includes components that enable one or more agricultural products to be autonomously distributed along the field G. However, as will be described in further detail, some aspects of using the system 40 could be conducted manually.

The agricultural system 40 preferably includes an agricultural product supply station 42, an autonomous agricultural machine 44, product containers 46, and a powered transfer mechanism 48, as described below. As will also be explained below, the agricultural system 40 also preferably includes a control system for facilitating the use of the machine 44, product containers 46, and transfer mechanism 48 to dispense one or more products to the field G or another jobsite.

The system 40 is preferably operable to dispense one or more agricultural products in particulate form. More preferably, the illustrated system 40 dispenses seed S and/or particulate fertilizer F from a container 46 (see FIGS. 12 and 13) to the field G. However, as will be explained, the system 40 could be configured, additionally or alternatively, to dispense one or more agricultural products in other forms (such as a gel, liquid, and/or gaseous form).

Operations Base

Turning to FIG. 32, the operations base B comprises a base station for storing, loading, unloading, and controlling one or more supply stations 42 for operation in the field G. The base B preferably includes a staging area A to hold a plurality of agricultural systems 40 (each system 40 including a supply station 42, machine 44, containers 46, and transfer mechanism 48).

The illustrated base B also includes a central control facility C having a building D and a central computer 50 operable to communicate with the systems 40.

Furthermore, the base B may include product storage tanks T to store agricultural product in bulk and loading equipment to load product from the tanks T to the containers 46.

As will be described in greater detail below, the central computer 50 is configured to operate a management computer program for initiating, monitoring, or otherwise managing operation of the supply station 42 and/or the machine 44.

However, it is within the ambit of the present invention where the base B has an alternative configuration. For instance, the staging area A, facility F, and/or tanks T could be alternatively configured to store, load, unload, or control the systems 40, or may be eliminated altogether.

In other embodiments within the scope of the present invention, the systems 40 could be used without one or more aspects of the illustrated operations base B. For instance, one or more systems 40 could be operated without the use of the central computer 50.

Supply Station

Again, the agricultural system 40 is configured to dispense agricultural product within the field G and preferably includes the agricultural product supply station 42, autonomous agricultural machine 44, product containers 46, and the powered transfer mechanism 48.

Turning again to FIGS. 1-6 and 32, the supply station 42 and product containers 46 cooperatively provide a mobile agricultural product dispensing system 52. The illustrated supply station 42 is preferably configured to transport itself, the product containers 46, and the machine 44 between the base B and the field G. The dispensing system 52 is also configured to supply the machine 44 with product containers 46 for dispensing product, as will be described further. The supply station 42 preferably includes a tractor truck 54, a towed trailer 56, a rack assembly 58, a fuel system 60, and a machine coupling assembly 62.

As will be discussed below, particularly concerning the control system and method of the present invention, the trailer 56, rack assembly 58, product containers 46, and the fuel system 60 cooperatively provide a docking station 64 configured to be transported to the field G or to another location.

Turning to FIGS. 20-25, the tractor truck 54 and towed trailer 56 preferably comprise a conventional tractor-trailer vehicle that is configured for commercial over-the-road transport. In the usual manner, the tractor truck 54 includes a wheeled chassis 66, a cab 68, a combustion engine (not shown) or other power source, and a drive train (not shown) to direct power from the engine to the wheels of the chassis 66 (see FIG. 20).

The towed trailer 56 preferably comprises a conventional flat-bed trailer configured to be towed behind the truck 54. The trailer 56 comprises a wheeled chassis that includes a trailer deck 70 to support the rack assembly 58. The trailer 56 also presents a longitudinal station axis A1 (see FIG. 24) and is configured to be advanced in a trailer forward direction D1 that corresponds to the longitudinal station axis A1 (see FIG. 24).

Figure 20:
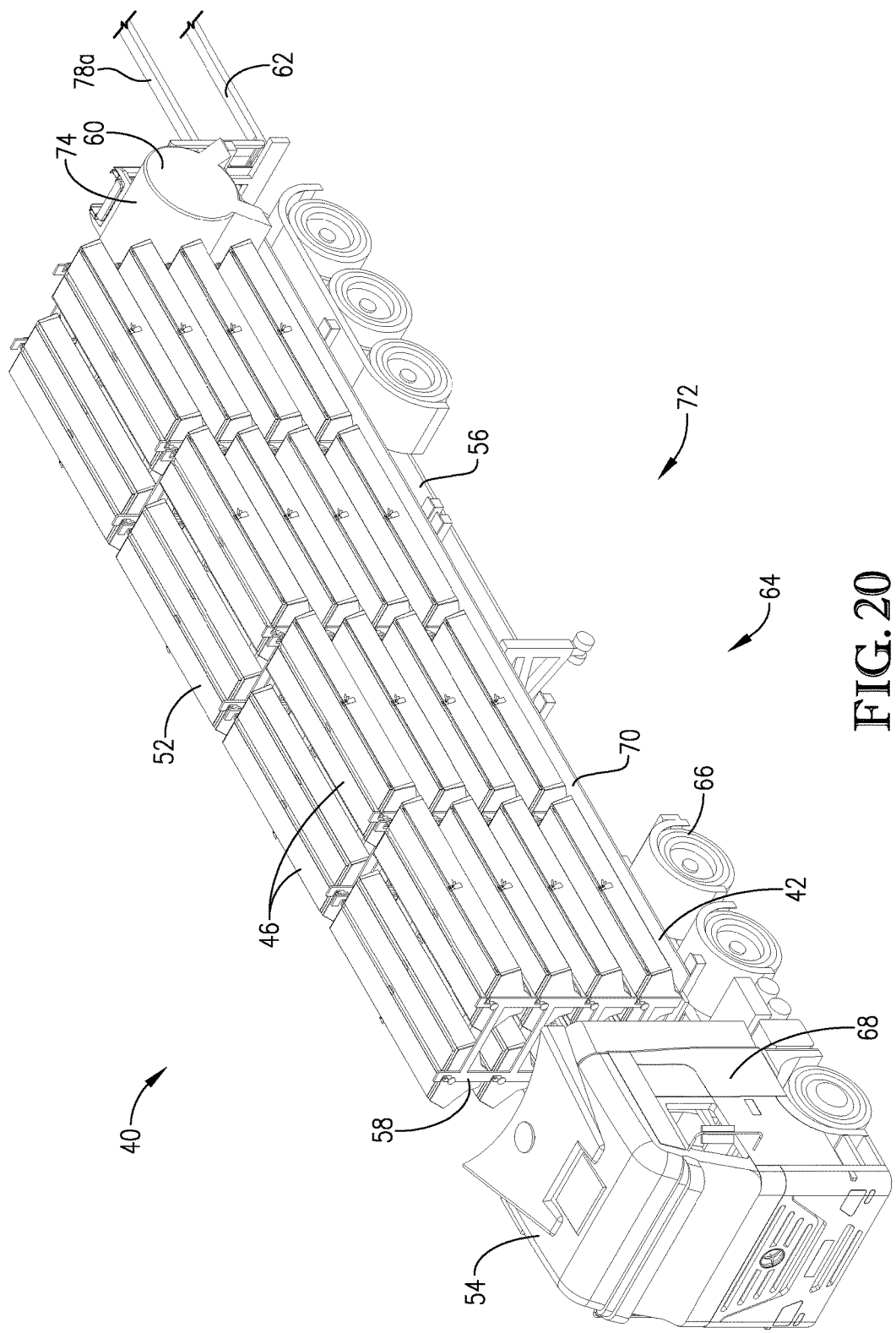
FIG. 20 is a fragmentary front perspective of the agricultural system shown in FIGS. 1-6, showing the supply station and product containers stored on the supply station, with the supply station including a truck, a towed trailer, the lift mechanism, a fuel system, and a rack assembly.
Figure 21:
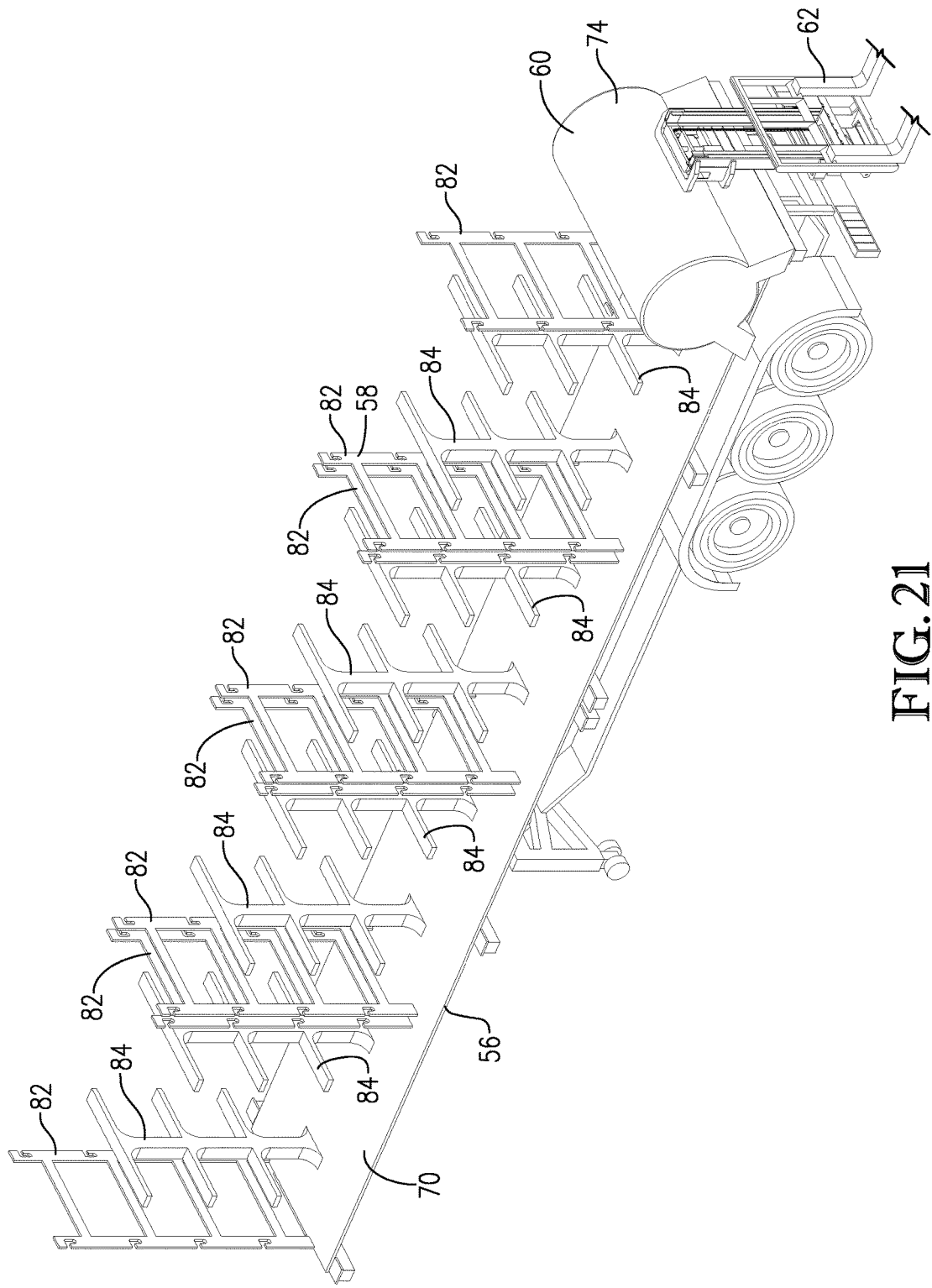
FIG. 21 is a fragmentary rear perspective of the supply station similar to FIG. 20, but with the product containers being removed from the supply station to depict the rack assembly mounted on the trailer and to depict bays defined by the rack assembly to receive product containers.
Figure 22:
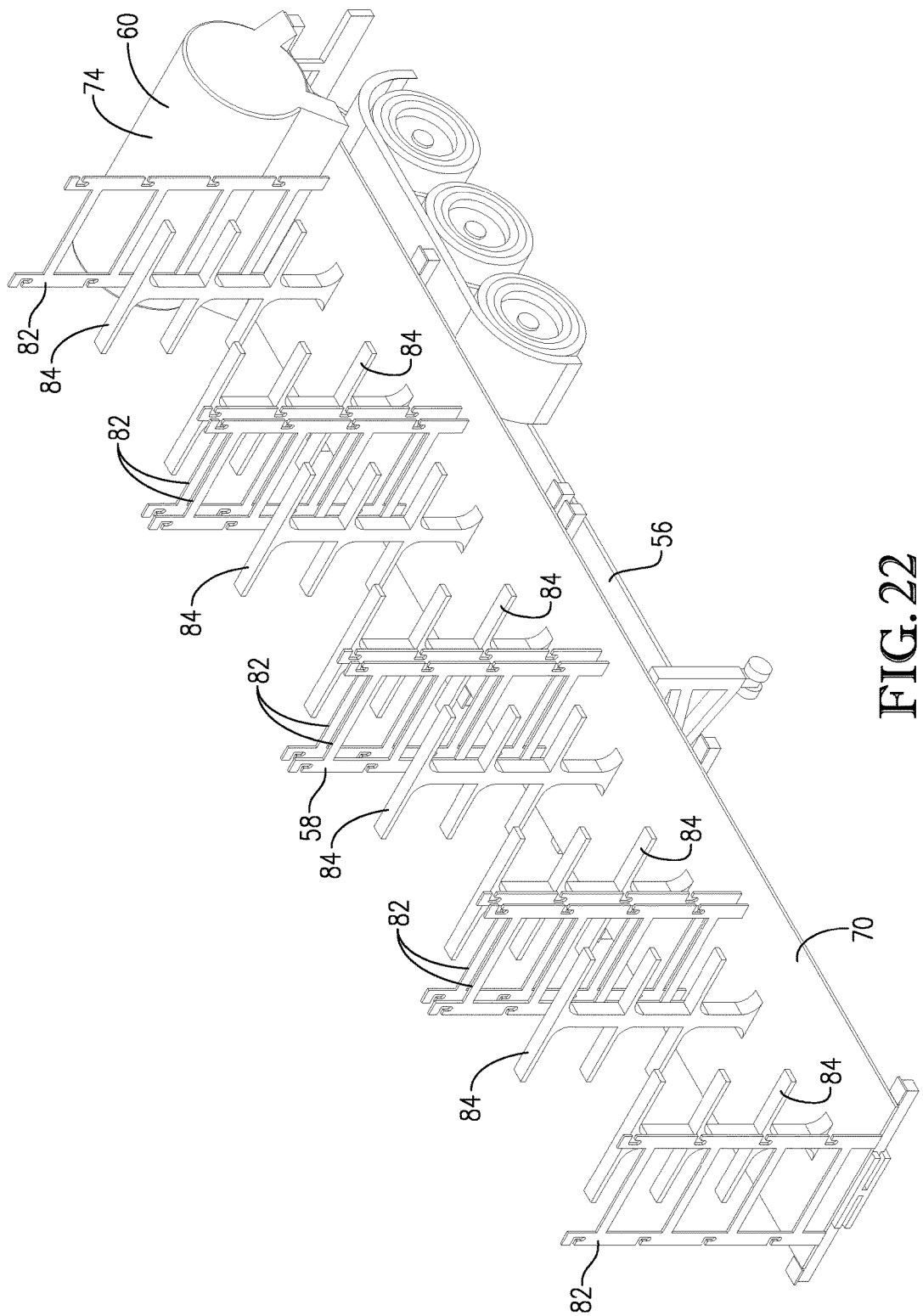
FIG. 22 is a fragmentary front perspective of the supply station as shown in FIG. 21.

It will also be appreciated that the tractor truck 54, the towed trailer 56, and the coupling assembly 62 cooperatively provide a self-powered transporter 72 (see FIG. 20). As will be discussed below, particularly concerning the control system and method of the present invention, the transporter 72 preferably delivers the docking station 64 and the machine 44 to the field G or to another location.

Figure 26:
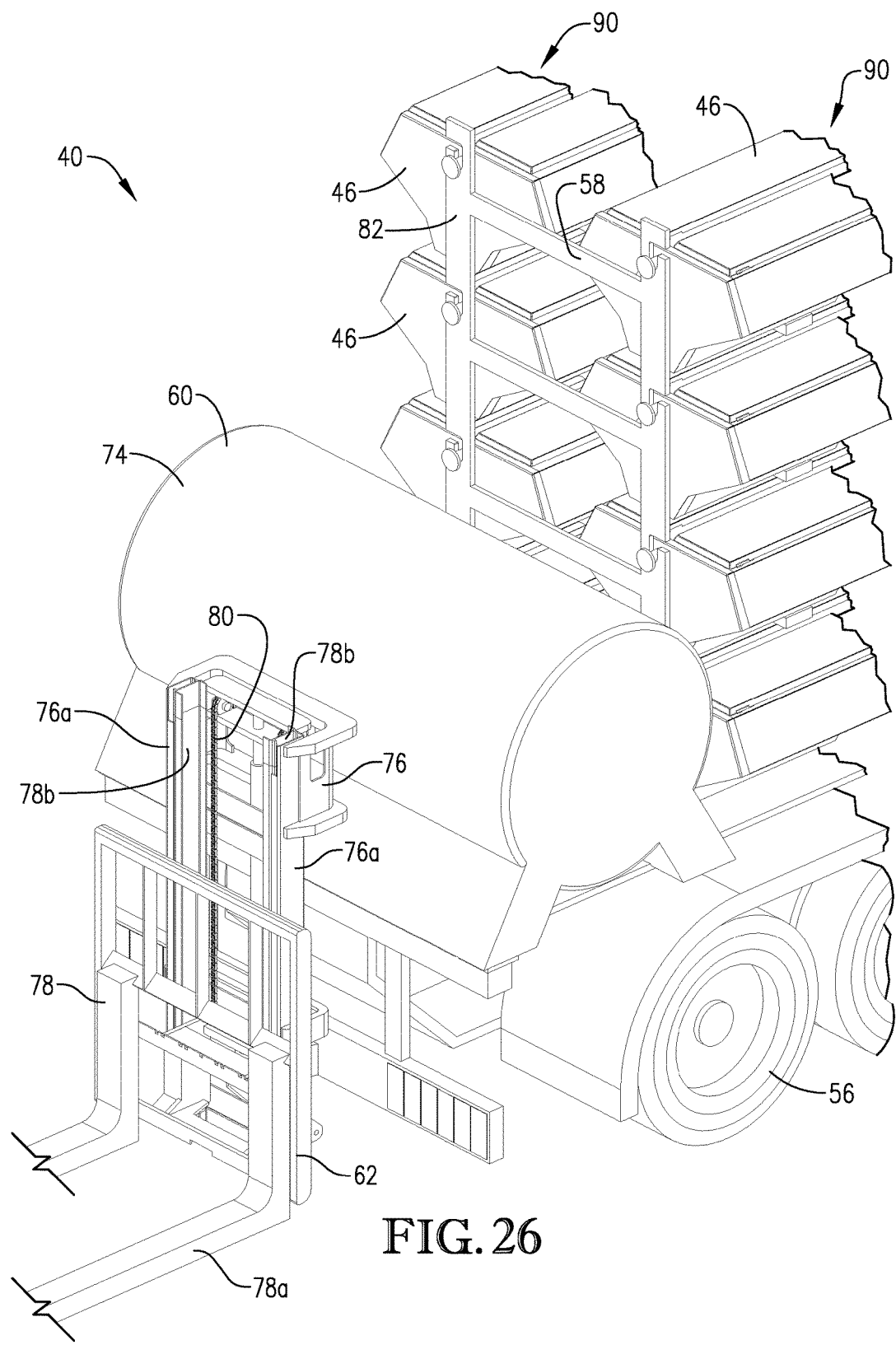
FIG. 26 is an enlarged fragmentary rear perspective of the supply station shown in FIGS. 23-25, showing the lift mechanism in a lowered position to permit coupling and uncoupling of the machine to the lift mechanism, with the lift mechanism including a mast, a fork assembly, and a drive to shift the fork assembly vertically along the mast.
Figure 27:
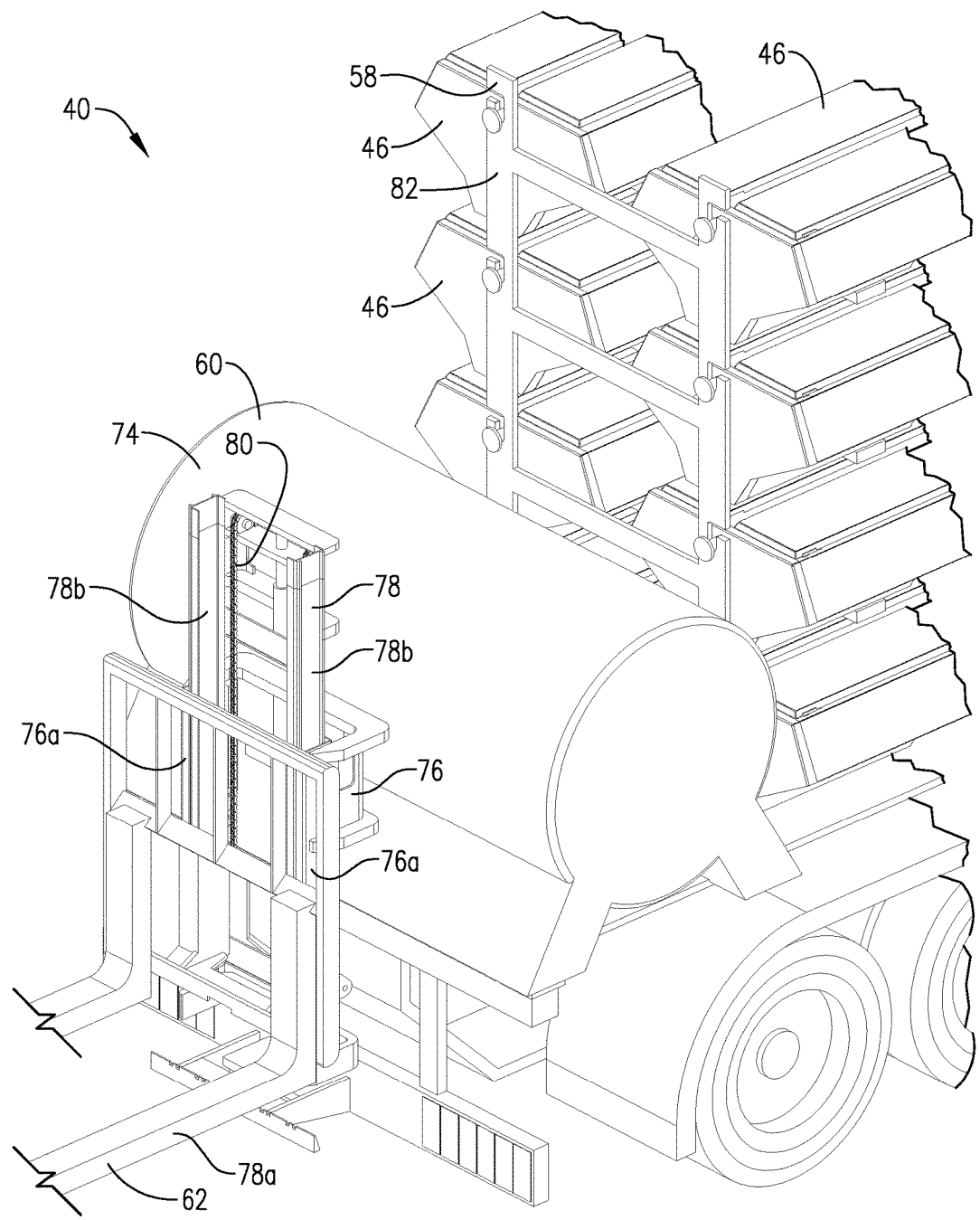
FIG. 27 is an enlarged fragmentary rear perspective of the supply station similar to FIG. 26, but showing the lift mechanism shifted into an elevated position where the fork assembly is spaced above the ground.
Figure 28:
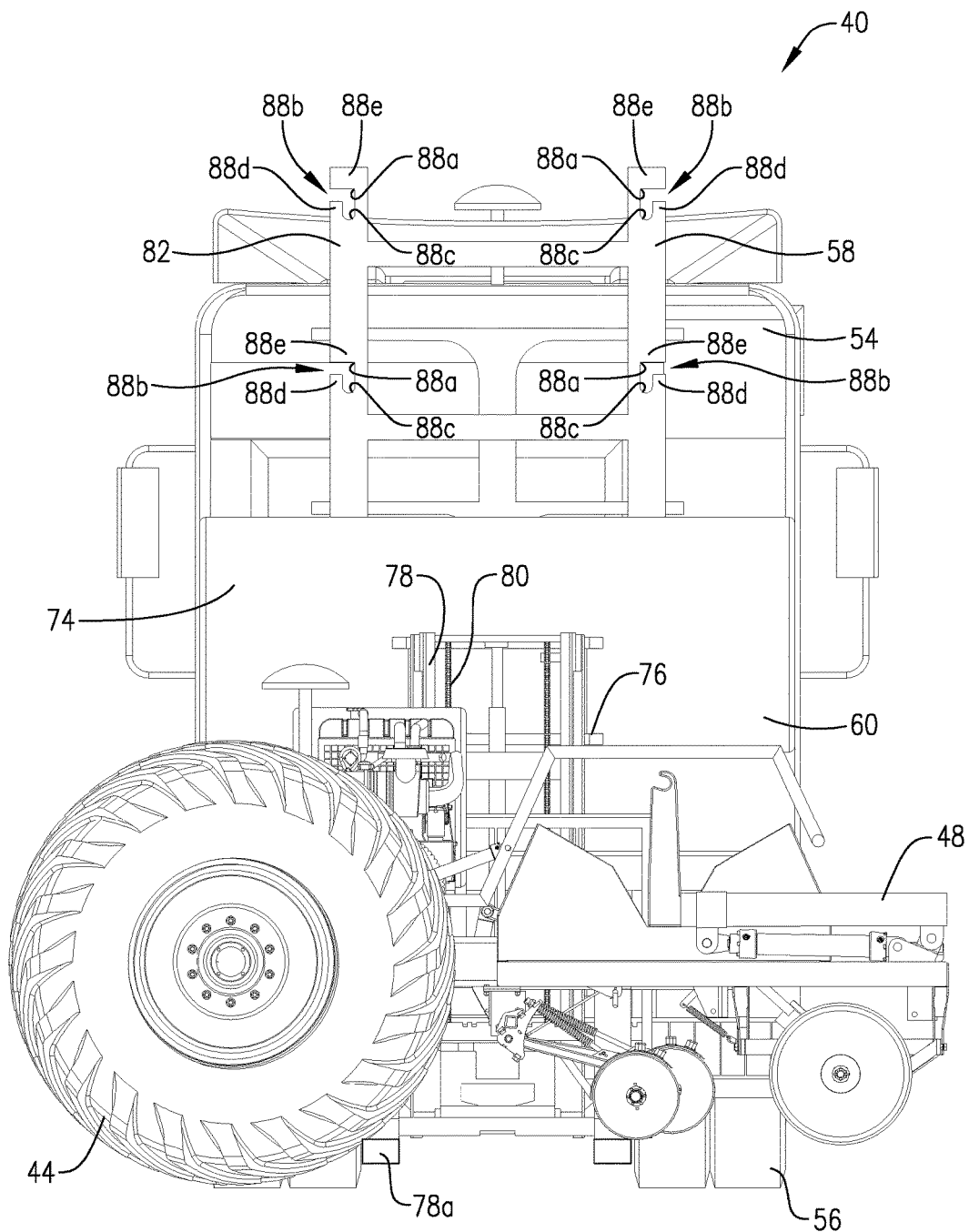
FIG. 28 is a fragmentary end elevation of the supply station shown in FIGS. 23-26, showing the machine coupled to and supported by the lift mechanism.

The fuel system 60 is conventional and includes a fuel tank 74 that provides a supply of liquid fuel for the machine 44 (see FIG. 26). The fuel system 60 also includes a hose (not shown) and pour nozzle (not shown) to dispense fuel from the fuel tank 74. It will be understood that the fuel system 60 could be variously configured to supply fuel to the machine 44, either manually or autonomously.

It is also within the ambit of the present invention where the machine 44 is provided with an alternative type of fuel. For instance, where the machine 44 is entirely battery powered, the fuel system could comprise an electric recharging station configured to recharge the batteries of the machine.

In some embodiments, the supply station could be provided without a fuel system. For instance, the machine 44 could be driven to another location that has a refueling station.

Turning to FIGS. 26-30, the disclosed coupling assembly 62 is configured to removably secure the machine 44 to the supply station 42 so that the machine 44 can be transported by the supply station 42. In the illustrated embodiment, the coupling assembly 62 preferably comprises a lift device that includes a mast 76, a fork assembly 78, and a fork lift drive 80.

The mast 76 supports the fork assembly 78 for sliding up and down movement relative to the ground. The mast 76 preferably includes a pair of opposed mast uprights 76a that slidably receive the fork assembly 78 (see FIGS. 26 and 27). The illustrated mast 76 is preferably mounted at the rear end of the towed trailer 56. However, the mast 76 could be alternatively positioned and/or supported relative to the trailer 56.

The fork assembly 78 includes a fork structure 78a and a framework with a pair of fork uprights 78b. The fork structure 78a comprises a pair of beams attached to the framework and spaced apart from each other. The fork assembly 78 is mounted on the mast 76 so that the fork structure 78a extends rearwardly of the mast 76. The fork uprights 78b are slidably received by mast uprights 76a to permit relative up-and-down sliding movement between the mast 76 and fork assembly 78.

Figure 1:
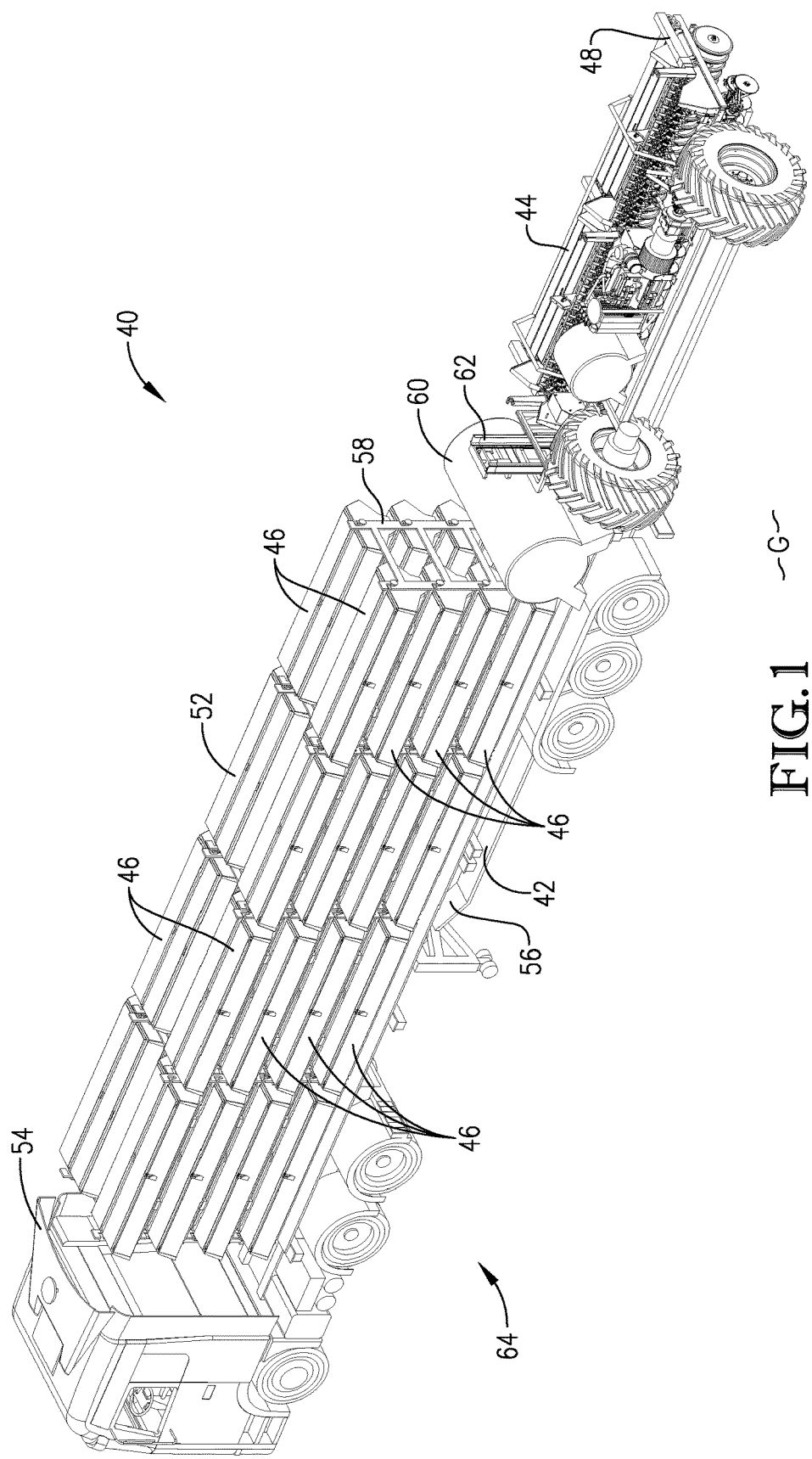
Figure 2:
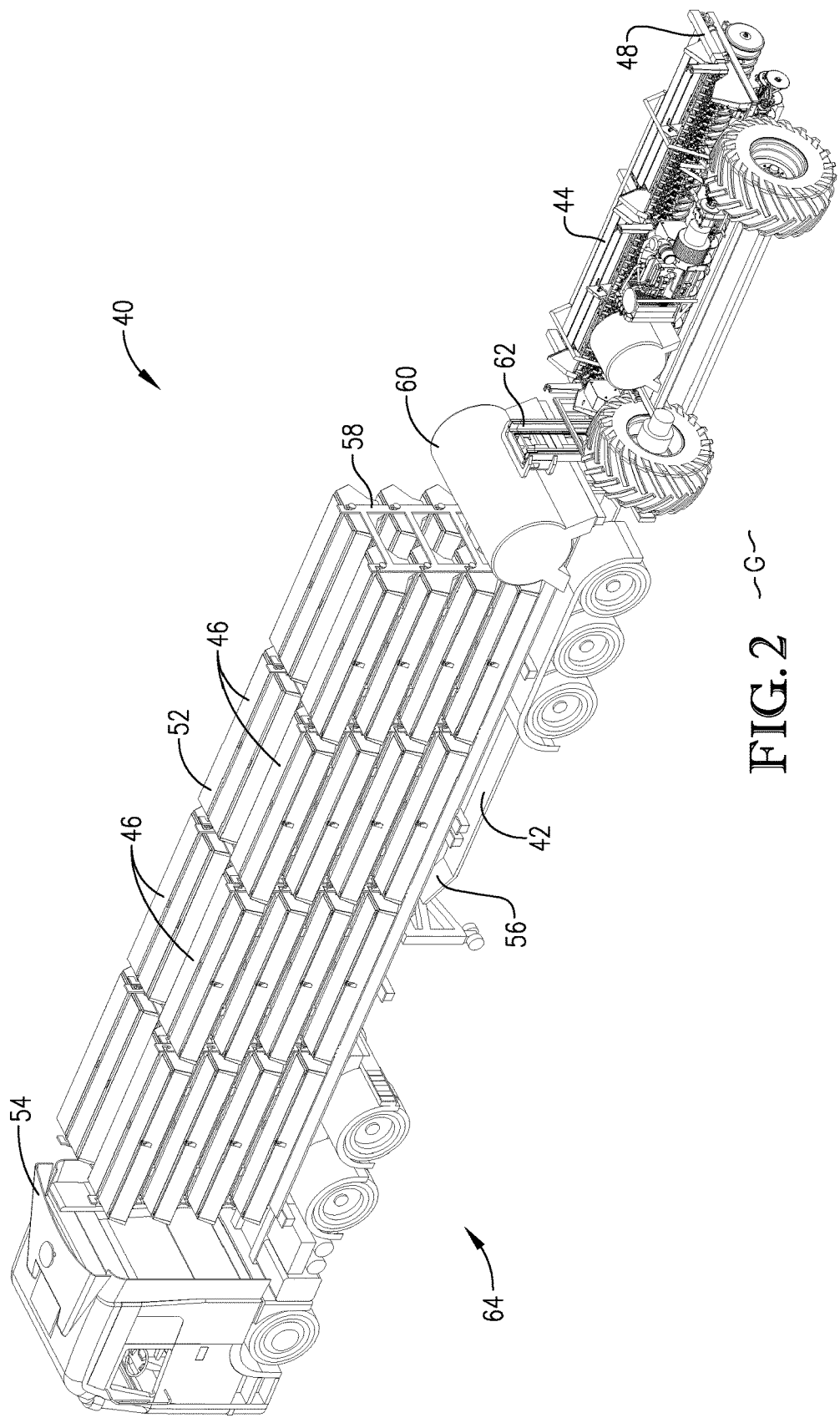
FIG. 2 is a rear perspective of the agricultural system similar to FIG. 1, but showing the machine lowered to the ground by a lift mechanism of the supply station.
Figure 29:
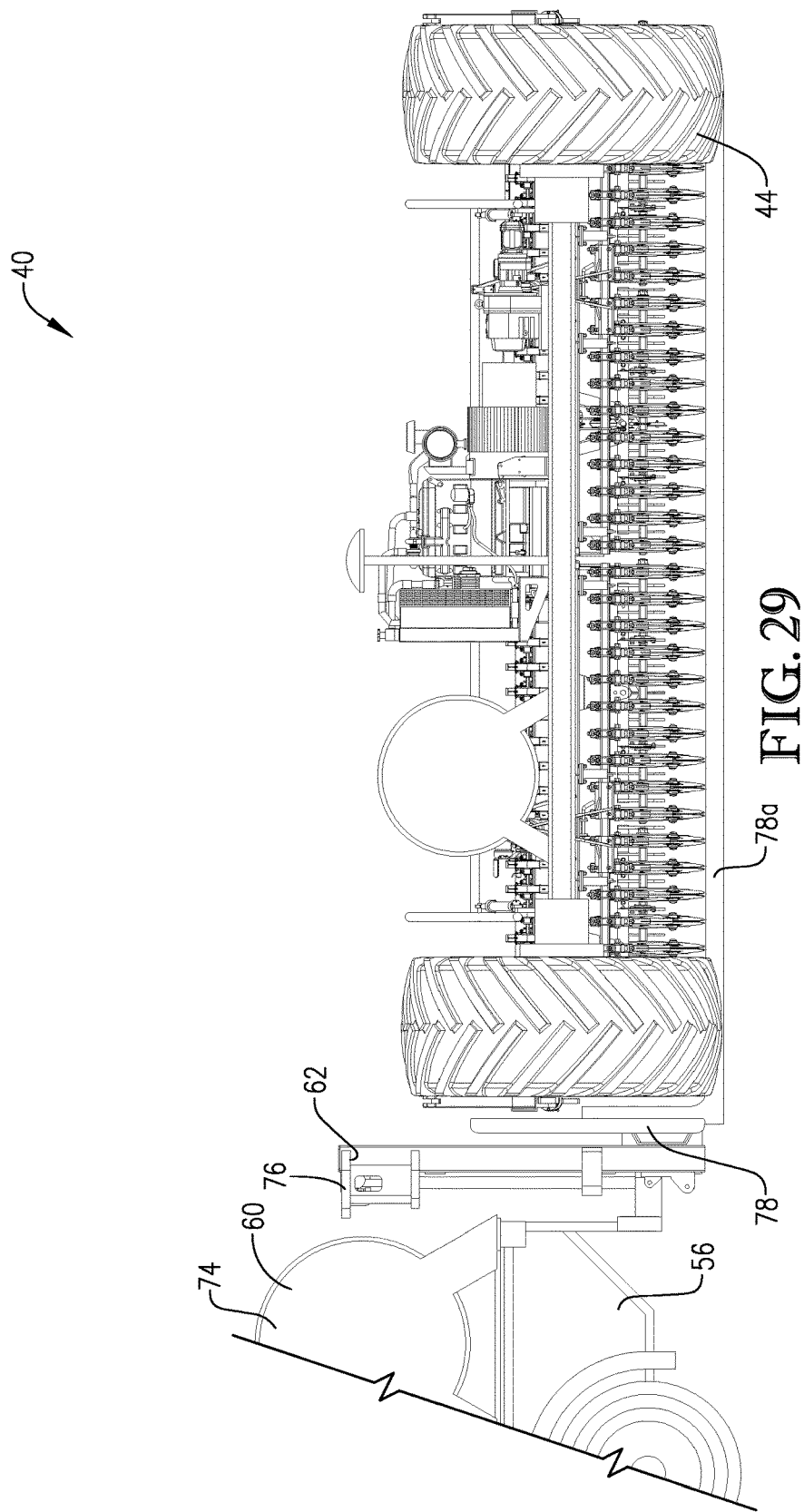
FIG. 29 is a fragmentary side elevation of the supply station shown in FIG. 26, showing the lift mechanism in the lowered position, with the machine positioned on the fork assembly.

The drive 80 is operably mounted on the mast 76 and is connected to the fork assembly 78 to move the fork assembly 78 vertically between a raised position (see FIGS. 1, 27, and 30) and a lowered position (see FIGS. 2, 26, and 29).

Although the depicted coupling assembly 62 is preferred, an alternative coupling mechanism could be used to secure the machine 44 to the supply station 42 for transport without departing from the scope of the present invention. For example, the supply station 42 could include a powered overhead crane with a single crane arm to lift and secure the machine 44 in a position supported by the trailer 56 for transport with the trailer 56.

In another alternative embodiment, the supply station 42 could include a powered winch (or similar powered mechanism) to both lift and secure the machine 44. The powered winch embodiment could include one or more steel cables that removably and adjustably secure the machine 44 to the trailer.

Furthermore, for some aspects of the present invention, the supply station 42 could be devoid of a coupling mechanism to removably secure the machine to the supply station for transport therewith. For instance, in some alternative embodiments, the machine could drive itself to and from the field G (e.g., where the operations base is close to the field).

Turning to FIGS. 20-28 and 31A-31C, the rack assembly 58 is mounted on the trailer 56 to removably support the product containers 46. As will be described, the rack assembly 58 is constructed to allow automated insertion and removal of the containers 46 relative to the rack assembly 46 by the transfer mechanism 48.

In the illustrated embodiment, the rack assembly 58 preferably includes a series of upright supports 82 spaced longitudinally from one another along the length of the trailer 56. The rack assembly 58 also includes dividers 84 located between corresponding pairs of supports 82. Preferably, the supports 82 and dividers 84 cooperatively define a plurality of bays 86 that receive the containers 46 (see FIGS. 23-25). In the depicted embodiment, each bay 86 is preferably configured to receive a single one of the containers 46, although alternative configurations are within the ambit of certain aspects of the present invention. The transfer mechanism 48 is configured to insert and remove containers 46 relative to the bays 86. In the preferred embodiment, the transfer mechanism 48 is configured to move the containers 46 between the bays 86 and discrete docking positions P1-P4 (see FIG. 24) located laterally outboard of the corresponding bays 86.

Figure 25:
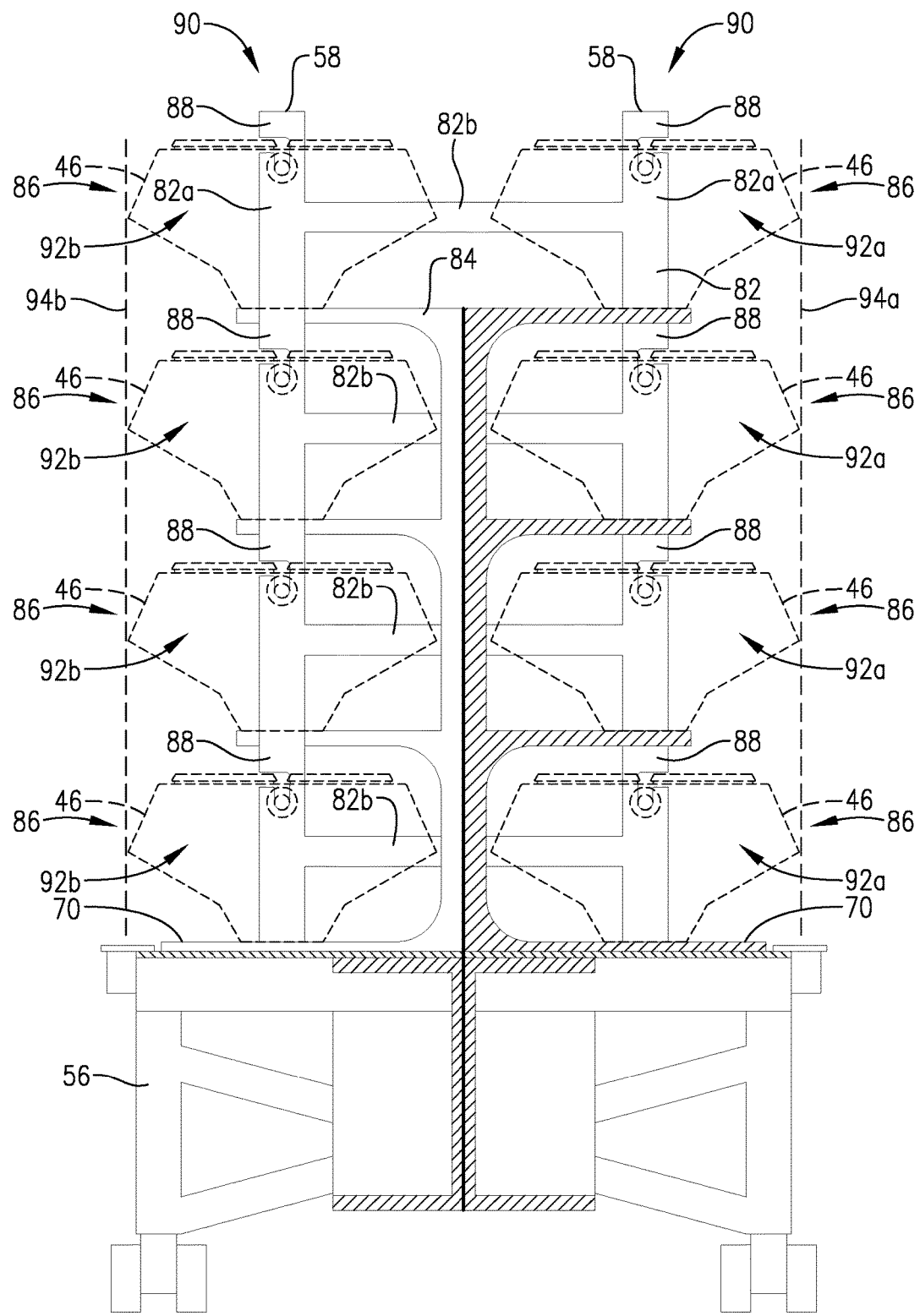
FIG. 25 is a fragmentary cross section of the supply station taken along line 25-25 in FIG. 24.

In the illustrated embodiment, each support 82 has a unitary construction and includes a pair of uprights 82a and cross members 82b (see FIG. 25). The uprights 82a are spaced laterally from each other and are connected by multiple cross members 82b (see FIG. 25).

Each support 82 preferably provides a series of connectors 88 for removable attachment to the containers 46, as will be explained below. The connectors 88 of the illustrated supports 82 preferably comprise female connectors that removably receive corresponding male connectors of the containers 46. Each connector 88 presents an L-shaped slot 88a that extends between an open throat 88b and a lowermost end 88c (see FIG. 28). The connector 88 includes opposed segments 88d,88e that cooperatively define the slot 88a (see FIG. 28).

It is also within the ambit of the present invention where the connectors 88 comprise male connectors, a combination of male and female connector elements, or hermaphroditic connector elements.

One of skill in the art will appreciate that the supports 82 could include various other alternative connector structures without departing from the scope of the present invention. For instance, in various alternative embodiments, the connector could also include a movable latch element to selectively open and close the throat of the connector (e.g., to prevent inadvertent removal of the corresponding male connector).

Again, the supports 82 and dividers 84 cooperatively define the plurality of container-receiving bays 86. In the depicted embodiment, the bays 86 are arranged in vertical columns 90 (see FIGS. 23-25). The depicted bays 86 are also spaced longitudinally along the station axis A1 to form longitudinal rows 92 of bays 86 arranged in pairs of right side rows 92a and left side rows 92b (see FIGS. 23-25). Preferably, each container 46 is operable to be removably supported by the rack assembly 58 in a corresponding one of the bays 86.

Again, the transfer mechanism 48 is configured to insert and remove containers 46 relative to the bays 86 from discrete docking positions P1-P4 located laterally outboard of the corresponding bays 86. The configuration of the transfer mechanism 48 preferably permits the bays 86 in each vertical column 90 to be accessed by the transfer mechanism 48 from a corresponding one of the docking positions P1-P4. Each docking position P1-P4 is located outboard of a respective one of the columns 90. In other words, containers 46 located in the four (4) columns 90 can be accessed by locating the machine 44 in a corresponding one of the four (4) docking positions P1-P4.

The rack assembly 58 also presents open faces 94a,b that communicate with the bays 86 and permit lateral container ingress and egress relative to the bays 86 (see FIG. 25). The open faces 94a,b are located on corresponding right hand and left hand sides of the station 42 and extend vertically and longitudinally (see FIG. 25). The left open face 94b communicates with the bays 86 forming the left side rows 92b, while the right open face 94a communicates with the bays 86 forming the right side rows 92a.

Contemplated within the scope of the present invention, the supply station could provide various alternative bay configurations. In alternative embodiments, the supply station could have columns and/or rows that are alternatively positioned relative to one another (e.g., where adjacent columns and/or adjacent rows are offset from one another). Also in alternative embodiments, bays of the supply station could be arranged and configured so that one or more bays can accommodate multiple container sizes and shapes (such bays could be similarly shaped or differently shaped). In alternative embodiments, multiple bays could be sized and shaped differently from each other, with each accommodating a respective container size and shape. It will also be appreciated that alternative bay configurations could be alternatively oriented (e.g., where the open faces are located in forward and rearward positions relative to the station axis rather than on opposite sides of the station).

It is within the ambit of the present invention where the supply station 42 comprises an alternative, self-powered, vehicle. For instance, although the depicted truck 54 and trailer 56 cooperatively provide a separable articulation joint (not shown) therebetween, the self-powered station could have a single continuous chassis that is devoid of a separable joint.

For some aspects of the present invention, the supply station could comprise only a trailer that is towed by another vehicle. Yet further, in some embodiments, the supply station could comprise another mobile structure (for instance, where the station includes the mobile rack assembly without including a rolling trailer chassis).

Interchangeable Product Containers

The product containers 46 are each configured to be removably stored by the supply station in a stored position (see FIGS. 20 and 23-26) and used interchangeably with the machine 44. Each container 46 is configured to contain one or more agricultural products and be operably coupled to the machine 44 so that the container 46 can dispense the product(s) to the machine 44.

The illustrated containers 46 are preferably operable to hold and dispense one or more agricultural products in particulate form. More preferably, containers 46 are configured to hold and dispense seed S and/or particulate fertilizer F within the field G. However, in various alternative embodiments, the containers could, additionally or alternatively, be constructed to hold and dispense one or more alternative agricultural products. Furthermore, the dispensed agricultural products could take one or more of various forms, such as a particulate, powder, gel, liquid, and/or gaseous form.

As will be described, each container 46 is shiftable between a machine-coupled position (see FIGS. 7-9 and 12) and various uncoupled positions (see FIGS. 10, 11, 13, and 16). In one uncoupled position, the container 46 is detached from the machine 44 and stored in one of the bays 86 in a stored position (see FIGS. 20 and 23-26). It will also be appreciated that the container 46 can be located in various uncoupled positions where the container 46 is not stored in one of the bays 86 (see FIGS. 10, 11, 13, and 16).

As will be discussed, the machine 44 has a machine chassis that supports the container 46 in the coupled position. The machine also includes metering assemblies that receive seed S and fertilizer F from the container 46.

Figure 12:
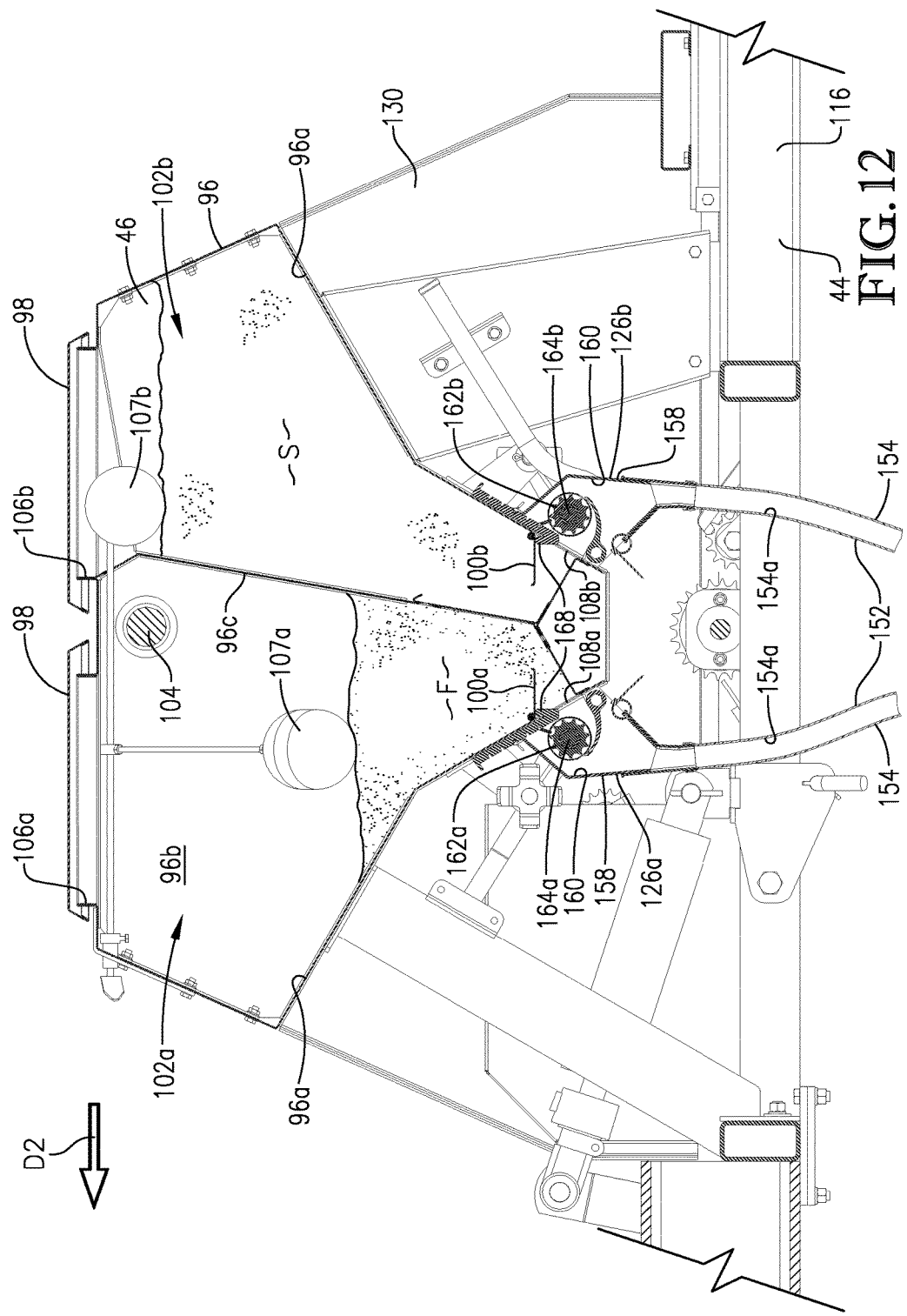
FIG. 12 is a fragmentary cross section of the implement shown in FIGS. 5-9, showing the product container coupled to the machine so that metering assemblies of the machine communicate with the container and receive agricultural product from the container, with the container including shiftable gates opened to allow product to flow out of the container.
Figure 13:
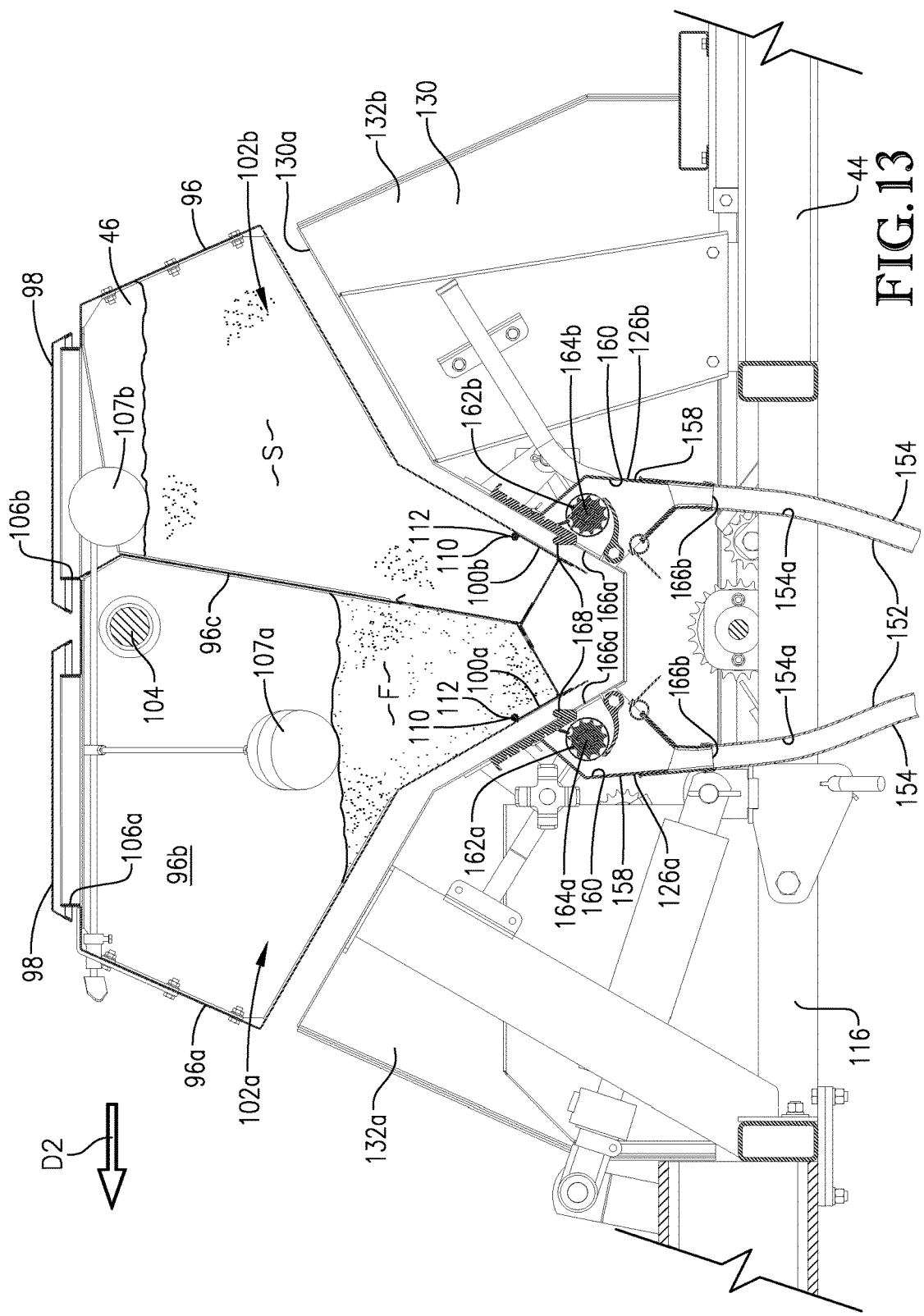
FIG. 13 is a fragmentary cross section of the implement similar to FIG. 12, but showing the product container lifted and uncoupled from the machine, with the gates of the container closed to restrict product from flowing out of the container.
Figure 14:
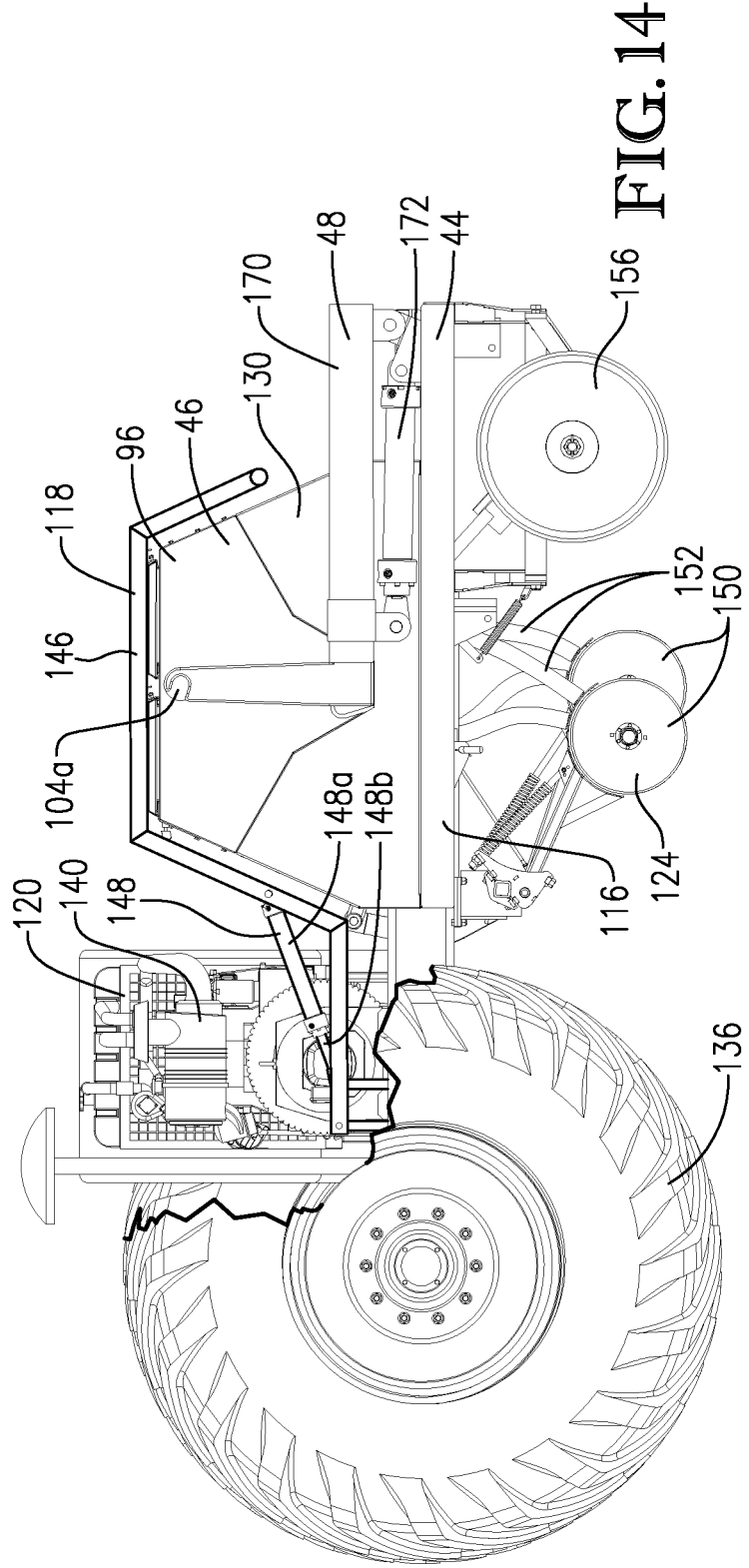
FIG. 14 is a fragmentary side elevation of the implement shown in FIGS. 5-9, showing the product container coupled to the machine and the securement device of the machine closed to restrict uncoupling of the product container, with the transfer mechanism in the folded position.
Figure 15:
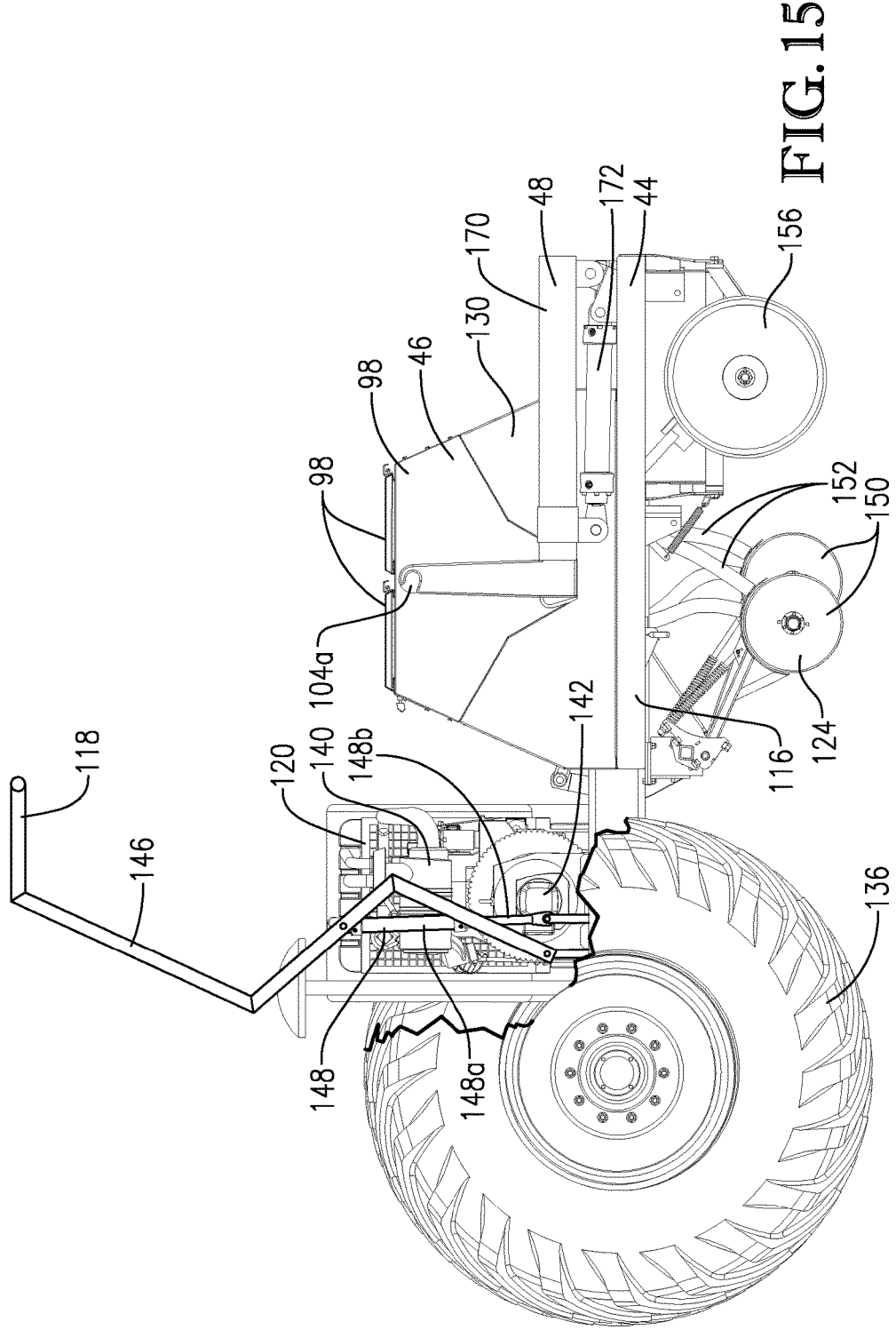
FIG. 15 is a fragmentary side elevation of the implement similar to FIG. 14, but showing the securement device opened to permit uncoupling of the product container.
Figure 19:
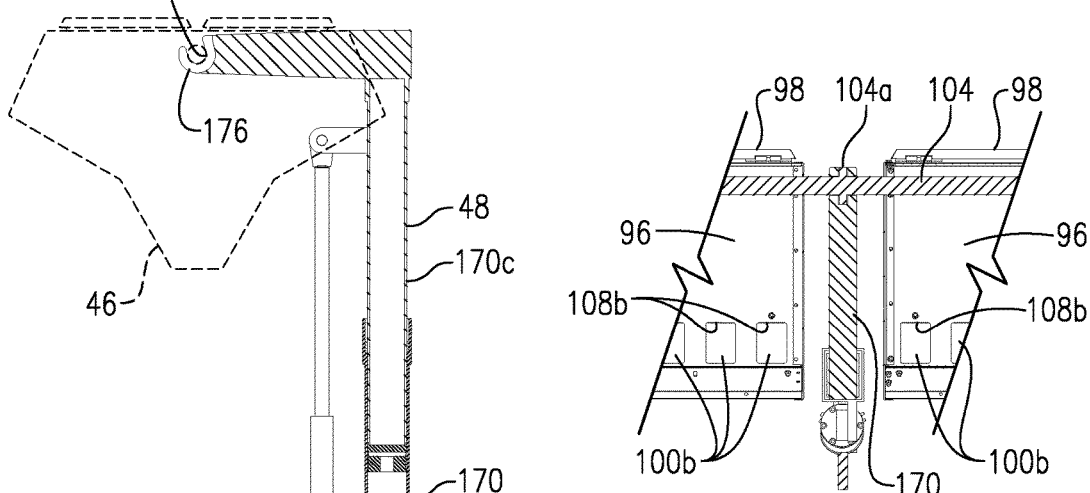
FIG. 19 is a fragmentary cross section of the implement taken along line 19-19 in FIG. 17, showing the shaft of the container extending through the receptacles and being supported by one of the transfer arms.

Referring to FIGS. 10-19, each container 46 preferably includes a pair of receptacles 96, upper fill doors 98, and shiftable gates 100*a,b* (see FIGS. 12, 13, and 19). The receptacles 96 each comprise a sheet-metal construction with outer walls 96*a*, end walls 96*b*, and a central divider 96*c* (see FIGS. 10-13). The walls 96*a,b* and divider 96*c* cooperatively define forward and aft chambers 102*a,b* to receive agricultural product (see FIGS. 12 and 13). In the illustrated embodiment, the forward and aft chambers 102*a,b* receive fertilizer F and seed S, respectively, but product could be alternatively provided in the chambers.

Furthermore, the receptacles could be configured to present an alternative number of chambers. For example, each receptacle could present a single chamber or more than two chambers (e.g., to dispense an alternative combination of agricultural products).

Each container 46 also preferably includes a shaft 104 secured to and extending through the end walls 96*b* (see FIGS. 11-13, 19, and 31A). The shaft 104 projects from the end walls 96*b* to present lugs 104*a* at opposite ends of each receptacle 96 (see FIGS. 19 and 31A). As will be described, the lugs 104*a* serve as male connectors that are configured to be engaged for lifting and securing the container 46.

In the illustrated embodiment, the receptacles 96 are interconnected by the shaft 104 so that the receptacles 96 are transferred together and are generally not separable. The container could also include alternative structure for interconnecting the receptacles. It is also within the ambit of the present invention where the product container comprises a single receptacle or includes receptacles that are entirely separable from one another. In one such alternative embodiment, the container could have receptacles that are not connected by a common shaft. In other words, the machine could be provided with a plurality of product containers that are independently secured and removed relative to the machine.

Each receptacle 96 presents upper fill openings 106*a,b* that communicate with corresponding chambers 102*a,b* and permit the chambers 102 to be selectively filled with agricultural product. The fill doors 98 can be opened and closed to selectively provide access to the chambers 102. When closed, the fill doors 98 preferably cover the fill openings 106 and restrict chamber ingress and egress.

Each receptacle 96 also preferably includes product level floats 107*a,b* (see FIGS. 12 and 13). The floats 107*a,b* are swingably mounted within corresponding chambers 102*a,b*. Each float 107*a,b* is preferably associated with a sensor (or transducer) to provide a signal corresponding to the amount of material in the corresponding chamber 102*a,b*. This sensing arrangement is configured to facilitate the replacement of containers, particularly by autonomous replacement methods, when product level within the container is low. It is also consistent with the principles of the present invention where an alternative sensing element (e.g., one or more optical sensors) is used to sense product level within the container to facilitate container replacement.

The walls 96*a* and divider 96*c* of the receptacle 96 are preferably arranged to slope downwardly and define chambers 102*a,b* with chamber width dimensions that each generally taper downwardly toward a lowermost end of the chamber. The depicted arrangement of walls 96*a* and divider 96*c* utilizes gravity to cooperatively collect and funnel product within the chamber toward the lowermost chamber end.

Each receptacle 96 also presents lower discharge openings 108*a,b* that communicate with the chambers 102*a,b* and are located adjacent the lowermost chamber ends (see FIGS. 12 and 19). In this manner, the discharge openings 108 allow product to be dispensed from the chambers 102 as the product is funneled toward the lowermost chamber end. The depicted openings 108 each have a generally rectangular shape and are spaced along the lateral length of the receptacle 96 (see FIG. 19). As will be explained, the openings 108 are positioned and configured to be associated with corresponding metering wheels of the machine 44.

It is also within the scope of the present invention where discharge openings are alternatively shaped and/or configured. For instance, each discharge opening could present an alternative opening shape (e.g., a square or circular shape). Also, a single, relatively elongated discharge opening could be used in place of multiple adjacent openings. For instance, the discharge openings in one of the receptacles could be replaced by a single, continuous opening.

The receptacles 96 preferably have a rigid construction and include a carbon steel material. However, the receptacles could include other metallic materials (such as stainless steel or aluminum), a synthetic resin material, wood material, composite material, and/or paper material, without departing from the scope of the present invention. For instance, in some alternative embodiments, the receptacles could be constructed of a disposable and/or recyclable material.

The depicted containers 46 and receptacles 96 are preferably similarly sized and shaped so as to facilitate interchangeable use of the containers. Consistent with the principles of the present invention, multiple containers and/or receptacles could be differently shaped or configured. However, in alternative embodiments where containers/receptacles are differently shaped, such containers/receptacles could still be used interchangeably. For example, multiple containers/receptacles could be stacked in series so as to be substantially equal in size to another container/receptacle. In one such alternative embodiment, the smaller containers/receptacles could have the same cross-sectional profile as the larger container/receptacle but have a shorter length, such that a combination of smaller containers/receptacles stacked end-to-end can present the same length as the larger container/receptacle and can be used interchangeably.

Turning to FIGS. 12, 13, and 19, the depicted gates 100a,b each comprise a unitary door structure that provides a product flow barrier. Each gate 100 is configured to selectively restrict product from flowing out of the chamber 102a,b when the container 46 is in an uncoupled position prior to the container 46 being attached to the chassis of the machine 44.

In the depicted embodiment, a series of gates 100a,b are spaced along the lateral length of the receptacle 96 (see FIG. 19). Each pair of adjacent gates 100a,b is preferably spaced apart from one another. Furthermore, each gate 100a,b is associated with a corresponding one of the discharge openings 108a,b such that each gate 100a,b is configured to open and close only the corresponding opening 108a,b.

The gate 100 presents an uppermost margin 110 that is pivotally mounted to the corresponding outer wall by a hinge 112 (see FIG. 13). The hinge 112 is configured so that the gate 100 can swing between an open condition (see FIG. 12) and a closed condition (see FIG. 13). The gate 100 is preferably mounted and configured to be urged by gravity toward the closed condition.

In the closed condition, each gate 100a,b preferably covers the respective discharge opening 108a,b and prevents product from flowing out of the respective chamber 102a,b (see FIG. 13). The container 46 also preferably includes a torsion spring (not shown) mounted on the hinge 112 to urge the gate 100 into the closed position. The gate 100 preferably moves into the closed condition when the container 46 is in the uncoupled position (see FIG. 13).

In the open condition, the gate 100 is preferably swung upwardly from the closed condition so that product can flow out of the chamber via the discharge opening (see FIG. 12). The gate 100 preferably moves into the open condition when the container is in the coupled position (see FIG. 12).

As will be explained below, the product container 46 fluidly communicates with the openers of the machine 44 when in the coupled position so that the openers receive product from the chambers 102a,b.

The principles of the present invention are equally applicable where the container 46 includes an alternative barrier structure to selectively restrict product from flowing out of the chambers 102a,b.

For instance, the container could include a single, relatively elongated gate that is used in place of multiple adjacent gates. In one such alternative embodiment, the gates in one of the receptacles could be replaced by a single, continuous gate that covers all of the respective openings in the closed position.

It will also be appreciated that the gate could be alternatively shiftably mounted without departing from the scope of the present invention. For example, the gate could be slidably mounted to the outer wall so that the gate slides linearly (vertically and/or laterally) between the closed condition and an alternative open condition. In various alternative embodiments, the gates could be powered and controlled by the system, rather than being automatically opened and closed by corresponding engagement and disengagement with the machine.

It is also within the ambit of the present invention where the barrier is fixed or attached to the outer wall while being operable to be selectively opened. In one such alternative embodiment, the barrier could comprise a frangible wall structure. The frangible wall could present a very small wall thickness dimension such that the frangible wall can be permanently punctured by another item (e.g., a sharp opening structure mounted on the machine chassis) when the container is shifted into the coupled position. Once coupled to the chassis, the frangible wall is punctured so that particulate can be dispensed through the opening. Once the alternative container is punctured, the particulate within the container is entirely (or substantially entirely) used so that only a minimal amount of particulate falls onto the ground when removing the container from the machine.

For some aspects of the present invention, the barrier could be provided by a metering mechanism. For instance, the metering assemblies could be operably mounted as part of the container, with metering wheels configured to control product flow out of the container. In such an alternative, the metering wheels could act as a barrier that restricts product flow out of the container when the wheels do not spin.

Based upon the foregoing, it will be appreciated that the barrier 100 most preferably prevents product flow from the containers 46 when the container 46 is uncoupled from a chassis of the machine 44. It is, however, most important that the barrier prevents product from flowing out of the illustrated chambers 102a and 102b prior to the container 46 being coupled to the machine chassis (e.g., as it is being moved from the station 42 to the machine 44). It is also desirable (although maybe not as important) for the barrier 100 to prevent product flow from the chambers 102a and 102b after the container 46 is removed from the machine 44 (e.g., when the transfer mechanism 48 returns the container 46 to one of the bays 86).

Turning to FIGS. 25, 26, and 31A-31C, the product containers 46 are preferably configured for removable attachment to the supports 82 of the rack assembly 58. The connectors 88 of the supports 82 have L-shaped slots 88a that removably receive corresponding lugs 104a of the containers 46.

When secured in the slot 88a, the lug 104a is preferably positioned adjacent the lowermost end 88c, and the opposed segments 88d,e cooperatively restrict lateral movement of the lug 104a relative to the support 82. The lug 104a can be inserted and removed relative to the slot 88a by passing the lug 104a through the open throat 88b.

It is also within the scope of the present invention where the lugs 104a and/or the connectors 88 of the supports 82 are alternatively configured for removable complemental interconnection. For instance, the connectors 88 could include male connectors, a combination of male and female connector elements, or hermaphroditic connectors. Similarly, the lugs 104a could be replaced with complemental female connectors or a combination of male and female connector elements.

In alternative embodiments, the containers and/or the supply station could have various other alternative connector structures for removable interconnection between the containers and supply station. For instance, the containers and/or the supply station could include one or more alternative connectors in the form of a movable latch element or another type of movable connector structure. It will also be appreciated that alternative connectors for the containers and/or the supply station could have a non-gender configuration (such that the connector is not considered a male connector or a female connector).

Again, when secured on the supply station 42, the lugs 104a of the containers 46 are preferably received in respective slots 88a. Additionally, the containers 46 also preferably rest on dividers 84 (see FIG. 25).

Autonomous Agricultural Implement

The agricultural machine 44, transfer mechanism 48, and product container 46 cooperatively provide an autonomous agricultural implement 114 in the form of a seeder (see FIGS. 5-9). The implement 114 is operable to advance itself across the field G while dispensing agricultural product from the product container 46. The product container 46 is preferably interchangeable with one or more other product containers 46, as will be discussed.

Turning to FIGS. 7-16, the machine 44 is operable as part of the agricultural implement 114 to removably receive a product container 46 and dispense product from the container 46 while being advanced across the field G. As will be discussed, alternative embodiments of the machine could be configured to receive multiple containers. The machine 44 is configured to be advanced in a machine forward direction D2 (see FIGS. 7, 9, 12, and 13) to dispense product within the field G.

In the illustrated embodiment, the machine 44 preferably functions as a seeder to dispense seed S and/or fertilizer F in particulate form. It is also within the ambit of the present invention where the machine 44 comprises an alternative agricultural implement. For example, the machine could be constructed to dispense one or more agricultural products including seed, fertilizers, inoculants, amendments, herbicides, and/or pesticides. In various alternative configurations, the machine could operate in a manner similar to other types of agricultural seeders or planters.

The machine 44 preferably includes a machine chassis 116, a container securement device 118, a drive system 120, a local control system (as described below), and a series of openers 124 (see FIGS. 7-16). The machine 44 also preferably includes metering assemblies 126a,b (see FIGS. 12 and 13).

The depicted machine chassis 116 includes a frame 128 and container supports 130 (see FIGS. 10-13). The frame 128 preferably comprises a welded framework of structural steel members, including steel tubing. Those of skill in the art will appreciate that the frame could be variously configured without departing from the principles of the present invention.

The container supports 130 are configured to cooperatively engage and position the container 46 in the coupled position. Each container support 130 preferably presents an upper margin 130a that removably engages the container 46 (see FIGS. 13 and 16).

Figure 16:
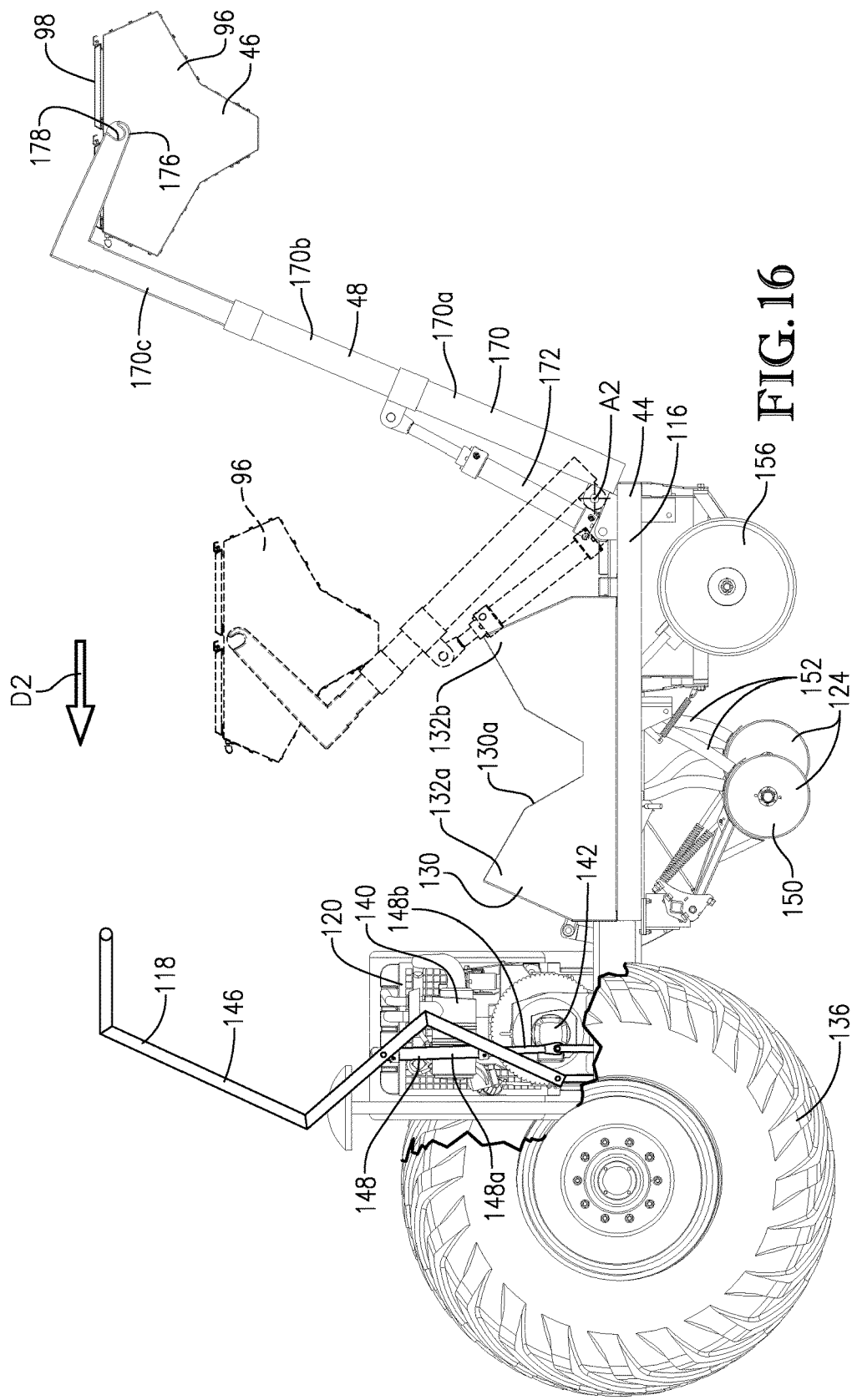
FIG. 16 is a fragmentary side elevation of the implement similar to FIG. 15, but showing the transfer arms swung and extended out of the folded position to uncouple the product container from the machine.

Each container support 130 also preferably includes forward and aft support elements 132a,b located on respective forward and aft sides of the container 46 (see FIGS. 13 and 16). The support elements 132a,b preferably restrict forward and aft movement of the container 46 relative to the machine chassis 116. Although not depicted, the machine chassis could also include one or more features to restrict lateral side-to-side movement of the container 46 relative to the chassis.

Each container support 130 preferably includes a steel material and is fixed to the frame 128. However, one or more of the supports 130 could be alternatively configured within the scope of the present invention. For instance, the container supports could include an alternative material, such as an alternative metallic material (e.g., stainless steel or aluminum) or a synthetic resin material.

Again, the depicted machine is configured to receive one of the product containers 46. However, as noted above, it is consistent with the principles of the present invention where the machine can be alternatively configured to receive multiple product containers. In such alternative embodiments, it will be appreciated that corresponding modifications to the transfer mechanism may be required to accommodate the loading and unloading of multiple product containers.

Still referring to FIGS. 7-16, the drive system 120 is configured to provide power for advancing the machine 44 along the field G. The drive system 120 also provides power for operating the securement device 118 and the transfer mechanism 48. The drive system 120 preferably includes hydraulic drive motors 134, drive wheels 136, fuel tank 138, internal combustion engine 140, hydraulic pump 142, and a battery (not shown).

The engine 140 is operably coupled to the pump 142 and is configured to drive the pump 142. In the usual manner, the engine 140 combusts fuel from the fuel tank 138 to spin a drive shaft (not shown) and thereby power the hydraulic pump 142.

The hydraulic drive motors 134 are secured to the frame 128 and are drivingly attached to the wheels 136. The drive motors 134 and pump 142 are part of a hydraulic system 144 (see FIG. 7) that includes, among other things, hydraulic lines (not shown) and a hydraulic sump (not shown) to hold a supply of hydraulic fluid. The drive motors 134 are operably powered by the pump 142 so that power is supplied from the engine 140 to the wheels 136. As will be explained, the local control system of the machine 44 is configured to operate the drive system 120 in order to advance the machine 44 as desired.

The illustrated securement device 118 is constructed to removably secure the container 46 in the coupled position. The securement device 118 includes a securement frame 146 and hydraulic cylinders 148 (see FIGS. 1, 10, and 14-16).

The frame 146 is swingably mounted on the chassis 116 and is operable to swing between an open frame position (see FIGS. 10, 15, and 16), where the container 46 can be mounted on and removed from the chassis 116, and a closed frame position (see FIGS. 7-9), where the frame 146 restricts the container 46 from being mounted or removed relative to the chassis 116.

The hydraulic cylinders 148 are configured to shift the frame 146 and include a cylinder body 148a and a piston 148b (see FIGS. 1, 10, and 14-16). The cylinders 148 are mounted by attaching the piston 148b to the chassis 116 and the body 148a to the frame 146. The cylinders 148 are operably powered by the hydraulic system 144 and are configured to swing the frame 146 between the open and closed frame positions.

Still referring to FIGS. 7-16, the openers 124 are operably coupled to the machine chassis 116 to dispense product along the field G as the implement 114 is advanced. Each opener 124 includes an opening disc 150 and boots 152 to receive seed S and fertilizer F (see FIGS. 12-16). Each boot 152 preferably includes a pair of flexible tubes 154 attached to the metering assemblies 126a,b. The flexible tubes 154 present tube passages 154a that fluidly communicate with the metering assemblies 126a,b.

In the usual manner, the disc 150 of each opener 124 creates a furrow in the field G (see FIGS. 6 and 32) and directs seed S and fertilizer F from the container 46 and into the furrow. The machine 44 also includes closing wheels 156 mounted behind the openers 124 to close and firm the corresponding furrows (see FIGS. 9, 10, and 14).

The principles of the present invention are applicable where the openers 124 and/or the closing wheels 156 are alternatively configured for dispensing seed S and/or fertilizer F in the field G.

Figure 10:
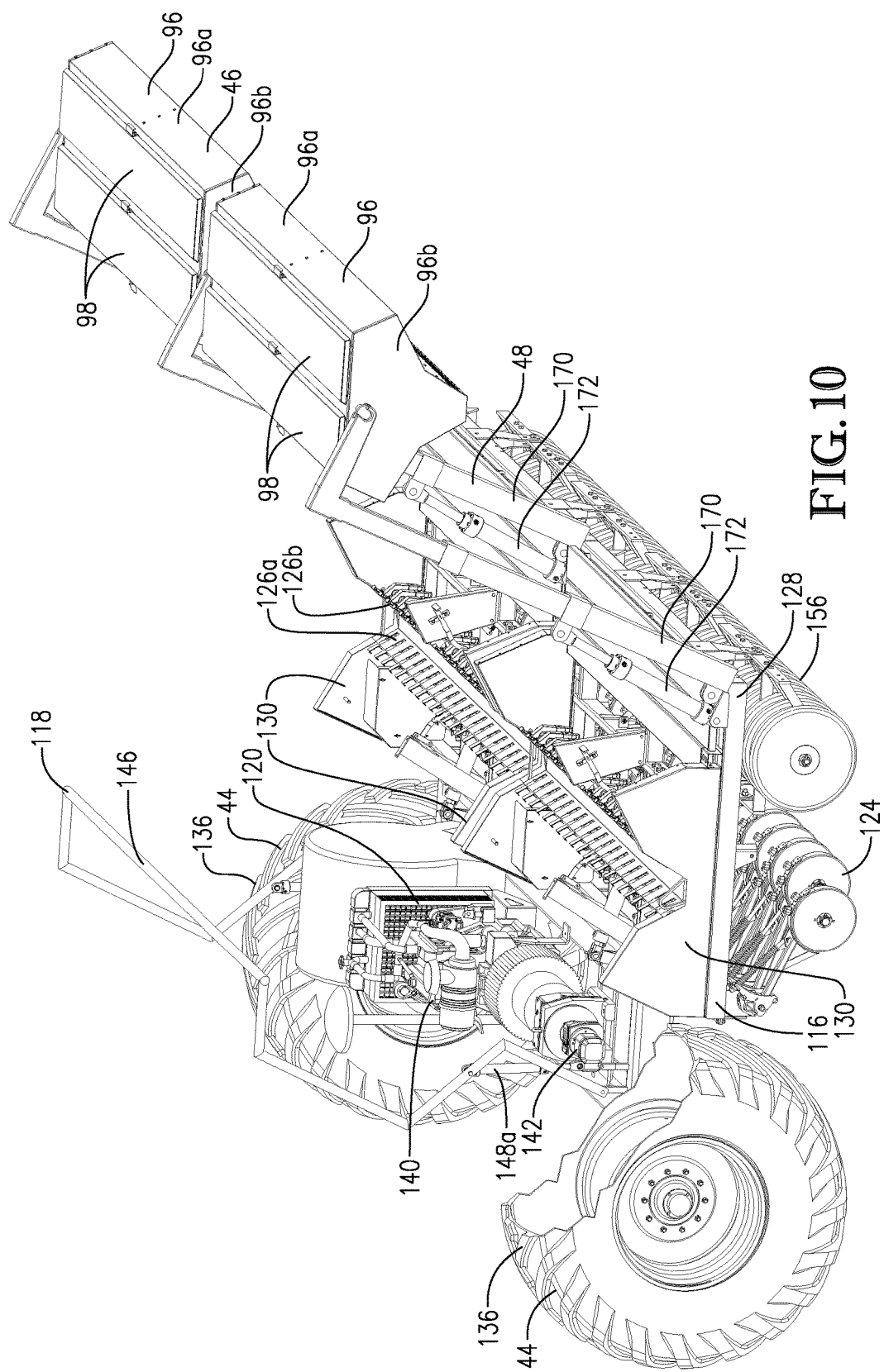
FIG. 10 is a fragmentary side perspective of the implement similar to FIG. 9, but showing the securement device of the machine being opened to permit uncoupling of the product container, with the transfer arms being swung and extended out of the folded position to uncouple the product container from the machine.
Figure 11:
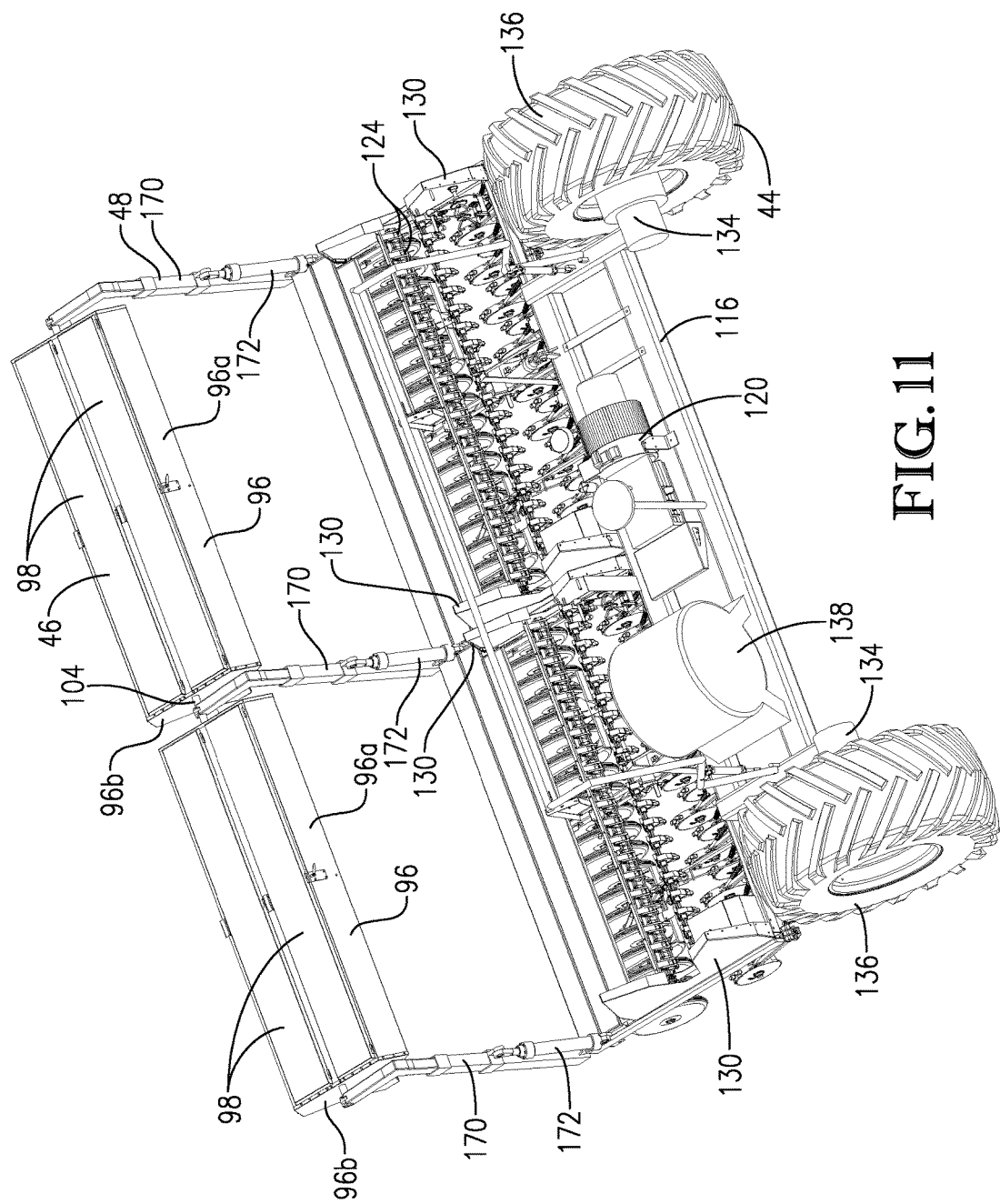
FIG. 11 is a fragmentary upper front perspective of the implement as shown in FIG. 10, showing the transfer arms supporting the product container in an uncoupled position, and further showing the product container including a pair of receptacles connected by a common shaft that forms lugs configured for lifting the container.

Turning to FIGS. 10, 12, and 13, the metering assemblies 126a,b are preferably configured to control the flow rate at which agricultural product is dispensed from the container 46. Each metering assembly 126a,b includes a metering housing 158 that defines a series of passages 160, a series of metering wheels 162a,b mounted in the passages 160, and a common shaft 164a,b supporting the respective wheels 162a,b.

The housing 158 is constructed so that the passages 160 are spaced laterally along the length of the chassis 116. The housing 158 also presents a series of inlets 166a and outlets 166b that communicate with respective passages 160 (see FIG. 13). The housings 158 are preferably connected to boots 152 so that the passages 160 fluidly communicate with corresponding boots 152.

The housing 158 further includes a series of spaced apart opening lugs 168 fixed in a position above the inlets 166a (see FIGS. 12 and 13). The opening lugs 168 comprise an opening device configured to engage the gates 100 when the container 46 is coupled to the machine 44. In particular, the opening lugs 168 preferably shift the gates 100 open (i.e., by shifting the gates 100 out of the closed condition) when the container 46 is secured in the coupled position.

The control system (including the local control system of the machine 44) is configured to operate the implement 114 to dispense agricultural product along the field G and facilitate loading and unloading of containers 46. The control system positions the implement 114 adjacent an open one of the bays 86, in a corresponding first one of the docking positions, so that a first container 46 coupled to the machine 44 can be unloaded from the machine 44 by the transfer mechanism 48 and transferred to the open bay 86.

The control system can then operate the transfer mechanism 48 to engage a second container 46 in one of the occupied bays 86 so that the second container 46 can be transferred to the machine 44 by the transfer mechanism 48 and coupled to the machine 44. For instance, the transfer mechanism 48 could transfer the second container 46 from one of the occupied bays 86 associated with the first docking position.

If the second container 46 to be transferred onto the machine 44 is in a bay 86 associated with a second one of the docking positions, the control system can move the implement 114 from the original docking position to the second docking position after unloading the first container 46. Once the implement 114 has been moved to the second docking position, the control system can operate the transfer mechanism 48 to move the second container 46 located within the occupied bay 86 to the machine 44 for coupling thereto.

The machine 44 is operable to move itself into and out of each of the docking positions associated with the illustrated supply station 42. Again, the control system is configured to operate the machine 44 to selectively dock the machine 44 in the docking positions for exchanging containers 46. As needed, the control system is also configured to dock the machine 44 adjacent the fuel system 60 so that the machine 44 can be refueled by the supply station 42.

Turning to FIGS. 10, 11, 14-18, and 31A-31C, the transfer mechanism 48 is configured to shift any container 46 between the coupled position and one of the stored positions.

In the illustrated embodiment, the transfer mechanism 48 is preferably operably supported and powered by the machine 44. The transfer mechanism 48 preferably includes transfer arms 170 and rotation cylinders 172. The transfer mechanism also preferably includes extension cylinders 174, which are only depicted in FIGS. 17 and 18. The cylinders 172 and 174 preferably provide drive motors to shift the transfer mechanism 48, as will be explained below.

Each transfer arm 170 is configured to be removably attached to one of the containers 46. In particular, the transfer arms 170 are removably attached to respective lugs 104a of the container 46. As will be explained, each transfer arm 170 preferably comprises a lift arm to selectively lift and move the container 46 between coupled and uncoupled positions.

Figure 18:
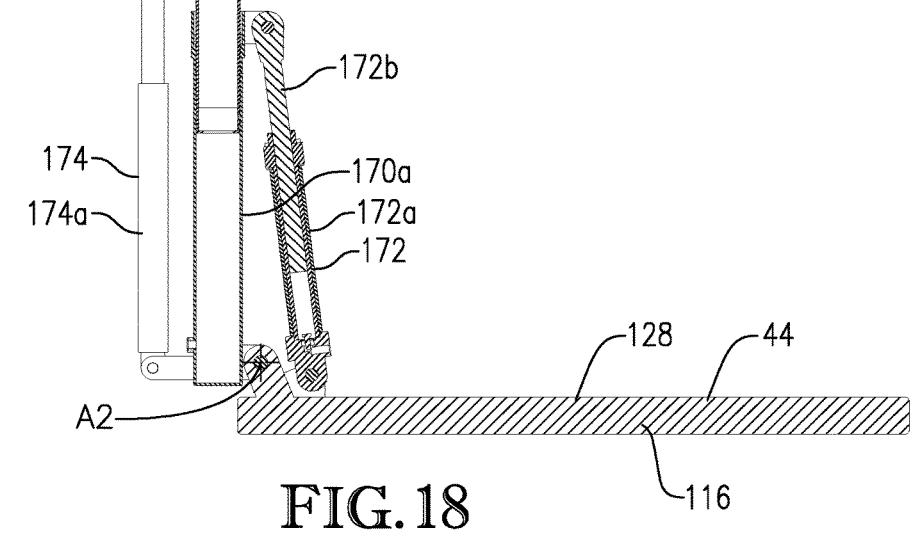
FIG. 18 is a fragmentary cross section of the implement similar to FIG. 17, but showing the transfer arm swung out of the folded position by the arm rotation cylinder and extended by the arm extension cylinder.

Each transfer arm 170 preferably has an extendable telescopic construction and includes a proximal arm section 170a, an intermediate arm section 170b, and a distal arm section 170c (see FIGS. 16 and 18). In the depicted embodiment, a proximal end of the intermediate arm section 170b is slidably received in the proximal arm section 170a, and a proximal end of the distal arm section 170c is slidably received in the intermediate arm section 170b. Thus, the arm sections 170a,b,c are slidably interengaged with one another.

The proximal arm section is preferably pivotally mounted to the frame so that each arm can swing about a lateral pivot axis A2 (see FIGS. 16 and 18). The transfer arm is preferably swingable between a folded position (see FIG. 17) and a range of unfolded positions (see FIGS. 16 and 18).

Figure 17:
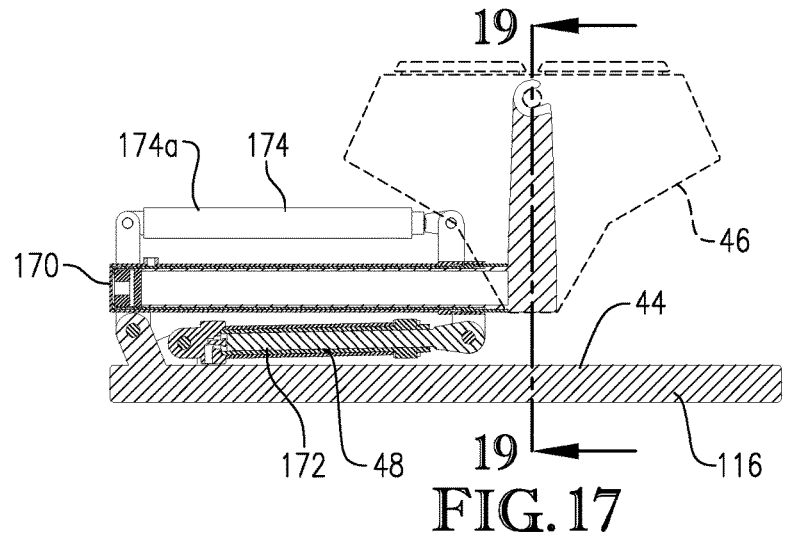
FIG. 17 is a fragmentary cross section of the implement shown in FIGS. 5-9 and 14, showing the transfer arm, arm rotation cylinder, and an arm extension cylinder of the transfer mechanism, with the transfer mechanism in the folded position.

Each distal arm section 170c preferably includes an arm connector 176 that is removably attached to a corresponding lug 104a of the container 46 (see FIGS. 16-18). In the depicted embodiment, the arm connector 176 presents a curved socket 178 to removably receive the corresponding lug 104a. The connector 176 is configured and positioned to receive and support the lug 104a as the transfer arm swings between the folded and unfolded positions.

Consistent with the principles of the present invention, the arm connector could be variously configured for removable attachment to the container 46. For instance, the arm connector could include a movable latch to selectively close the socket and thereby secure the lug 104a therein.

The sliding interengagement of arm sections 170a,b,c permits the transfer arm 170 to be shifted from a retracted condition (see FIG. 17) to an extended condition (see FIG. 18). However, the arm sections 170a,b,c could be alternatively movably connected to one another without departing from the scope of the present invention. For instance, the arm sections could be slidably attached alongside one another so that the arm sections are not telescopic.

In other alternative embodiments, the transfer arm could comprise a linkage with one or more pivotally attached arm elements to cooperatively extend and retract the arm.

The rotation cylinder 172 comprises a conventional hydraulic cylinder that includes a cylinder body 172a and a piston 172b slidably received by the body 172a (see FIG. 18). The cylinder body 172a is pivotally attached to the frame 128, while the piston 172b is pivotally attached to the proximal arm section 170a (see FIG. 18).

In a retracted position, the cylinder 172 positions the transfer arm 170 in the folded position (see FIG. 17). The cylinder 172 is also extendable to swing the transfer arm 170 among a range of unfolded positions (see FIGS. 16 and 18).

Preferably, the rotation cylinders 172 are operably powered by the hydraulic system 144 of the machine 44 and controlled by the control system. The depicted rotation cylinders 172 work cooperatively to rotate the transfer arms 170 at the same time.

The extension cylinder 174 also comprises a conventional hydraulic cylinder that includes a cylinder body 174a and a two-stage telescopic piston 174b slidably received by the body 174a (see FIG. 18). The cylinder body 174a is attached to the proximal arm section 170a, while the piston 174b is pivotally attached to the distal arm section 170c.

Preferably, the extension cylinders 174 are operably powered by the hydraulic system 144 of the machine 44 and controlled by the control system. The depicted extension cylinders 174 work cooperatively to extend and retract the transfer arms 170 at the same time.

Although the transfer mechanism 48 is preferably hydraulically powered, the transfer mechanism 48 could use an alternative means of motive power. For instance, alternative embodiments of the transfer mechanism 48 could use electric motors in place of the hydraulic cylinders 172 to swing the arms 170. Similarly, electric motors could be used in place of the cylinders 174 to extend and retract the arms 170.

The principles of the present invention are applicable where the transfer mechanism is supported on structure other than the machine. For instance, an alternative transfer mechanism could be operably mounted on the trailer to transfer containers between the trailer and the machine.

It will further be appreciated that the transfer mechanism could be provided by a vehicle separate from the implement 114 and from the supply station 42. For instance, according to some aspects of the present invention, various types of self-powered vehicles, such as a fork lift, a front loader, or a tractor with a loading attachment, could be used to selectively transfer containers 46 between the machine 44 and the supply station 42.

Although various embodiments of the transfer mechanism involve selective lifting and lowering of the containers 46, it will also be understood that container transfer could involve primarily lateral container movement. Such container movement could be provided by a conveying mechanism that achieves primarily lateral movement. In one such embodiment, the conveying mechanism could include a conveyor mechanism having endless conveying structure (such as a belt or chain) to support and drive the container between the machine and the supply station 42.

Control System and Control Method

Referring to FIGS. 32-36, embodiments of a control system and a computer-implemented control method are shown for facilitating depositing or otherwise applying one or more products to a field or other jobsite using an autonomous machine, including coupling the autonomous machine to a transporter for transport to the field or other jobsite, and including transferring the products between the autonomous machine and a docking station.

The control system and computer-controlled control method may involve some or all of the elements and features described above or may involve substantially any suitable additional or alternative conventional or non-conventional technologies for accomplishing the processes described below. Further, while described in an example agricultural operating context, the control system and computer-implemented control method are not limited thereto and may be adapted for use in substantially any other suitable operating context.

Referring to FIGS. 32 and 33, an embodiment of a control system is shown for facilitating depositing or otherwise applying one or more products to a field or other jobsite using an autonomous machine, including coupling the autonomous machine to a transporter for transport to the field or other jobsite, and including transferring the products between the autonomous machine and a docking station. Broadly, the control system 200 may be configured to deploy a transporter 72 to deliver a docking station 64 and an autonomous machine (e.g., an autonomous seeder) 44 from an initial location or other base of operations B to a field or other jobsite G where the machine 44 may autonomously deposit or otherwise apply one or more products (e.g., seed, fertilizer, herbicides, and/or insecticides in solid, liquid, gel, and/or gaseous forms) while maintaining periodic or continuous communication with the base B and a mobile access device 202 via a wireless communications network 204.

Referring particularly to FIG. 33, an embodiment of the initial location or other base of operations B may include a base memory 206, a base processor 208, a base transceiver 210, an input interface 212, and an output interface 214. The base memory 206 may store a management computer program for initiating, monitoring, or otherwise managing operation of the transporter 72 and/or autonomous machine 44. The base memory 206 may also store operation instructions for a particular job, wherein the operation instructions may guide one or more operations of the transporter 72 and/or the autonomous machine 44 during the particular job. The base processor 208 may execute the management computer program, including communicating the operation instructions to the transporter 72 and/or autonomous machine 44 via the base transceiver 210, and receiving sensor and/or camera data from the transporter 72 and/or autonomous machine 44 via the base transceiver 210.

In one implementation, some or all operations of the transporter 72, docking station 64, and/or autonomous machine 44 may be controlled by the management computer program executed by the base processor 208, with control signals being transmitted from the base B and sensor and/or camera data being received by the base B via the communications network 204. In another implementation, some or all operations of the transporter 72, docking station 64, and/or autonomous machine 44 may be controlled by local computer programs executed by respective transport, docking station, and/or autonomous machine processors based on operation instructions transmitted from the base B and/or mobile access device 202. The local computer programs may be in periodic or continuous communication with the management computer program. The base transceiver 210 may facilitate bi-directional communication between the base B and the transporter 72, docking station 64, and/or autonomous machine 44 via the communications network 204. The input interface 212 may facilitate interaction by a farm manager, fleet operator, or other user with the management computer program, including entry of the operation instructions. The output interface 214 may facilitate communication to the farm manager, fleet operator, or other user of relevant information, including sensor and/or camera data from the transporter 72, docking station 64, and/or autonomous machine 44.

The transporter 72 may be substantially similar or identical to the transporter described above. In one implementation, the transporter may be a truck, tractor, or other towing vehicle configured to tow the docking station (i.e., the docking station may be integrated with a trailer or otherwise provided with wheels), while in another implementation, the transporter may be a truck and trailer, tractor and trailer, or other combination of towing and carrying vehicle configured to carry the docking station (i.e., the docking station may not be integrated with a trailer or otherwise provided with wheels). In one implementation, the transporter may be a partially or fully autonomous vehicle, while in other implementations, the transporter may be a conventional manually driven vehicle or remotely driven vehicle. In one implementation, in which the docking station may not be moved often or at all and the machine may be used at a single jobsite or may autonomously travel between jobsites, the transporter may be eliminated or may only be used to occasionally reposition docking stations or recover malfunctioning autonomous machines.

An embodiment of the transporter 72 may include a transporter memory 218; a transporter processor 220; a transporter transceiver 224; a transporter internal sensor and camera suite 226; a transporter external sensor and camera suite 228; and transporter control and drive components 230. The transporter memory 218 may be an electronic memory storing operation instructions and other relevant information for access and use by the transporter processor 220. The transporter processor 220 may be an electronic processor executing one or more computer programs to control operation of the transporter 72, including autonomous travel to and from jobsites, and coupling and uncoupling with the autonomous machine 44. The transporter transceiver 224 may facilitate bi-directional communication between the transporter 72 and the base B, docking station 64, and/or autonomous machine 44 via the communications network 204, including receiving operation instructions for the transporter 72.

The transporter internal sensor and camera suite 226 may include one or more electronic sensors and/or cameras monitoring internal operations of the transporter and facilitating accomplishment of the functions of the transporter 72. The transporter external sensor and camera suite 228 may include one or more electronic sensors and/or cameras monitoring external operations of the transporter 72 and facilitating accomplishment of the functions of the transporter. In particular, the transporter 72 may have any internal and/or external sensors and/or cameras desired or needed to accomplish autonomous travel to jobsites. The transporter 72 may include one or more cameras providing images of the transporter 72 in operation, the docking station 64, and/or the coupled autonomous machine 44, and/or an area around the transporter 72.

The transporter 72 may have one or more external sensors and/or cameras to facilitate coupling and uncoupling with the autonomous machine 44, such as position sensors to sense the position of the lift or other coupling mechanism 62, coupling sensors to sense whether the autonomous machine 44 is fully coupled or uncoupled, and lock sensors to sense whether the coupled autonomous machine 44 is fully secured. In one implementation, the transporter 72 may present one or more alignment markers which the autonomous machine 44 senses and/or images and uses to align itself with the coupling assembly 62 during coupling for transport. The alignment markers may be passive, in that they reflect, e.g., light (e.g., visual, infrared, laser), wherein the light may be emitted by emitters on the autonomous machine 44, or the alignment markers may be active in that they emit, e.g., light.

The transporter control and drive components 230 may include electrical, mechanical, and/or hydraulic controls for controlling operation of the transporter 72 in accordance with the operation instruction, and motors and/or engines for accomplishing the functions of the transporter 72, including autonomous travel and coupling and uncoupling with the autonomous machine 44, under the control of the transporter processor 220 and transporter control components.

The docking station 64 may be substantially similar or identical to the docking station described above. In one implementation, the docking station may be integrated with a trailer (the trailer 56) or otherwise provided with wheels and may be towed by the transporter (the truck 54), while in another implementation, the docking station may not be integrated with a trailer or otherwise provided with wheels and may be carried by the transporter (the truck 54 and trailer 56). In one implementation, the docking station may provide products and/or fuel in separate pods or other containers which are transferrable to and from the autonomous machine 44, while in another implementation, the docking station may provide the products and/or fuel in large bins or other containers from which smaller containers mounted on the autonomous machine 44 can be filled.

In one implementation, the docking station may be transported to the jobsite simultaneous with the autonomous machine for a particular job. In another implementation, the docking station may be temporarily or permanently transported to and positioned at the jobsite for one or more jobs, and the autonomous machine may be separately transported to the jobsite (or wholly assembled at the jobsite such that no transport of the actual docking station is performed) for a particular job. In another implementation, the docking station may be transported to the jobsite for a particular job, and the autonomous machine may be separately transported to and positioned at the jobsite for one or more jobs. In another implementation, the docking station may be provided at a central or other location (e.g., the base) which is not the jobsite, and the machine may autonomously travel to and from the central or other location as desired or needed (to, e.g., load or reload products and/or for maintenance). In this implementation, the transporter may be eliminated or may only be used to recover malfunctioning autonomous machines.

An embodiment of the docking station 64 may include a station memory 234, a station processor 236, a station transceiver 238, a station internal sensor and camera suite 240, a station external sensor and camera suite 242, and station control and actuation components 244. The station memory 234 may be an electronic memory storing operation instructions and other relevant information for access and use by the station processor 236. As discussed below, the station memory 234 may store a look-up table or other data structure 246 for the pods or other containers 46, which may include such information as an identifier, a location, a content, and a status (e.g., full, low, empty, and/or an actual weight of the container) for each pod or other container 46. The station processor 236 may be an electronic processor executing one or more computer programs to control operation of the docking station 64, including transferring product and/or fuel to the autonomous machine 44. The station transceiver 238 may be an electronic transceiver facilitating communications via the communications network 204, including receiving operation instructions for the docking station 64. The station transceiver 238 may facilitate bi-directional communication between the docking station 64 and the base B, transporter 72, and/or autonomous machine 44 via the communications network 204, including receiving operation instructions for the docking station 64. In one implementation, the docking station 64 may use the station transceiver 238 to communicate the status of one or more of the pods or other containers 46, especially those which are low on or empty of product.

The station internal sensor and camera suite 240 may include one or more electronic sensors and/or cameras monitoring internal operations of the docking station 64 and facilitating accomplishment of the functions of the docking station 64. The station external sensor and camera suite 242 may include or more electronic sensors and/or cameras monitoring external operations of the docking station 64 and facilitating accomplishment of the functions of the docking station 64, including transferring products and/or fuel to the autonomous machine 44. The docking station 64 may include a docking sensor to sense whether the autonomous machine 44 is fully docked or undocked prior to locking or unlocking a particular container being transferred. The docking station 64 may have one or more cameras providing images of the transporter 72, the docking station 64 in operation, and/or the docked autonomous machine 44, and/or an area around the docking station 64.

The docking station control and actuation components 244 may include electrical, mechanical, and/or hydraulic controls for controlling operation of the docking station 64 in accordance with the operation instructions, and electrical, mechanical, and/or hydraulic actuators for accomplishing the functions of the docking station 64, including transferring product and/or fuel to the autonomous machine 44 (e.g., unlocking full pods or other containers for transfer, locking low or empty pods or other containers received, and/or opening and closing chutes or other conduits) under the control of the station processor 236 and the station control components.

The autonomous machine 44 may be substantially similar or identical to the autonomous machine described above. In one implementation, the autonomous machine may be fully autonomous, while in other implementations, the autonomous machine may be at least sufficiently autonomous to accomplish the functionality described herein. The autonomous machine may be remotely drivable and/or its operations otherwise remotely controllable in case of emergency or other special circumstances.

An embodiment of the autonomous machine 44 may include a machine memory 250; a machine processor 252; a machine transceiver 254; a machine internal sensor and camera suite 256; a machine external sensor and camera suite 258; and machine control and drive components 260. The machine memory 250 may be an electronic memory storing operation instructions and other relevant information for access and use by the machine processor 252. The machine processor 252 may be an electronic processor executing one or more computer programs to control operation of the machine 44, including moving into coupling position with the transporter 72, moving into docking position with the docking station 64, transferring containers to and from the docking station 64, and autonomously moving across jobsites (and, in some implementations, autonomously traveling to and from jobsites). The machine transceiver 254 may facilitate bi-directional communication between the autonomous machine 44 and the base B, transporter 72, and/or docking station 64 via the communications network 204, including receiving operation instructions for the autonomous machine 44.

The machine internal sensor and camera suite 256 may include one or more electronic sensors and/or cameras monitoring internal operations of the autonomous machine 44 and facilitating accomplishment of the functions of the autonomous machine 44. The machine external sensor and camera suite 258 may include one or more electronic sensors and cameras monitoring external operations of the autonomous machine 44 and facilitating accomplishment of the functions of the autonomous machine 44, including moving into coupling position with the transporter 72, moving into docking position with the docking station 64, transferring product containers 46 to and from the docking station 64, and autonomous movement/travel.

In particular, the autonomous machine 44 may include any internal and/or external sensors and/or cameras desired or needed to accomplish autonomous movement across fields or other jobsites (and, in some implementations, autonomous travel to fields or other jobsites). The internal sensors 256 may include a speed sensor configured to sense and generate speed data regarding a speed of movement of the autonomous machine over the jobsite G; a rate sensor configured to sense and generate rate data regarding a rate of application of the one or more products; a hydraulic pressure sensor configured to sense and generate pressure data regarding a force exerted by the autonomous machine; a weight sensor configured to sense and generate weight data regarding the weight(s) of the mounted container(s), wherein the weight(s) of the container(s) are indicative of the remaining amounts of the products in the containers; a blockage sensor configured to sense and generate blockage data regarding a blockage in the application of the particular product; and a motor and/or engine sensor configured to sense and generate motor and/or engine performance. The machine processor 252 may accomplish moving the autonomous machine 44 over the jobsite G and apply the products in accordance with the set of operation instructions based at least in part on the speed, rate, pressure, weight, blockage, motor and/or engine, and any other sensor and/or camera data. The external sensors 258 may include a navigation sensor configured to sense and generate navigation data regarding a geographic location of the autonomous machine 44, and one or more cameras configured to provide images of the autonomous machine 44 coupled, docked, or otherwise in operation, and/or an area around the autonomous machine 44. The machine processor 252 may accomplish moving the autonomous machine 44 over the jobsite G and applying the products in accordance with the set of operation instructions based at least in part on the navigation, camera, and any other sensor and/or camera data.

The autonomous machine 44 may have external sensors and/or cameras to facilitate coupling and uncoupling with the transporter 72, such as coupling alignment sensors to sense the position of the lift or other coupling mechanism. The autonomous machine 44 may also have external sensors and/or cameras to facilitate transferring pods or other containers 46 and/or transferring fuel (and/or opening and closing chutes or other conduits), such as docking alignment sensors to sense whether the autonomous machine 44 is properly aligned with the docking station 64. The external sensors and/or cameras 258 may sense or provide images of the docking station 64 and the pods or other containers 46 on the docking station 64 to facilitate docking with the docking station 64 and identifying and transferring the pods or other containers 46. These particular sensors and/or cameras may be located on the transfer arms 170 which actually align with the docking station 64 and engage the pods or other containers 46. The natures of this sensing/imaging and the resulting data may vary.

Referring to FIG. 34, in one implementation, the autonomous machine may include a docking alignment sensor 264 configured to sense and generate alignment data regarding a relative position of the docking station 64. The docking station 64 may present one or more alignment markers 266 which the docking alignment sensor 264 senses or images and uses to align itself with the docking station 64 during docking. The alignment markers 266 may be passive, in that they reflect, e.g., light (e.g., visual, infrared, laser), wherein the light may be initially emitted by emitters on the autonomous machine 44, or the alignment markers 266 may be active in that they emit, e.g., light. The machine processor 252 may align the autonomous machine 44 with the docking station 64 based on the alignment data from the docking alignment sensor 264, and transfer a particular container between the docking station 64 and the autonomous machine 44.

As discussed, the locations, contents, and statuses of the pods or other containers 46 on the docking station 64 may be provided in a look-up table or other data structure 246 stored in the docking station and/or machine memories 234,250, and the machine processor 252 may refer to such data to identify the location of a particular pod or other container 46 for transfer. Additionally or alternatively, the content of each pod or other container 46 may be indicated by a bar code or other machine readable label 268 on an exterior surface, and the autonomous machine 44 may sense and/or image the label to determine or at least confirm the content of the pod or other container 46.

The machine control and drive components 260 may include electrical, mechanical, and/or hydraulic controls for controlling operation of the autonomous machine 44 in accordance with the operation instruction, and motors and/or engines for accomplishing the functions of the autonomous machine 44, including autonomous movement across the field or other jobsite G (and, in some implementations, autonomous travel to and from the jobsite G), coupling and uncoupling with the transporter 72, and docking and undocking with the docking station 64, under the control of the machine processor 252 and the machine control components.

In one implementation, steering the autonomous machine 44 may be achieved by the machine processor 252 controlling the speed of the drive wheels 136 relative to each other. In one implementation, controlling the rate of deposition or other application by the autonomous machine 44 may be accomplished using substantially any suitable technology, such as gravity-driven metering or variable rate hydraulic or electric metering.

The mobile access device 202 may provide supplementary input and output interfaces for entering operation instructions and communicating sensor and/or camera data from the transporter 72, docking station 64, and/or autonomous machine 44. The mobile access device 202 may be a smartphone, tablet, portable computer, or substantially any other suitable conventional or non-conventional technology. The mobile access device 202 may be used by e.g., the farm manager or fleet operator to monitor and/or manage operations when away from the base location B.

The communications network 204 may be substantially any suitable network employing substantially any suitable communications technology.

The control system 200 may include more, fewer, or alternative components and/or perform more, fewer, or alternative actions, including those discussed elsewhere herein, and particularly those discussed in the below-described computer-implemented control method.

Referring to FIG. 35, an embodiment of a control method 300 is shown for facilitating depositing or otherwise applying one or more products to a field or other jobsite using an autonomous machine, including coupling the autonomous machine to a transporter for transport to the field or other jobsite, and including transferring the products between the autonomous machine and a docking station. The control method 300 may be a corollary to the functionality of the above-described control system 200, and may be implemented using the various components of the control system 200 within the above-described example operating environment or other context. Broadly, the control method 300 may proceed substantially as follows. Some or all of the steps may be accomplished under partial or full computer control.

Operation instructions may be provided for at least the autonomous machine 44, as shown in 302. In an agricultural context, a farm manager, fleet operator, or other user may enter the operation instructions, and the operation instructions may be any relevant instructions, such as start, pause, and/or end times; speed of movement; amounts and/or other rates of deposit or other application; and/or depths of deposit or other application. Relevant operation instructions may be similarly entered for the transporter 72 and/or the docking station 64.

The operation instructions may be entered at the initial location or other base B, at the jobsite G, or at an intermediate location (e.g., an intermediate staging area). The operation instructions may be entered using the input interface 212 or substantially any other suitable input interface. The operation instructions may be individually entered or selected from the base memory 206 or the machine memory 250 as a subset or full set of prior-entered operation instructions, which may modified, as desired or needed.

A supply of products and supplemental fuel for the autonomous machine 44 may be provided at the jobsite G, as shown in 304. The autonomous machine 44 may be provided at the jobsite G, as shown in 306. In one implementation, the products and/or fuel may be provided in the separate pods or other containers 46 which can be transferred between the autonomous machine 44 and the docking station 64, while in another implementation, the products and/or fuel may be provided in large bins or other containers from which smaller containers mounted on the autonomous machine can be filled.

In one implementation, products and fuel may be transported (e.g., on the docking station 64) to the jobsite G simultaneous with the autonomous machine 44 for a particular job. In another implementation, the products and fuel may be temporarily or permanently transported to and positioned at the jobsite G (or wholly assembled at the jobsite such that no transport of the actual docking station is performed) for one or more jobs, and the autonomous machine 44 may be separately transported to the jobsite G for a particular job. In another implementation, the products and fuel may be transported to the jobsite G for a particular job, and the autonomous machine 44 may be separately transported to and positioned at the jobsite G for one or more jobs. In another implementation, the products and fuel may be provided at a central or other location (e.g., the initial location or other base B or an intermediate location) which is not the jobsite G, and the machine 44 may autonomously travel to and from the central or other location to, e.g., load or reload and/or for maintenance, as desired or needed, in which case the transporter 72 may be eliminated or may only be used to for exceptional circumstances (e.g., to recover malfunctioning autonomous machines).

The machine 44 may autonomously move across the jobsite G while depositing products and gathering sensor and/or camera data under the control of a machine processor 252 and in accordance with the operation instructions, as shown in 308. The autonomous machine 44 may make use of substantially any suitable conventional or non-conventional autonomous vehicle technology to move across the field or other jobsite G and deposit or otherwise apply the products in an effective manner under the control the machine processor 252 and in accordance with the operation instructions. Such movement may include any additional actions required to accomplish successful deposit or application of the products. For example, in an agricultural context, the movement may be accompanied by opening and closing furrows in soil.

The operation instructions may be modified based on the sensor and/or camera data, as desired or needed, as shown in 310. The sensor and/or camera data may be communicated to a remotely located computer (e.g., at the initial location or other base B) and/or person (e.g., using the mobile access device 202) for consideration. The operation instructions may be modified, as desired or needed, based on the sensor and/or camera data. For example, data from an internal sensor may indicate a problem accomplishing the deposition or other application of the products, and so the computer and/or person may suspend the operation instructions and shut down the autonomous machine 44 until the problem is addressed. For another example, data from an external camera may indicate problematic conditions (e.g., mud, a downed tree), and so the computer and/or person may modify the operation instructions to avoid the conditions.

If the job is not complete and the autonomous machine 44 is running low on product and/or fuel, the autonomous machine 44 may be reloaded with products and/or fuel under the control of the machine processor 252, as shown in 312. The machine may autonomously return to the supply of products and/or fuel (e.g., to the docking station 64) to reload additional products and/or fuel under the control of the machine processor 252 and as needed to complete the job. As discussed, in one implementation this may involve swapping low or empty pods or other containers 46 for full pods or other containers 46, while in another implementation this may involve refilling smaller containers mounted on the autonomous machine.

Once the job is completed, the process may be finalized, as shown in 314. Finalizing the process may include such activities as notifying a computer (e.g., at the initial location or other base B) and/or person (e.g., using the mobile access device 202) that the job is complete; transporting the unused products and/or fuel (e.g., the docking station 64) back to the initial location or other base B, to an intermediate location, or to a next field or other jobsite; transporting the autonomous machine 44 back to the initial location or other base B, to an intermediate location, or to a next field or other jobsite; preparing the docking station 64, autonomous machine 44, and/or other elements for the next job.

Referring to FIG. 36, an example implementation of a computer-implemented control method 400 is shown for facilitating depositing or otherwise applying one or more products to a field or other jobsite using an autonomous machine, including coupling the autonomous machine to a transporter for transport to the field or other jobsite, and including transferring the products between the autonomous machine and a docking station. The computer-implemented control method 400 may be a version of the broader control method 300, may similarly be a corollary to the functionality of the above-described control system 200, and may similarly be implemented using the various components of the control system 200 within an example agricultural context. Broadly, the computer-implemented control method 400 may proceed substantially as follows.

The transporter 72 may initially be located at the initial location or other base B, the docking station 64 may be mounted on (or coupled with) the transporter 72 and loaded with full product pods or other containers 46 and supplemental fuel for the autonomous machine 44, and the autonomous machine 44 may initially be fully fueled and coupled with the transporter 72 for transport, as shown in 402 and as seen in FIG. 1. Operation instructions may be communicated via a communications network 204 to at least the autonomous machine 44, as shown in 404. The operation instructions may be entered into the management computer program using the input interface 212, stored in the base memory 206, and communicated to the transporter 72 and/or autonomous machine 44 by the base transceiver 210 for storage in the transporter memory 218 and/or machine memory 250. Instructions for the transporter 72 may include identifying a location of a particular field or other jobsite G, a route of travel from the initial location or other base B to the identified location, and/or a departure time. Instructions for the autonomous machine 44 may include a start time to begin operation, a speed at which to move over the jobsite G, and a rate of application at which to apply the one or more products. In one implementation, the user may be allowed to select from the base memory 206 a previously entered subset or set of operation instructions for the same or other field or jobsite, and to modify the selected operation instructions as desired or needed.

A fleet operator or other user may modify the operation instructions for the transporter 72 and/or the autonomous machine 44, as desired or needed, as shown in 406. In one implementation, the farm manager may enter the initial operation instructions using the input interface 212 at the initial location or other base B, and the fleet manager may be allowed to modify some or all of the initial operation instructions using the remote access device 202, as desired or needed. The ability of the fleet operator to make such changes may be controllable by the farm manager.

The transporter 72 may travel to the identified field or other jobsite G with the docking station 64 and autonomous machine 44, as shown in 408. In one implementation, the transporter 72 may autonomously travel to the field or other jobsite G under the control of the transporter processor 220 and in accordance with the operation instructions stored in the transport memory 218. In this implementation, the transporter 72 may employ substantially any suitable conventional or non-conventional autonomous vehicle technology which may receive inputs from the external sensor and camera suite 228 and provide outputs to the control and drive components 230. In other implementations, the transporter may be manually driven or remotely driven to the field or other jobsite G.

Upon arriving at the field or other jobsite G, the transporter 72 may decouple from and release the autonomous machine 44, as shown in 410 and seen in FIG. 2. The transporter processor 220 may refer to input from its internal and/or external sensor and camera suites 226,228, such as input from position sensors which sense the position of the lift or other coupling mechanism, to facilitate and confirm that the autonomous machine 44 is properly and fully decoupled. The machine processor 252 may also refer to input from its internal and/or external sensors and camera suites 256,258 to facilitate and conform that the autonomous machine 44 is properly and fully decoupled.

Figure 3:
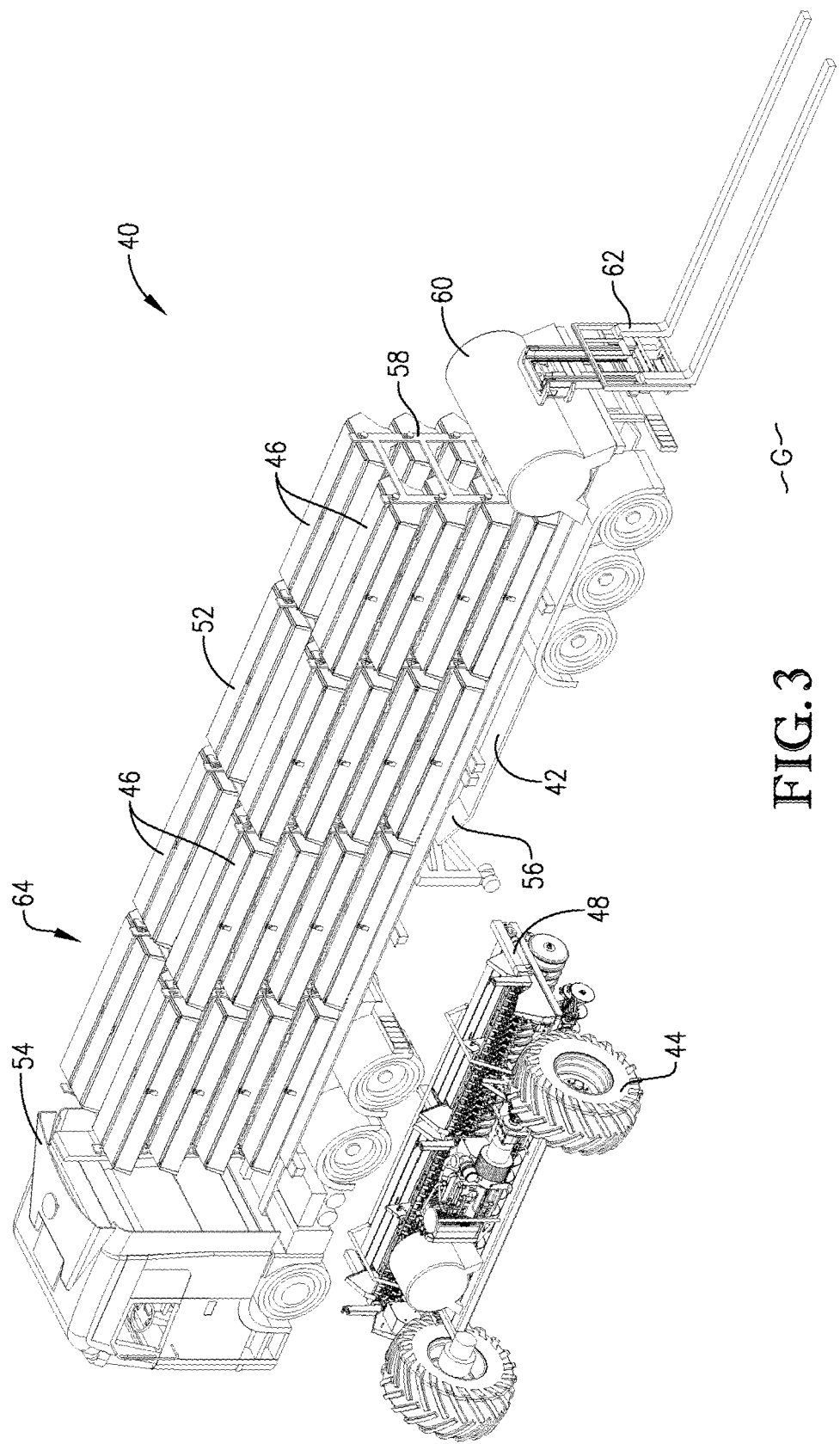
FIG. 3 is a rear perspective of the agricultural system similar to FIG. 2, but showing the machine uncoupled from the supply station and moved to a docking position where the transfer mechanism can select one of several product containers stored on the supply station for loading onto the machine.
Figure 4:
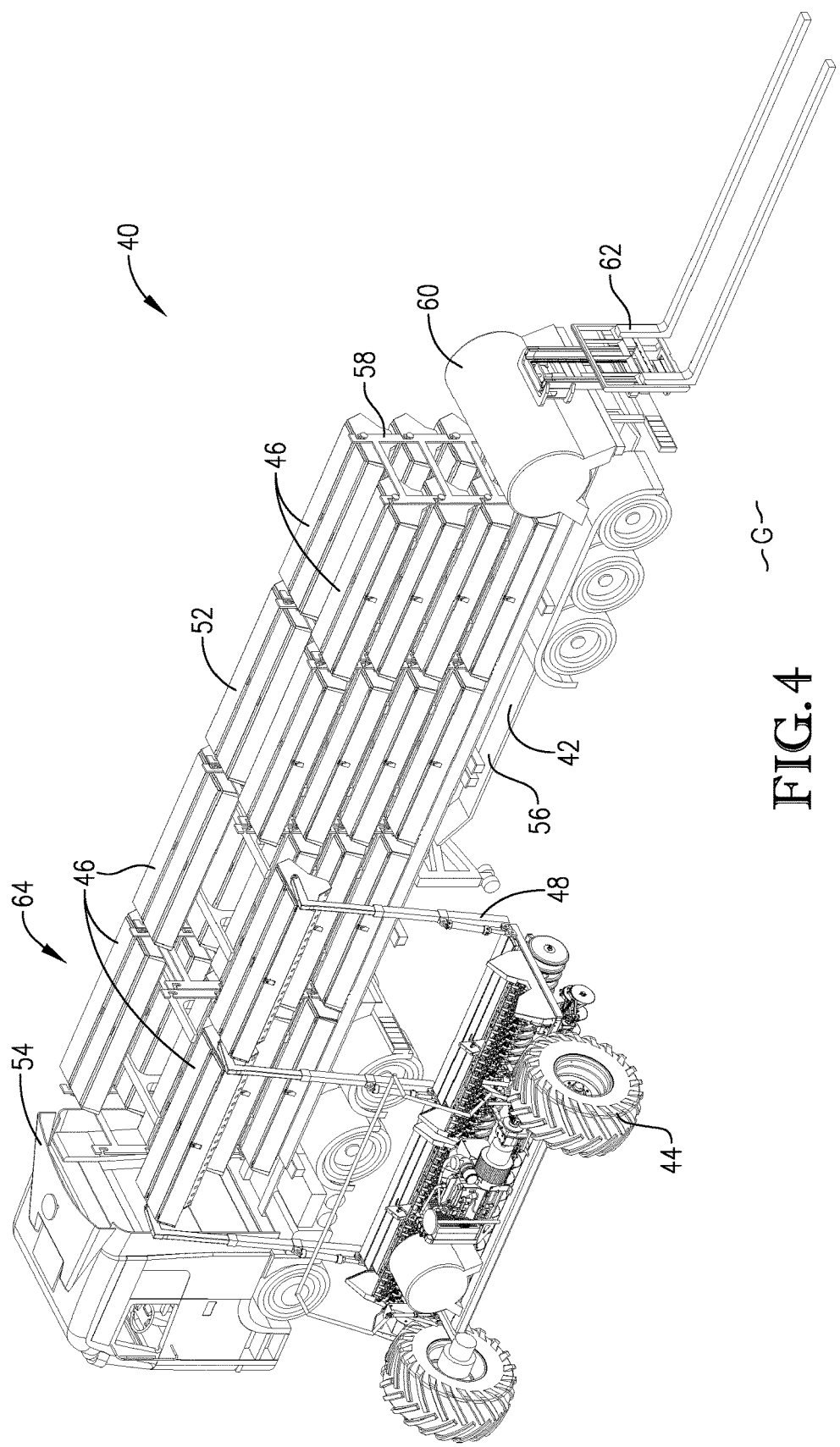
FIG. 4 is a rear perspective of the agricultural system similar to FIG. 3, but showing the transfer mechanism engaged with one of the product containers to remove the product container from a stored position on the supply station.

The autonomous machine 44 may move into docking position and dock with the docking station 64, and the autonomous machine 44 may remove one or more full product containers 46 from the docking station 64 and load them onto the autonomous machine 44 under the control of the machine processor 252 and in accordance with the operation instructions, as shown in 412 and seen in FIGS. 3 and 4. In one implementation, after decoupling from the transporter 72, the autonomous machine 44 may start and proceed to a docking position relative to the docking station 64, and the autonomous machine 44 may employ the transfer arms 170 to remove one or more product containers 46 from the docking station 64 and load them onto the autonomous machine 44 under the control of the machine processor 252.

The machine processor 252 may refer to input from its external sensors and/or cameras to facilitate transferring pods or other containers 46 of products and/or transferring fuel (and/or opening and closing chutes or other conduits), such as docking sensors to sense whether the autonomous machine 44 is fully docked or undocked with the docking station 64. The external sensors and/or cameras may sense or provide images of the docking station 64 and the pods or other containers 46 on the docking station 64 to facilitate docking with the docking station 64 and identifying and transferring the pods or other containers 46. These particular sensors and/or cameras may be located on the transfer arms 170 which actually align with the docking station 64 and engage the pods or other containers 46. The natures of this sensing/imaging and the resulting data may vary.

In one implementation, the autonomous machine 44 may include a docking alignment sensor 264 configured to sense and generate alignment data regarding a relative position of the docking station 64, and the machine processor 252 may align the autonomous machine 44 with the docking station 64 based on the alignment data from the docking alignment sensor 264, and transfer a particular container between the docking station 64 and the autonomous machine 44.

In one implementation, the locations and contents of the pods or other containers 46 on the docking station 64 may be provided in a look-up table or other data structure 246 stored in the docking station and/or machine memories 234,250, and the machine processor 252 may refer to such data to identify and determine the locations of specific pods or other containers 46 for transfer. Additionally or alternatively, the content of each pod or other container 46 may be indicated by a bar code or other machine readable label 268 on an exterior surface, and the autonomous machine 44 may sense and/or image the label 268 to determine or at least confirm the content of the pod or other container 46.

Figure 5:
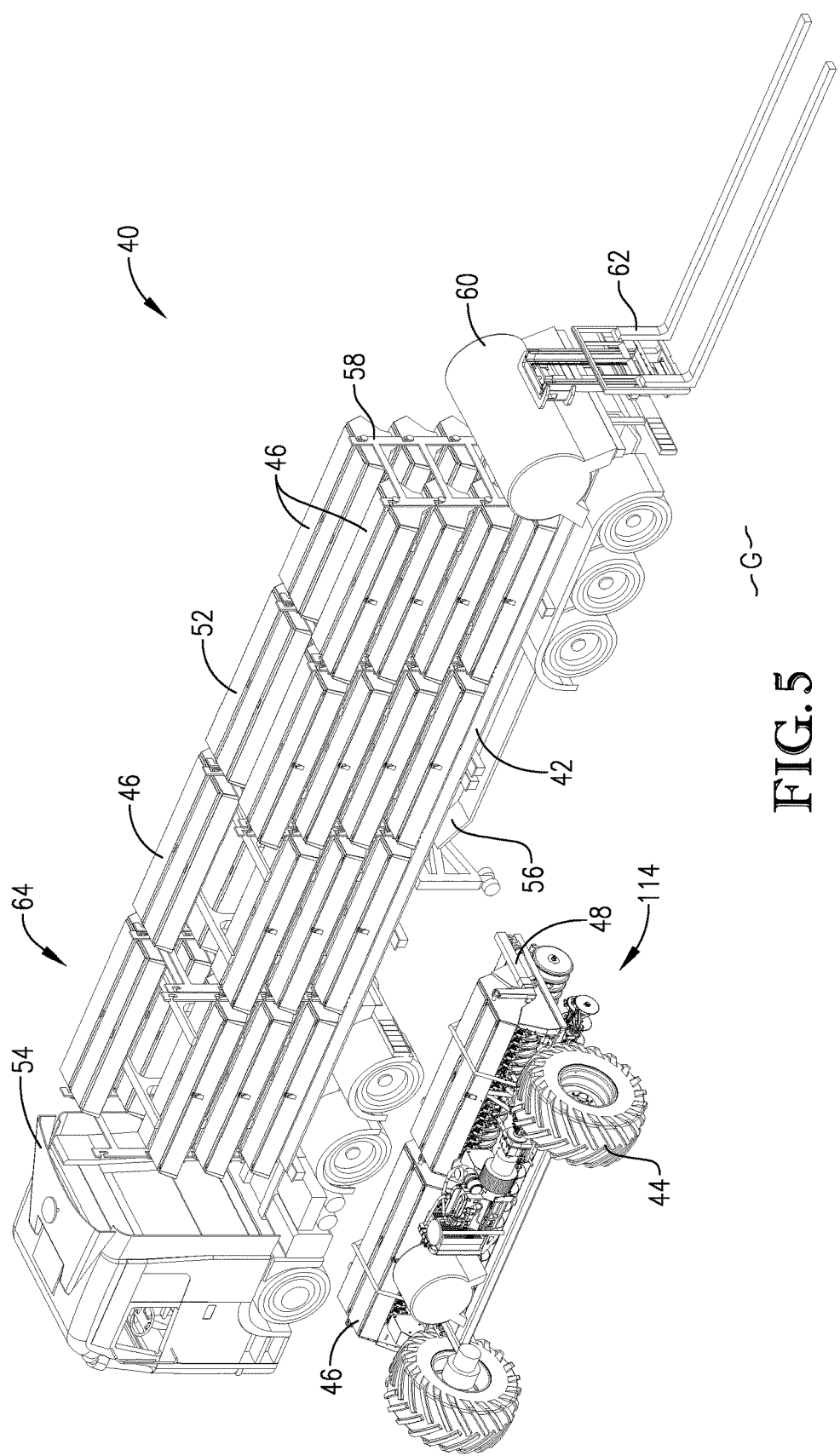
FIG. 5 is a rear perspective of the agricultural system similar to FIG. 4, but showing the transfer mechanism folded to move the product container into a coupled position with the machine, where the product container and the machine are engaged so that agricultural product may be dispensed from the container.
Figure 6:
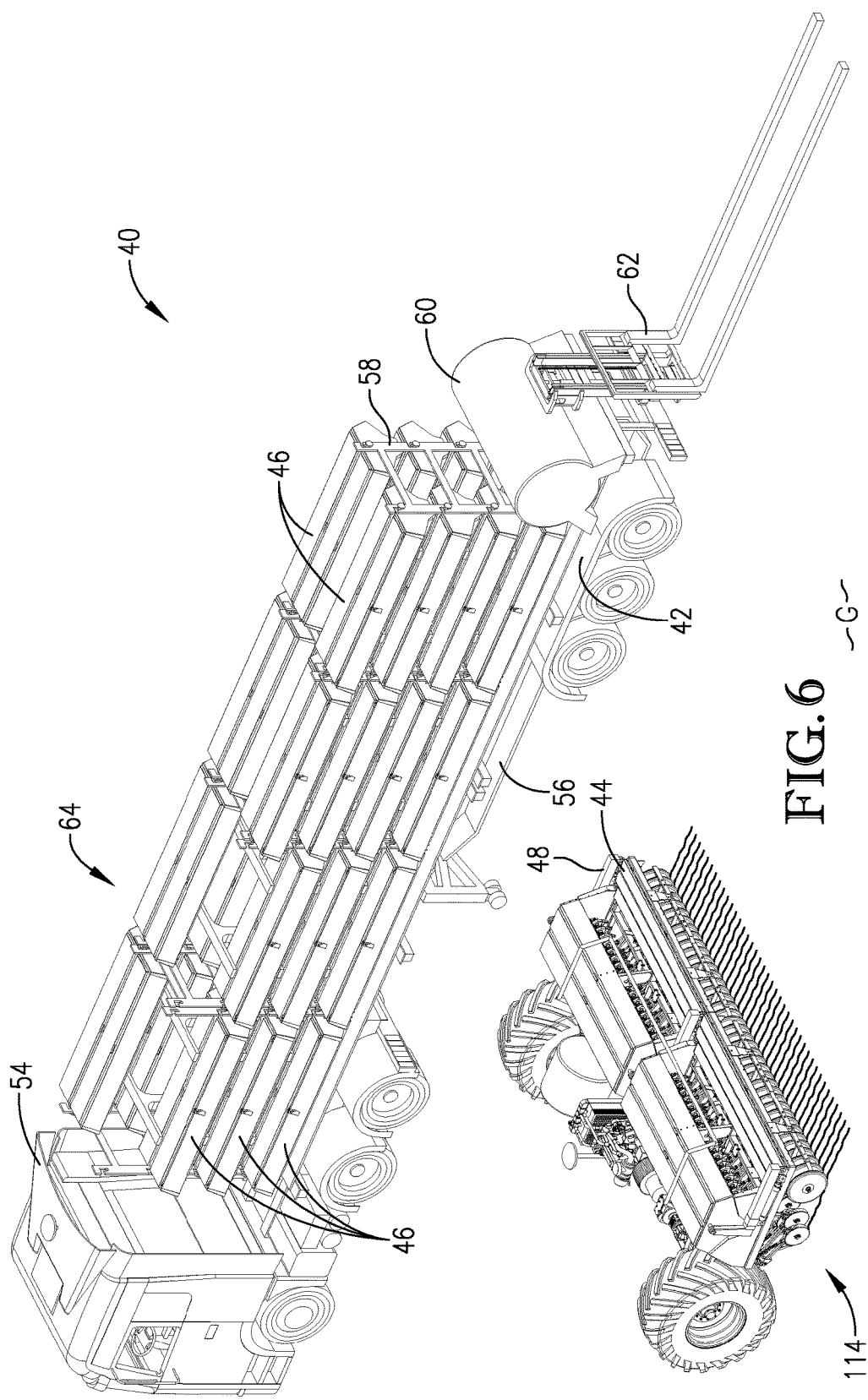
FIG. 6 is a rear perspective of the agricultural system similar to FIG. 5, but showing the implement being advanced to dispense agricultural product within the field.
Figure 7:
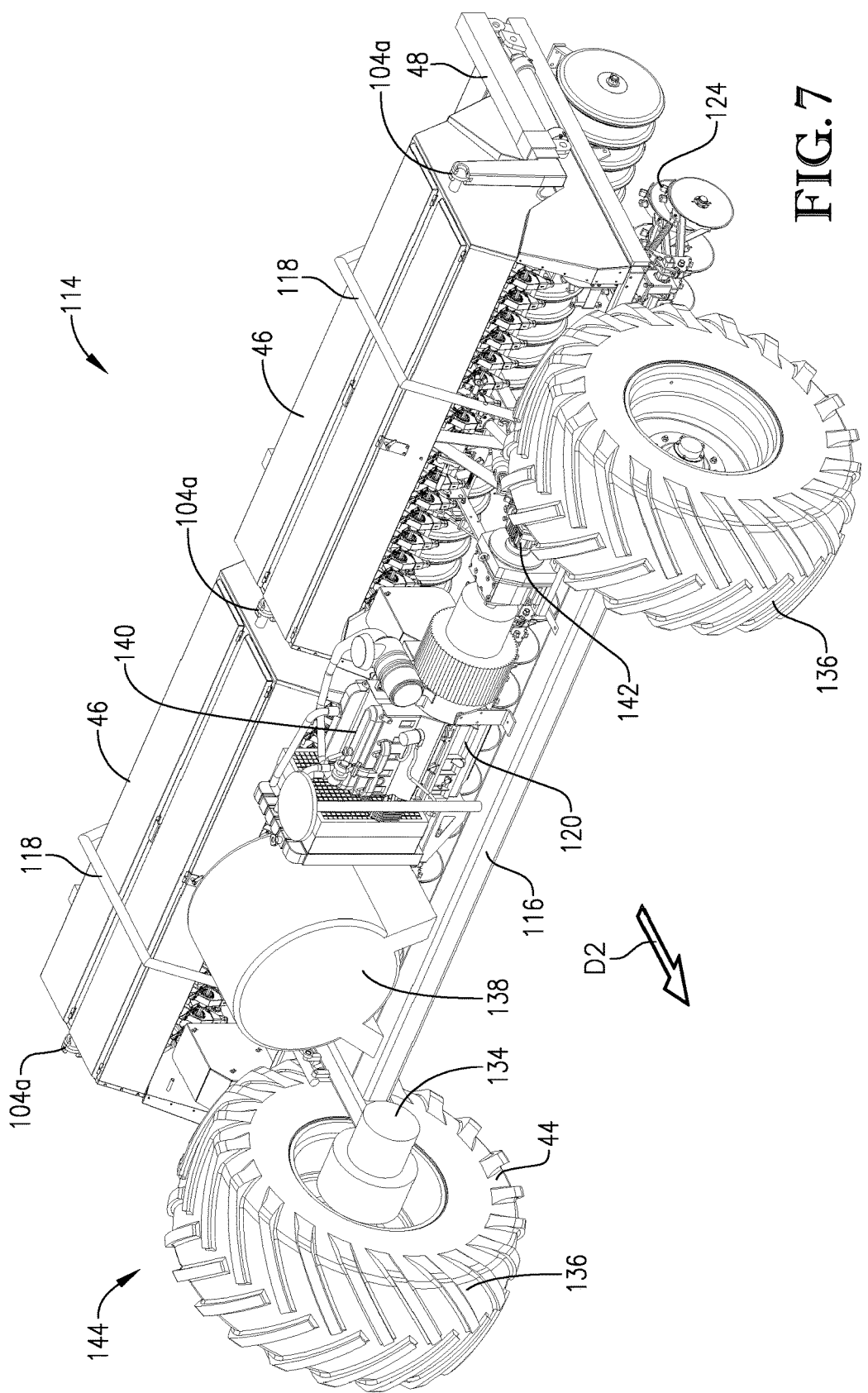
FIG. 7 is a front perspective of the implement shown in FIGS. 5 and 6, showing the product container coupled to the machine by the transfer mechanism, with a securement device of the machine being closed to restrict uncoupling of the product container relative to the machine, and further depicting a drive system and controller mounted on the chassis of the machine.
Figure 8:
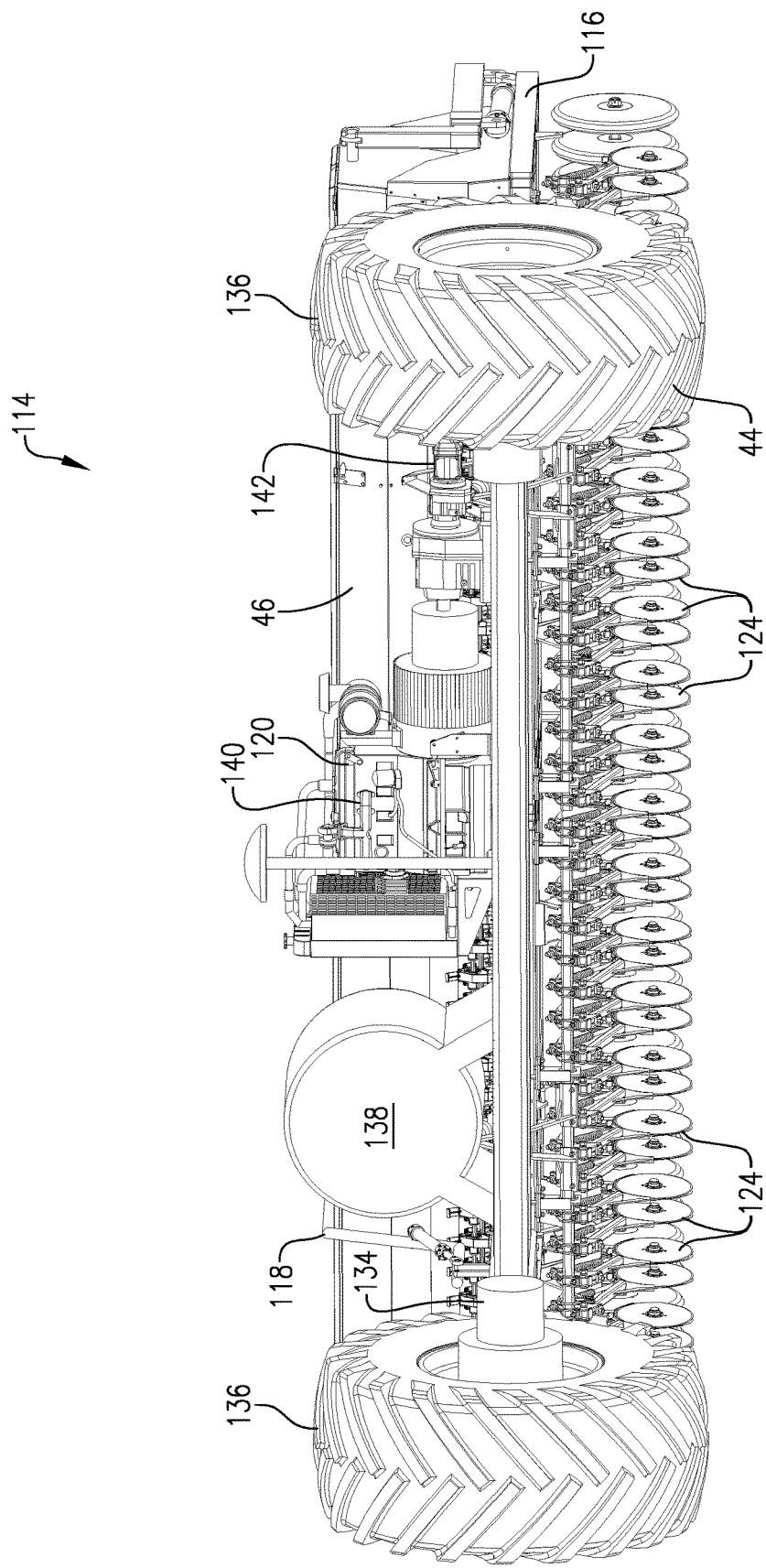
FIG. 8 is another front perspective of the implement shown in FIGS. 5-7, showing a series of openers positioned underneath the chassis.
Figure 9:
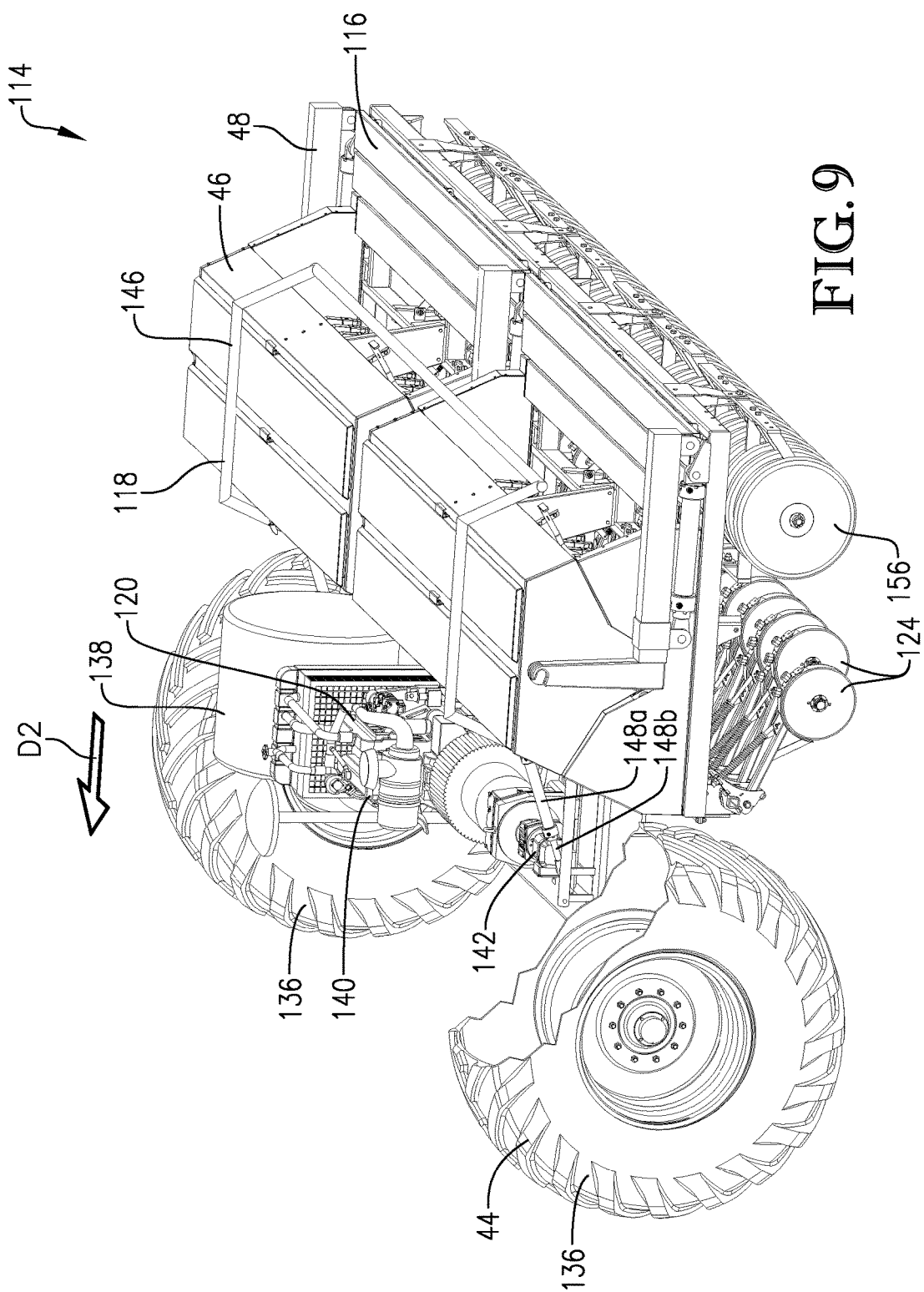
FIG. 9 is a fragmentary side perspective of the implement shown in FIGS. 5-8, showing the product container coupled to the machine, with the transfer mechanism including telescopic transfer arms and hydraulic arm rotation cylinders shifted into a folded position associated with the container in the coupled position.

The loaded autonomous machine 44 may then undock from the docking station 64, as seen in 414, and proceed to autonomously move across the field or other jobsite G and deposit or otherwise apply seed, fertilizer, or other products under the control of the machine processor 252 and in accordance with the operation instructions, as seen in 416 and shown in FIGS. 5 and 6. As the autonomous machine 44 performs this process, the internal and external sensor and camera suites 256,258 may gather information for the machine processor 252 and/or for transmission to the base B and/or mobile access device 202. The autonomous machine 44 may employ substantially any suitable conventional or non-conventional autonomous vehicle technology which may receive inputs from the external sensor and camera suite 258 and provide outputs to the control and drive components 260. In one implementation, the autonomous machine 44 may move from point A to point B, wherein A and B are GPS coordinates. More specifically, the geographic coordinates for the boundaries of the field G may be included in the operation instructions or otherwise stored in the machine memory 250, and GPS or other position-locating system may be used in conjunction with the navigation sensors 258 to control movement of the autonomous machine 44 within the identified boundaries. In another implementation, the autonomous machine 44 may move from point A to point B, wherein A and B are passive or active markers. More specifically, the markers may be placed at the boundaries of the field G (at, e.g., the ends of rows), and the markers in conjunction with the navigation and/or environment sensors 258 may be used to control movement of the autonomous machine 44 within the marked boundaries. In another implementation, the autonomous machine 44 may move from point A to point B using only autonomous vehicle technology in conjunction with the navigation and/or environment sensors 258 to stay identify and stay within the boundaries of the field G. The machine processor 252 may avoid known obstacles (e.g., trees, boulders, ponds) and/or unknown obstacles (e.g., downed trees, animals, humans) by using the environmental sensors 258 to sense the obstacles and provide input for navigating the autonomous machine 44 to avoid them.

Based on data received via the communications network from the internal and/or external sensor and camera suites 256,258, the farm manager, fleet operator, or other user may change the operation instructions for the transporter 72 and/or autonomous machine 44, as shown in 418. As desired or needed, such as in response to exceptional or emergency circumstances, the operation instructions may be modified and communicated via the communications network 204 to the transporter 72 and/or autonomous machine 44.

If prior to completion of the job the autonomous machine 44 runs low on products or fuel, the autonomous machine 44 may return to the docking station 64, move into docking position and dock with the docking station 64, transfer the low or empty product containers 46 to the docking station 64 and transfer full product containers 46 from the docking station 64, and/or transfer fuel from the docking station 64 under the control of the machine processor 252, as desired or needed, as shown in 420. In one implementation, the autonomous machine 44 may continue to deposit or otherwise apply products until the weight sensor 256, which senses the declining weight of the product container 46, indicates that there is insufficient product remaining in the container 46 to complete another "pass" across the field or other jobsite G. The autonomous machine 44 may return to the docking station 64 to swap the low or empty pod or other container 46 for a full pod or other container 46. Similarly, fuel may be transferred from the supplemental fuel tank 60 to the machine fuel tank 138. Once the autonomous machine 44 is replenished with product and/or fuel, the machine processor 252 may return it to the last operating point and continue operation.

During some or all phases of the job, the internal and external sensor and camera suites 256,258 may provide information to the fleet operator, farm manager, or other user to allow for remote monitoring and/or managing of the process. In one implementation, the farm manager, fleet operator, or other user may remotely monitor and/or observe operation of the transporter 72 and/or autonomous machine 44 via data from the internal and external sensor and camera suites 256,258. Progress may be periodically or continuously updated in real-time via a GPS-based or other mapping system. The user may modify the operation instructions based on sensor or camera data, as desired or needed.

When the job is nearing completion or complete, an advice message may be communicated to the farm manager, fleet operator, or other user via the communications network 204, as shown in 422. The message may be communicated using any communications format to the computer at the initial location or other base B and/or to the mobile access device 202.

When the job is complete, the autonomous machine 44 may return to, move into docking position, and dock with the docking station 64 and transfer the product pods or other containers 46 to the docking station 64, and the autonomous machine 44 may then undock from the docking station 64, move into coupling position, and couple with and secure to the transporter 72 for travel to the next field or other jobsite G or to return to the base of other initial location B under the control of the machine processor 252 and in accordance with the operation instructions, as shown in 424. In one implementation, when the job is complete, the autonomous machine 44 may return to the docked position and unload the product pods or other containers 46 to the docking station 64. The autonomous machine 44 may then move to the transport lift 62 and shut down. The transporter 72 may then lift the autonomous machine 44 into the transport position using the transport lift 62 and lock or otherwise secure the autonomous machine 44 in place for travel under the control of the transporter processor 220. The transporter 72 may then travel to the next field or other jobsite G or return to the initial location or other base B as required by the operation instructions. Upon returning to the initial location or other base B, the transporter 72, docking station 64, autonomous machine 44, and/or other elements of the control system 200 may be serviced and otherwise prepared for the next job.

Alternative Embodiment

Turning to FIG. 37, an alternative system 500 is constructed in accordance with a second embodiment of the present invention. For the sake of brevity, the remaining description will focus primarily on the differences of this alternative embodiment from the preferred embodiment described above.

The system 500 is configured to dispense a product within a field G or similar jobsite and preferably includes an alternative agricultural product supply station 502, autonomous agricultural machine 504, a product container 506, and a powered transfer mechanism 508.

Instead of resupplying the machine 504 with agricultural products by exchanging containers, the illustrated supply station 502 is configured to cooperate with the machine 504 and container 506 to resupply the machine 504 by refilling the same container 506. The chambers within the container 506 are preferably refilled via an automated container refill process. The supply station 502 includes a tractor truck 510, an alternative towed trailer 512, a fuel system 514, and a machine coupling assembly 516.

The depicted trailer 512 preferably includes a wheeled chassis 518 and a pair of product storage bins 520,522 configured to contain respective product supplies therein. The storage bins 520,522 are configured to hold supplies of seed and fertilizer, although the bins could be configured to store other products within the ambit of the present invention.

The trailer 512 preferably presents an open bay 524 that is sized and configured to removably receive the container 506. Similar to the first-mentioned embodiment, the transfer mechanism 508 is configured to shift the container 506 between a coupled position on the machine 504 and an uncoupled position where the container 506 is located within the bay 524.

The trailer 512 also preferably includes powered augers 526,528 that communicate with respective bins 520,522. The depicted augers 526,528 extend longitudinally along the trailer 512 and are preferably positioned above the bay 524. When the container 506 is located in the bay 524, the augers 526,528 are configured to draw flows of products from the corresponding bins 520,522 and dispense the flows of products uniformly within the chambers of the container 506.

In alternative embodiments, each auger 526,528 is configured to direct product from a respective one of the bins 520,522 to a respective one of the chambers 102a,b. However, in other alternative embodiments, the system 500 could be configured so that each auger can direct product from a respective bin 520,522 to either one of the chambers 102a,b (or to both chambers at the same time). Yet further, the disclosed system could include more than two bins with respective product supplies contained therein. Such alternative systems can be preferably used to combine two or more products in order to selectively produce and dispense a blended product mixture to the product container. For instance, the systems are configured to combine two or more fertilizer products to produce and dispense a blended fertilizer mixture (as needed for different soil conditions and field areas) to the product container.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A control system for controlling an autonomous machine for autonomously applying one or more products to a jobsite in accordance with a set of operation instructions, wherein the one or more products are stored in one or more interchangeable containers which are initially located on a station, and wherein the autonomous machine includes a machine internal sensor suite including—
   a speed sensor configured to sense and generate speed data regarding a speed of movement of the autonomous machine over the jobsite,
   a rate sensor configured to sense and generate rate data regarding a rate of application of the one or more products,
   a hydraulic pressure sensor configured to sense and generate pressure data regarding a force exerted by the autonomous machine,
   a weight sensor configured to sense and generate weight data regarding a weight of the particular container, wherein the weight of the particular container is indicative of a remaining amount of the particular product in the particular container, and
   a blockage sensor configured to sense and generate blockage data regarding a blockage in the application of the particular product,
   the control system comprising:
   an alignment sensor configured to sense and generate alignment data regarding a relative position of the station and a particular container of the one or more interchangeable containers, wherein the particular container contains a particular product of the one or more products; and a machine processor configured to—
align the autonomous machine with the station and the particular container based on the alignment data from the alignment sensor, and transfer the particular container from the station to the autonomous machine,
move the autonomous machine over the jobsite and apply the particular product from the particular container in accordance with the set of operation instructions,
align the autonomous machine with the station based on the alignment data from the alignment sensor, and transfer the particular container from the autonomous machine to the station, and
wherein the machine processor accomplishes moving the autonomous machine over the jobsite and applying the one or more products in accordance with the set of operation instructions based at least in part on the speed, rate, pressure, weight, and blockage data.

2. The control system of claim 1, wherein the set of operation instructions include—
a start time at which the autonomous machine begins operation;
a speed at which the autonomous machine moves over the jobsite; and
a rate of application at which the autonomous machine applies the one or more products.

3. The control system of claim 1, wherein the alignment sensor is configured to sense a plurality of alignment markers associated with the one or more containers.

4. The control system of claim 1, wherein the machine processor is further configured to access a data structure containing an identifier, a location, a content, and a status for each container, and based thereon, identify the particular container for transfer from the station to the autonomous machine.

5. The control system of claim 1, the station further storing fuel, and the machine processor is further configured to align the autonomous machine with the station and transfer fuel from the station to the autonomous machine.

6. The control system of claim 1, further including a base of operations including a base processor configured to execute a management computer program for managing operation of the autonomous machine, including transmitting the set of operation instructions to the autonomous machine via a communications network, and including receiving sensor and camera data from one or more sensors and cameras on the autonomous machine via the communications network.

7. The control system of claim 1, further including a remote access device configured to execute a management software application for managing operation of the autonomous machine, including transmitting the set of operation instructions to the autonomous machine via a communications network, and including receiving sensor and camera data from one or more sensors and cameras on the autonomous machine via the communications network.

8. The control system of claim 1, wherein the autonomous machine is transported to and from the jobsite by a transporter, the transporter including a coupling system for coupling with and decoupling from the autonomous machine, the autonomous machine including a transporter alignment sensor configured to sense and generate coupling alignment data regarding a relative position of the coupling system, and the machine processor is further configured to align the autonomous machine with the coupling system based on the coupling alignment data.

9. The control system of claim 1, further including a machine transceiver configured to transmit the speed, rate, pressure, weight, and blockage data via a communications network to a remote location, and to receive a modified set of operation instructions.

10. The control system of claim 1, the autonomous machine further including a machine external sensor suite including—
a navigation sensor configured to sense and generate navigation data regarding a geographic location of the autonomous machine,
wherein the machine processor accomplishes moving the autonomous machine over the jobsite and applying the one or more products in accordance with the set of operation instructions based at least in part on the navigation data.

11. The control system of claim 10, the machine processor further configured to transmit a message to the remote location regarding a completion of the application of the one or more products to the jobsite.

12. The control system of claim 1, wherein the autonomous machine further includes at least two drive wheels and a drive mechanism configured to turn the at least two drive wheels, and the machine processor is further configured to steer the autonomous machine by controlling a relative turning speed of each of the at least two drive wheels.

13. A control system for controlling an autonomous machine for autonomously applying one or more products to a jobsite in accordance with a set of operation instructions, wherein the one or more products are stored in one or more interchangeable containers which are initially located on a station, and wherein the autonomous machine includes a machine internal sensor suite including—
a speed sensor configured to sense and generate speed data regarding a speed of movement of the autonomous machine over the jobsite,
a rate sensor configured to sense and generate rate data regarding a rate of application of the one or more products,
a hydraulic pressure sensor configured to sense and generate pressure data regarding a force exerted by the autonomous machine,
a weight sensor configured to sense and generate weight data regarding a weight of the particular container, wherein the weight of the particular container is indicative of a remaining amount of the particular product in the particular container, and
a blockage sensor configured to sense and generate blockage data regarding a blockage in the application of the particular product,
the control system comprising:
an alignment sensor configured to sense a plurality of alignment markers associated with the one or more interchangeable containers, and to sense and generate alignment data regarding a relative position of the station and a particular container of the one or more interchangeable containers, wherein the particular container contains a particular product of the one or more products;
a machine processor configured to—
align the autonomous machine with the station and the particular container based on the alignment data from the alignment sensor, and transfer the particular container from the station to the autonomous machine, move the autonomous machine over the jobsite and apply the particular product from the particular container in accordance with the set of operation instructions, and align the autonomous machine with the station based on the alignment data from the alignment sensor, and transfer the particular container from the autonomous machine to the station;

a navigation sensor configured to sense and generate navigation data regarding a geographic location of the autonomous machine, the machine processor further configured to move the autonomous machine over the jobsite and apply the one or more products in accordance with the set of operation instructions based at least in part on the navigation data, wherein the machine processor accomplishes moving the autonomous machine over the jobsite and applying the one or more products in accordance with the set of operation instructions based at least in part on the speed, rate, pressure, weight, and blockage data; and a machine transceiver configured to transmit the speed, rate, pressure, weight, and blockage data via a communications network to a remote location, and to receive a modified set of operation instructions.

14. The control system of claim 13, further including a base of operations including a base processor configured to execute a management computer program for managing operation of the autonomous machine, including transmitting the set of operation instructions to the autonomous machine via a communications network, and including receiving sensor and camera data from one or more sensors and cameras on the autonomous machine via the communications network.

15. The control system of claim 13, further including a remote access device configured to execute a management software application for managing operation of the autonomous machine, including transmitting the set of operation instructions to the autonomous machine via a communications network, and including receiving sensor and camera data from one or more sensors and cameras on the autonomous machine via the communications network.

16. A control system for controlling an autonomous machine for autonomously applying one or more products to a jobsite in accordance with a set of operation instructions, wherein the one or more products are stored in one or more interchangeable containers which are initially located on a station, the control system comprising:

an alignment sensor configured to sense a plurality of alignment markers associated with the one or more interchangeable containers, and to sense and generate alignment data regarding a relative position of the station and a particular container of the one or more interchangeable containers, wherein the particular container contains a particular product of the one or more products;

a machine processor configured to—
align the autonomous machine with the station and the particular container based on the alignment data from the alignment sensor, and transfer the particular container from the station to the autonomous machine, move the autonomous machine over the jobsite and apply the particular product from the particular container in accordance with the set of operation instructions, and align the autonomous machine with the station based on the alignment data from the alignment sensor, and transfer the particular container from the autonomous machine to the station;

a machine internal sensor suite including—
a speed sensor configured to sense and generate speed data regarding a speed of movement of the autonomous machine over the jobsite, a rate sensor configured to sense and generate rate data regarding a rate of application of the one or more products, a weight sensor configured to sense and generate weight data regarding a weight of the particular container, wherein the weight of the particular container is indicative of a remaining amount of the particular product in the particular container; and a blockage sensor configured to sense and generate blockage data regarding a blockage in the application of the particular product, and wherein the machine processor accomplishes moving the autonomous machine over the jobsite and applying the one or more products in accordance with the set of operation instructions based at least in part on the speed, rate, weight, and blockage data;

a machine transceiver configured to transmit the speed, rate, weight, and blockage data via a communications network to a remote location, and to receive a modified set of operation instructions; and a remote access device configured to execute a management software application for managing operation of the autonomous machine, including transmitting the set of operation instructions to the autonomous machine via the communications network, and including receiving the speed, rate, weight, and blockage data via the communications network.

17. The control system of claim 16, further including a base of operations including a base processor configured to execute a management computer program for managing operation of the autonomous machine, including transmitting the set of operation instructions to the autonomous machine via the communications network, and including receiving the speed, rate, weight, and blockage data via the communications network.

* * * * *